US009881201B2

(12) United States Patent
Bartlett, II et al.

(10) Patent No.: US 9,881,201 B2
(45) Date of Patent: Jan. 30, 2018

(54) METHOD AND APPARATUS FOR COLLECTING AN ELECTRONIC SIGNATURE ON A FIRST DEVICE AND INCORPORATING THE SIGNATURE INTO A DOCUMENT ON A SECOND DEVICE

(71) Applicant: VYNCA, INC., Palo Alto, CA (US)

(72) Inventors: Rush Lloyd Bartlett, II, Mountain View, CA (US); Allen Namath Gromme, Mountain View, CA (US); Darian Shimy, Pleasanton, CA (US); Ryan J. F. Van Wert, Palo Alto, CA (US); Frank T. Wang, Cupertino, CA (US)

(73) Assignee: VYNCA, INC., Palo Alto, CA (US)

( * ) Notice: Subject to any disclaimer, the term of this patent is extended or adjusted under 35 U.S.C. 154(b) by 219 days.

(21) Appl. No.: 14/760,780

(22) PCT Filed: Feb. 5, 2014

(86) PCT No.: PCT/US2014/014880
§ 371 (c)(1),
(2) Date: Jul. 14, 2015

(87) PCT Pub. No.: WO2014/124014
PCT Pub. Date: Aug. 14, 2014

(65) Prior Publication Data
US 2015/0358400 A1 Dec. 10, 2015

Related U.S. Application Data

(60) Provisional application No. 61/760,772, filed on Feb. 5, 2013, provisional application No. 61/821,779, filed
(Continued)

(51) Int. Cl.
*H04L 29/08* (2006.01)
*G06K 9/00* (2006.01)
(Continued)

(52) U.S. Cl.
CPC ......... *G06K 9/00154* (2013.01); *G06K 19/16* (2013.01); *H04L 63/126* (2013.01);
(Continued)

(58) Field of Classification Search
CPC ....... H04L 67/104; H04L 67/32; G06K 19/16; G06K 9/00154
See application file for complete search history.

(56) References Cited

U.S. PATENT DOCUMENTS 6,460,770 B1 * 10/2002 Kucharczyk ....... G06K 7/10544
235/462.01
8,468,610 B2 6/2013 Beals
(Continued)

FOREIGN PATENT DOCUMENTS

WO 2008/084248 A1 7/2008
WO WO 2013093864 6/2013

OTHER PUBLICATIONS

"Softpro GMBH, Samsung Galaxy Note 7 ATIV PCs: Electronic Signature and SignDoc Mobile"—Samsung, Softpro GMBH, Apr. 2012 http://www.slideshare.net/ SoftproGroup/softpro-signdoc-mobile-app-on-samsung-galaxy-note-elelctronic-signing.*
(Continued)

*Primary Examiner* — Randy Scott
(74) *Attorney, Agent, or Firm* — Merchant & Gould P.C.

(57) ABSTRACT

Disclosed embodiments are directed to systems and methods for linking more than one electronic device together to enable collection of an electronic signature or other information on a first device and incorporation of that signature or information into a document on a second device.

16 Claims, 46 Drawing Sheets

Related U.S. Application Data on May 10, 2013, provisional application No. 61/846,175, filed on Jul. 15, 2013, provisional application No. 61/846,173, filed on Jul. 15, 2013.

(51) Int. Cl.

| | | |
|---|---|---|
| *H04L 29/06* | (2006.01) | |
| *H04W 4/00* | (2009.01) | |
| *H04W 12/10* | (2009.01) | |
| *G06K 19/16* | (2006.01) | |
| *H04M 1/725* | (2006.01) | |
| *H04W 4/02* | (2009.01) | |
| *H04W 8/20* | (2009.01) | |

(52) U.S. Cl.
CPC .......... *H04L 67/104* (2013.01); *H04L 67/141* (2013.01); *H04L 67/146* (2013.01); *H04L 67/32* (2013.01); *H04M 1/72527* (2013.01); *H04W 4/008* (2013.01); *H04W 4/02* (2013.01); *H04W 8/20* (2013.01); *H04W 12/10* (2013.01)

(56) References Cited

U.S. PATENT DOCUMENTS

| | | |
|---|---|---|
| 2005/0021376 A1 | 1/2005 | Zaleski |
| 2005/0187794 A1 | 8/2005 | Kimak |
| 2006/0071081 A1 | 4/2006 | Wang |
| 2006/0161973 A1 | 7/2006 | Royer |
| 2006/0287890 A1 | 12/2006 | Stead |
| 2007/0130084 A1 | 6/2007 | Kay |
| 2007/0206248 A1* | 9/2007 | Winterbottom .... G06K 9/00006 359/2 |
| 2012/0061458 A1 | 3/2012 | Bahr |
| 2012/0284591 A1* | 11/2012 | Seed ................. G06Q 20/3274 715/201 |
| 2013/0185210 A1 | 7/2013 | Dodson |
| 2013/0334298 A1 | 12/2013 | Sakpal |
| 2014/0221795 A1 | 8/2014 | Yeager |
| 2014/0275807 A1 | 9/2014 | Redei |
| 2014/0317080 A1 | 10/2014 | Piraino et al. |
| 2015/0199389 A1 | 7/2015 | Morrison et al. |
| 2015/0242812 A1 | 8/2015 | Nelson |
| 2015/0294068 A1 | 10/2015 | Bartlett |
| 2015/0347681 A1 | 12/2015 | Bartlett |
| 2016/0328523 A1 | 11/2016 | Bartlett |

OTHER PUBLICATIONS

International Search Report for PCT International Application No. PCT/US2014/014880, dated Jun. 20, 2014 pp. 1-4.

Written Opinion of the International Search Authority for PCT International Application No. PCT/US2014/014880, dated Jun. 20, 2014 pp. 1-5.

Softpro GMBH, *E-Signing on iPad*, Retrieved from the Internet URL: https://web.archive.org/web/20120915105226/http://www.softpro.de/data/anonymous_successtories/softpro_insurance_success_story_aia_en.pdf, Retrieved on Jun. 11, 2014 XP055122592, Feb. 1, 2012, 2 pages.

Softpro GMBH, *Samsung Galaxy Note 7 ATIV PCs: Electronic Signature and SignDoc Mobile*, Retrieved from the Internet: URL: http://www.slideshare.net/ SOFTPR0Group/softpro-signdoc-mobile-app-on-samsung-galaxy-note-elelctronic-signing, retrieved on Jun. 11, 2014 XP055122653, Apr. 20, 2012, 20 pages.

Trivedi, "Mapping Relational Databases and SQL to MongoDB," https://code.tutsplus.com/articles/mapping-relational-databases-and-sql-to-mongodb—net-35650, Feb. 6, 2014, 15 pages.

\* cited by examiner

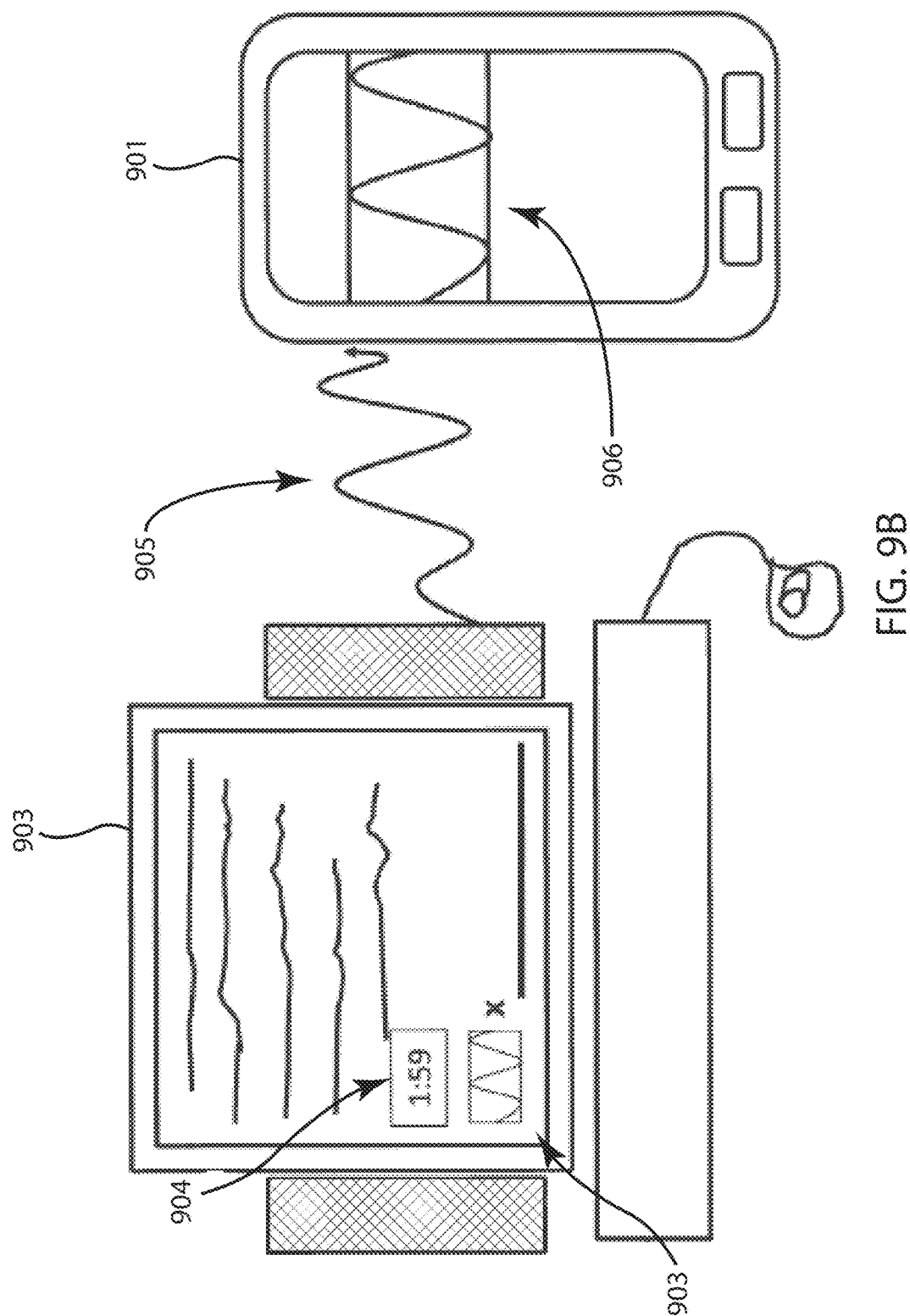

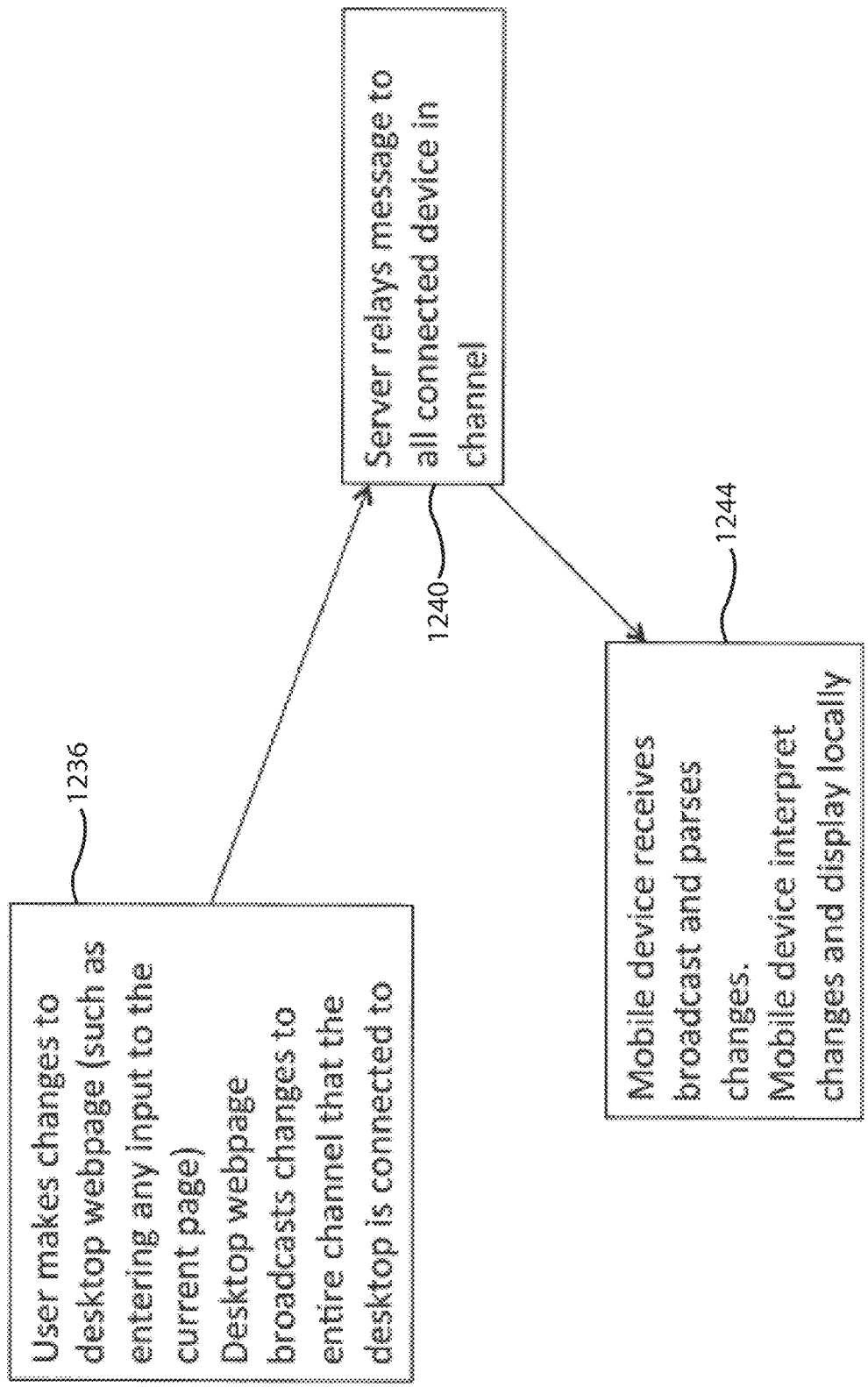

METHOD AND APPARATUS FOR COLLECTING AN ELECTRONIC SIGNATURE ON A FIRST DEVICE AND INCORPORATING THE SIGNATURE INTO A DOCUMENT ON A SECOND DEVICE

CROSS REFERENCE TO RELATED APPLICATIONS

The present application claims the benefit of U.S. Provisional Patent Application Ser. No. 61/760,772 filed on Feb. 5, 2013; U.S. Provisional Patent Application Ser. No. 61/821,779 filed on May 10, 2013; U.S. Provisional Patent Application Ser. No. 61/846,175 filed on Jul. 15, 2013; and U.S. Provisional Patent Application Ser. No. 61/846,173 filed on Jul. 15, 2013. All of these applications are hereby incorporated fully herein by reference.

FIELD

Disclosed embodiments are directed to systems and methods for collecting and using electronic signatures or other information through linked electronic devices.

BACKGROUND

Electronic signatures are useful for a variety of applications. Current techniques allow a pin number entry or a dedicated signature pad to be used with a device by a physical and/or direct electronic link. The drawbacks of these technologies are that they sometimes do not allow for a unique signature to be applied each time, and they do not allow for other devices not specifically configured and dedicated to be used for signature function to be used.

In certain instances, various applications and web sites must interface with each other to exchange information. For example, one application may require information such as demographic data from another application. Integration of such applications may be difficult, due to proprietary software, incompatibility of programming languages or platforms, and limited information technology resources.

Therefore, a need exists for developing a way to exchange information between software applications that does not require specific modification or manipulation of the applications, web sites or servers themselves. Such a need exists in the healthcare services industry, financial institutions, government, and elsewhere.

BRIEF SUMMARY

With these considerations in mind, disclosed embodiments are directed allow for information exchange across applications and web sites, by capturing relevant information displayed on a user screen and delivering it to another application. Various disclosed embodiments are directed to an electronic signature device and method that incorporates secure web link functionality for a device and a touch screen device to allow for electronic signature means and electronic linking of the signature to the screen of the other device.

The smartphone has significant data input and acquisition functionality that traditional desktop computers do not have. These include touch screen technology, built-in cameras, video cameras, accelerometers and GPS sensors. The desktop computer commonly has a keyboard and mouse as the only means of data entry. Various disclosed embodiments are directed to a method of linking a user interface on a desktop computer with a user's smartphone, to use the broad capability for data input and acquisition on a smartphone. The link is established, among other ways, by QR code linking. Additionally, it may sometimes be desirable to be able to verify that input data is coming from a correct user. Various methods of authenticating the identity of a user inputting data by this interface are disclosed.

Disclosed embodiments allow for collection of electronic signatures, other user-generated images, sounds or pictures, handwriting or other content on devices capable of touch screen, audio, or visual data entry, and the transmission of this content to another device in a secure, authenticated fashion.

Disclosed embodiments allow for a smartphone or other mobile device to be linked to another device, for example a desktop computer. Such linking will allow for the data to be input and/or acquired by the collecting device, and sent to the receiving device. Such linking may occur by a unique identifier such as a QR code.

Disclosed embodiments allow for a smartphone or other mobile device to be linked to another device, for example a desktop computer. Such linking will allow for the data to be input and/or acquired by the collecting device, and sent to the receiving device. Such linking may occur by a unique identifier such as a QR code or bar code. Additionally, scanning of a form of identification with video, camera, or other scanning feature will allow the link to the other device to be able to authenticate the identity of the user of the linked device.

Disclosed embodiments will allow for information exchange across applications or web page, web service or web servers.

BRIEF DESCRIPTION OF THE DRAWINGS

It is believed present embodiments will be better understood from the following description of certain examples taken in conjunction with the accompanying drawings, in which like reference numerals identify the same elements and in which:

FIG. 9B depicts an exemplary system in which the unique identifier and the device linkage it facilitates expires after a period of time, displayed via a timer;

FIGS. 12A-G describe, in flow chart form, a process by which collecting and receiving devices may be linked, according to one embodiment;

DETAILED DESCRIPTION

Figure 1A:
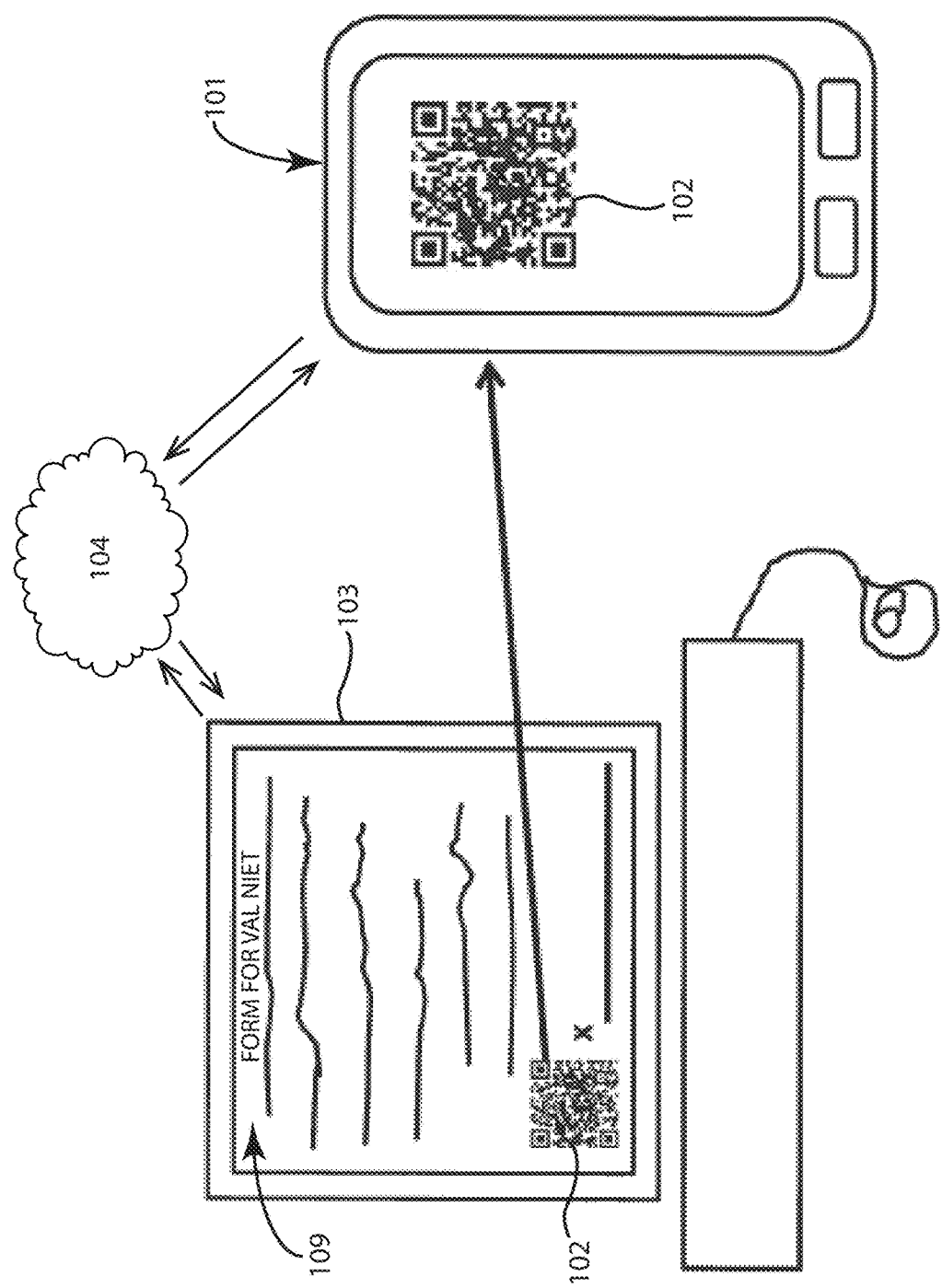
FIG. 1A is a diagram of an exemplary system and touch device that allows for scanning of a QR code to identify the electronic form for signature input.

Disclosed embodiments are directed to systems and methods for linking more than one electronic device together to enable collection of an electronic signature or other information on a first device and incorporation of that signature or information into a document on a second device. In some embodiments, additional verifying information may be collected and used to authenticate the secure web session or to bolster the authenticity of the electronic signature. Additional embodiments are directed to platform independent methods of transmitting information between applications running on different devices.

The following description of various embodiments should not be interpreted as limiting the scope of embodiments set forth in the claims. Accordingly, the drawings and descriptions should be regarded as illustrative in nature and not restrictive.

Signature Collection Using Linked Devices

The first described embodiments herein are directed to systems and methods for linking more than one electronic device together to enable collection of an electronic signature or other information on a first device and incorporation of that signature or information into a document on a second device. Disclosed systems may be adapted for collecting and transmitting electronic signatures or other content related to a need in the medical industry for signing forms, such as but not limited to consent forms, end of life forms, medical orders, data sheets, organ and tissue donor information, information forms, billing information, and/or a variety of other informational forms used in other industries such as financial, design, education, and many others. Content to be collected could additionally include, but is not limited to, professional certification seals of approval and embedded electronic verification biometric data, including but not limited to retina/iris/eye scan, fingerprint, facial profile, picture, and voice.

Disclosed systems may be adapted for collecting electronic signatures, using a means to link one or multiple collecting device(s) with the destination device(s). Collecting devices may include, but are not limited to, a smartphone, iPhone, droid, Samsung phone, Motorola phone, Windows phone, tablet, iPad, Samsung pad, Windows PC with touch screen, any other variety or combination of electronic device with a touch screen capability, and any accessory attached to said device.

Receiving devices include but are not limited to desktop computers, monitors, TVs, video projectors, mobile devices including smartphones and tablet devices, which may or may not lack touch screen, audio recording, or camera or visual recording technology and/or any other technology or sensor generally used on a receiving device.

A unique identifier may be generated on the screen of the receiving device, such as a Quick Response (QR) code, which is captured by the collecting device's camera or other means. Unique identifiers are meant to uniquely link the document, file or other display on the receiving device with the content and/or content generation on the collecting device. Such unique identifiers additionally include but are not limited to logos, pictures, unique sounds, wireless signals, brand, product design features, bar codes, words, numbers, web links, or images.

The process of linking the collecting and receiving devices and the generation of the unique identifier may be enabled by cloud-based applications, other code which may be located on one or both of the devices or on other software applications on a third device or on a system. The collecting device or its accessory uses a built-in camera, RFID, NFC, touch pad, key pad, wireless receiver, microphone and/or other detection methods to acquire the unique identifier, which is processed by the abovementioned software and/or system to establish the device as the collecting device, and the receiving device as the receiving device. All content collected and transmitted may be done using secure protocols, including but not limited to HIPAA-compliant protocols, Https, encryption, and others. Transmission of data may occur using cellular data networks, wireless local area networks (wifi), RFID, NFC, Bluetooth, proximity detection of a chip, verification of a signal on a page, or through being linked into the device, or other short- or long-range wireless and/or wired communication technologies.

The user's primary interface is a web session on the receiving device. The collecting device is merely a means through which additional user input and/or user collected data may be acquired for transmission to the receiving device. In this way, no specific configuration, authentication, software download or other customization is necessary on the collecting device; the system merely creates a temporary link between the collecting and receiving devices to leverage the data acquisition capabilities of the collecting device. For example, a mobile phone (collecting device) may acquire the QR image through a web-based tool that the user can access through a specific URL in order to link the devices. Once linked, transmission of data may occur through secure or encrypted means. This effectively allows for user authentication to occur on the receiving device. For instance, the user signs in to a secure web session, or accesses a web session through a single sign on means on the desktop computer (receiving device). A smartphone (collecting device) is then linked to the web session. Since authentication has already occurred on the desktop computer, no additional authentication is required on the collecting device. In a converse example, the user may authenticate himself using a variety of means on the collecting device. This may be achieved through a passcode, biometric data or other means described herein. After the collecting device is linked to the receiving device, authentication has effectively occurred on the receiving device as well, since the established link is unique. In effect, user authentication is required on only one of the collecting or receiving device, because of the unique link that is established between the two devices.

In one embodiment, the content generated by the user with the collecting device's touch screen can be transmitted to a specific section of a web page or document on the receiving device, such as a signature input box. This can be done in real time to display the image for user visual feedback within fractions of seconds to minutes of input depending on the speed of the connection between the devices and/or system. In another embodiment this function will additionally contain a display on the input device to inform the user what form their signature or other mark is going to be applied to. Additionally, multiple signatures and/or identifying marks may be applied by using one or multiple identifiers. If one identifier is used, the input device may have several screens that can be filled out, or the input device may have buttons that input data from individual input boxes as the buttons are activated to switch between input areas of the form being filled out.

Use of the system is not limited to the medical field and could have utility in other fields, such as government, social networking, approval of engineering design drawings, approval of project management hierarchy, financial transactions, education, and/or banking for e-signature of statements from machines like ATMs, gas station pumps, grocery pumps, vending machines, loan machines, cloud access via the Internet on any device, and many other areas. A variety of different forms and formats, such as pdf, tiff, html, apps, stp, CAD, and other forms and formats may be used with this signature and/or mark function. Many various embodiments may be generated, containing a means for electronically interfacing a touch enabled device that can be signed and generate an electronic signature file and a device or system that will use that electronic signature file.

In order to ensure secure, authenticated collection, transmission and receipt of content, an additional confirmation could be sent to the collecting device in the form of an email, text message, call, or other means to communicate their signature and/or get confirmation of that signature. Extra security features may be included, such as, but not limited to GPS verification and/or date and timestamp of the use of the collecting device, and/or selective enabling of IP addresses once approved to have this e-signature capability.

Extra security features could also serve a dual purpose of being able to identify the wishes of the person applying a signature in addition to authenticating the person was the person signing the form. In addition, this information could be used to ensure that the person was not being coerced or under the influence of substances when signing a form with one or more of many combinations of sensors and input features on an input device. This could be especially important in the case of a last will and testament and/or a living will for a family such but not limited to a POLST form. The ability to link a video and/or audio feature with a document such as a POLST form will give families and/or proxy decision makers additional information regarding the wishes of the person who signed the form and is unique and has not ever been currently offered in any single place.

In some embodiments, a collecting device is linked to a receiving device by a unique identifier. Such unique identifiers include, but are not limited to a Quick Response (QR) code, a bar code, string of alphabetical and/or numerical characters, images, trademark images, brand images, audible or inaudible sound from a speaker, phrases or any other unique image, signal, or code displayed by a device or system, such but not limited to a desktop, requesting to be linked to another device. The unique identifier is displayed on the receiving device. The collecting device acquires the unique identifier. For example, the receiving device may capture an image of the unique identifier using a built-in or accessory camera. Alternatively, a user may manually enter the code displayed on the receiving device using the keypad of the collecting device. Alternatively, the unique identifier may be displayed on the collecting device and acquired by the receiving device.

In some embodiments, a unique identifier is generated by an algorithm, program, or software which may reside on the receiving device, collecting device, or on an alternate location, including but not limited to a server or third device. The unique identifier may be specifically generated for a single session between the receiving and collecting device, or be used to link the two devices on a long term basis. Auxiliary services for generating or reading the unique identifier may be utilized, for example a third-party QR reader or a web site with the capability of activating a smartphone's camera to capture and/or process the QR code or unique identifier image.

Communication between devices occurs through a wireless or wired connection, including but not limited to the Internet, wifi, Bluetooth, radio waves, microwaves, or other electromagnetic waves capable of transmitting data.

Once linked, data acquisition occurs on the collecting device and is sent to the receiving device. The collecting device may collect any type of data, including but not limited to images or text generated through a user touching a touch screen, typed data from a keypad, sound captured from a microphone, pictures or video captured from a camera, or other information recorded from a sensor such as a RFID, infra-red sensor, magnetic sensor, or other means. Such data acquisition features may be built-in to the device or add-on or peripheral devices.

The data may be sent from the collecting device to the receiving device instantaneously or stored on the collecting device or an intermediate device until a later time.

The user or users will acquire data using the collecting device and direct its placement to the receiving device. For example, if the collecting device is used to collect a signature generated from its touch screen, the user may direct where the signature image is to appear on the receiving device. In this instance, the user may select a place on a document they are viewing or editing on the receiving device for the signature to appear.

In some embodiments, a receiving device may also direct the type of data to be collected by the collecting device. For example, if a user opens a web page on the receiving device whose purpose in part or in whole is to contain a picture, the receiving device may remotely activate the camera on the collecting device to capture the desired image. If there is a web page on the receiving device whose purpose in part or in whole is to collect a sound recording, the receiving device may remotely activate the microphone. If there is a web page on the receiving device whose purpose in part or in whole is to collect a signature, the receiving device may remotely activate a blank web page or otherwise activate the touch screen in order to collect the signature from the touch screen.

The mobile device, once linked to a web session, may be a duplicate screen experience for the web session or it may be display only discrete elements of functionality that the web session requests of the mobile device. These discrete elements of functionality may include having the web session activate, for example, the camera, fingerprint scanner, microphone, speakers, flash, GPS, accelerometer, touchscreen, heartbeat scanner, infra-red scanner, LED, proximity sensor, or any other data capture sensor or sensors that the mobile device has built in or attached to itself.

The linked web session display on the mobile device can change automatically based on the user commands on the receiving device that is displaying the web session that originally displayed the linking QR code or other linking mechanism. As the user transitions from page to page within the web session on the desktop (receiving) device, different functionalities specific to each page are activated on the mobile (collecting) device. As such, the mobile device becomes an auxiliary data capture tool once it is linked to the web session. The activation of these data capture elements may occur one at a time or several at a time as desired by the design of the website.

The data capture elements may be activated by the user clicking on the web session such as in an address bar or on an activate feature button or it may be done passively when a user arrives at a particular web page or section thereof. Moving between web pages, sections of web pages, or clicking on different features or functionality within the web session automatically requests and activates the data capture elements of the mobile device to serve as the input into the web session no matter if the input arena is displayed currently on the main device web session or not. In the event that the display is currently displayed on the main device's web session when the data capture elements are activated then the data capture event will occur on the mobile device and display the captured data on the main device's web session concurrently or after some time due to purposeful programmed delay or network lag.

Alternatively, the user may select the desired functionality for data acquisition through an app, web page or other means on the collecting device, or through an application, web page or other means on the receiving device, including but not limited to mouse clicking icons that direct the type of data to be collected, using mouse clicks to direct the location of data on a web page, document or other digital media on the receiving device.

In the instance of a signature being collected, the collecting device may also collect specific aspects of how the signature was generated to serve as an authenticator of a genuine signature being generated. For example, the speed at which the user's finger glides across the touch screen throughout the generation of the signature image may have properties that tie the signature image uniquely to the signer. Additionally accelerometer measurements may be recorded to show that it is the finger and/or the phone that is in motion. Alternatively, acquiring data as to the variations in glide properties, trajectories, fingerprint, and/or the finger pressure of the user may simply attest to the fact that a signature was generated by the user and not simply an image copied onto the page. Other biometric data to record during a signature or operation of the linked device by a user may include but not limited to conductance, capacitance, electromagnetic wave proximity, sound produced, and/or the electrical resistance.

Figure 1B:
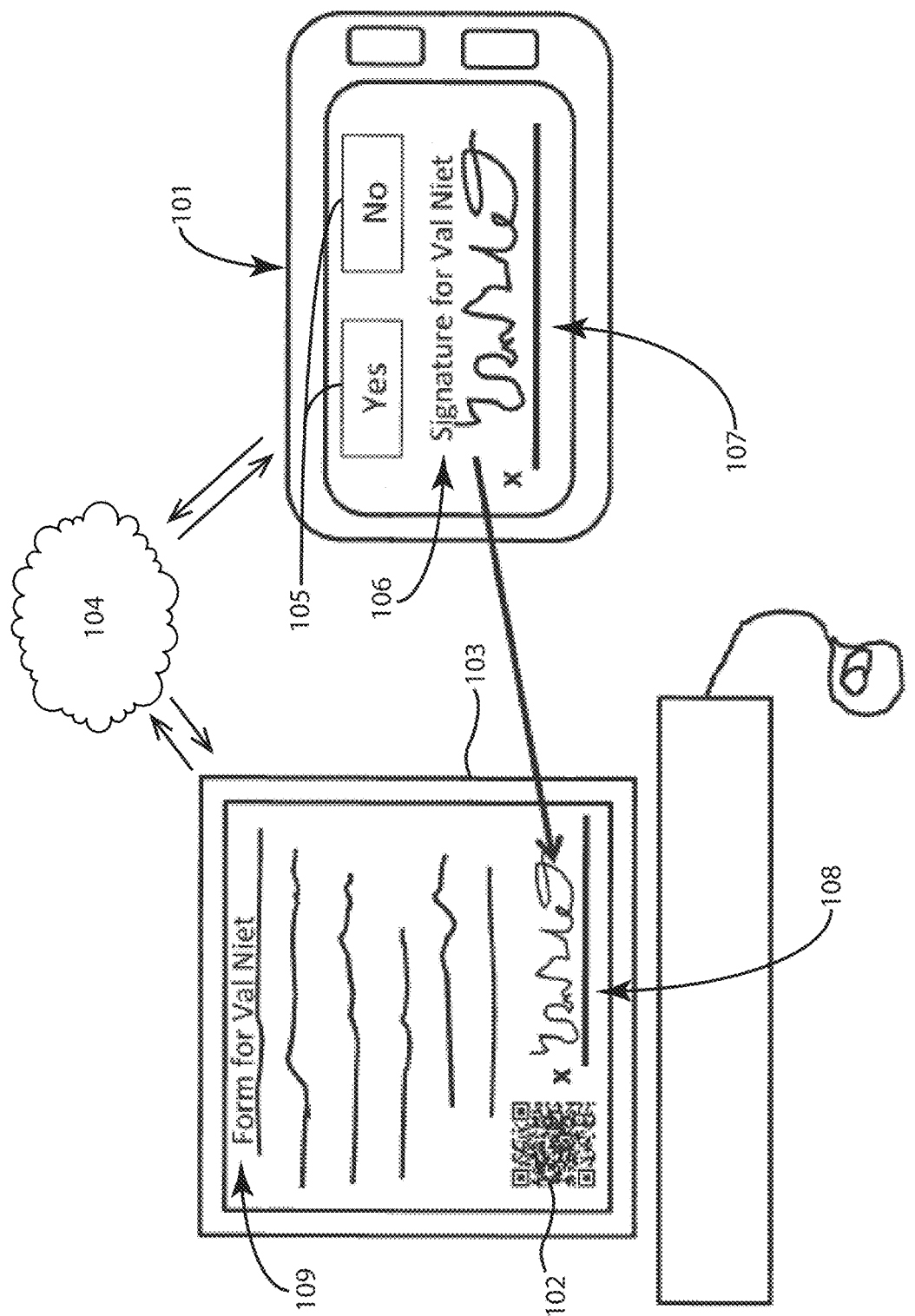
FIG. 1B is a diagram of an exemplary system and touch device where the signature has been linked into the electronic form identified by the QR code.

FIGS. 1A-1B show an exemplary system and devices for using a means to link such as a QR code 102 to link a receiving device 103 with a collecting device 101 for inputting a signature on a collecting device with a touch screen such as a tablet and/or smartphone 101. The receiving device 103 displays the QR code 102 to link the collecting device 101 over the system allowing wireless communication between the devices and a repository for information 104. In this case the collecting device displays a signature input area 107 and an identifier for the form that is being signed 106 and a confirmation feature to confirm 105 that the signature is to be transmitted to the system 104 and then display on the form showing on the receiving device 103. The receiving device also may or may not display a label 109 matching the one on the collecting device 106 to identify the correct form. As well the signature, once transmitted will be visible in the signature area on the receiving device 108.

Figure 2A:
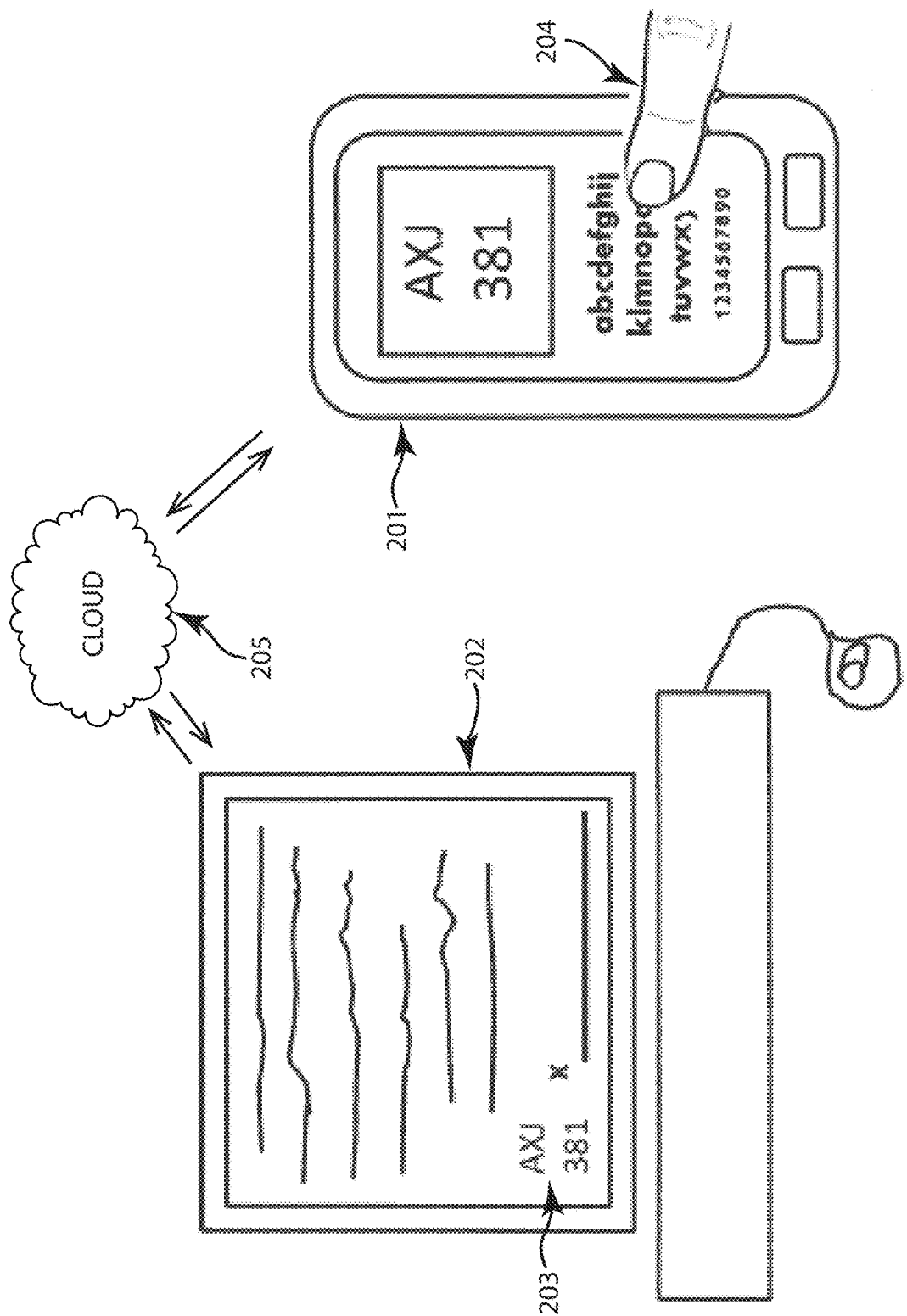
FIG. 2A is a diagram of an exemplary system and touch device that allows for scanning of a manually inputted identification code to identify the electronic form for signature input.
Figure 2B:
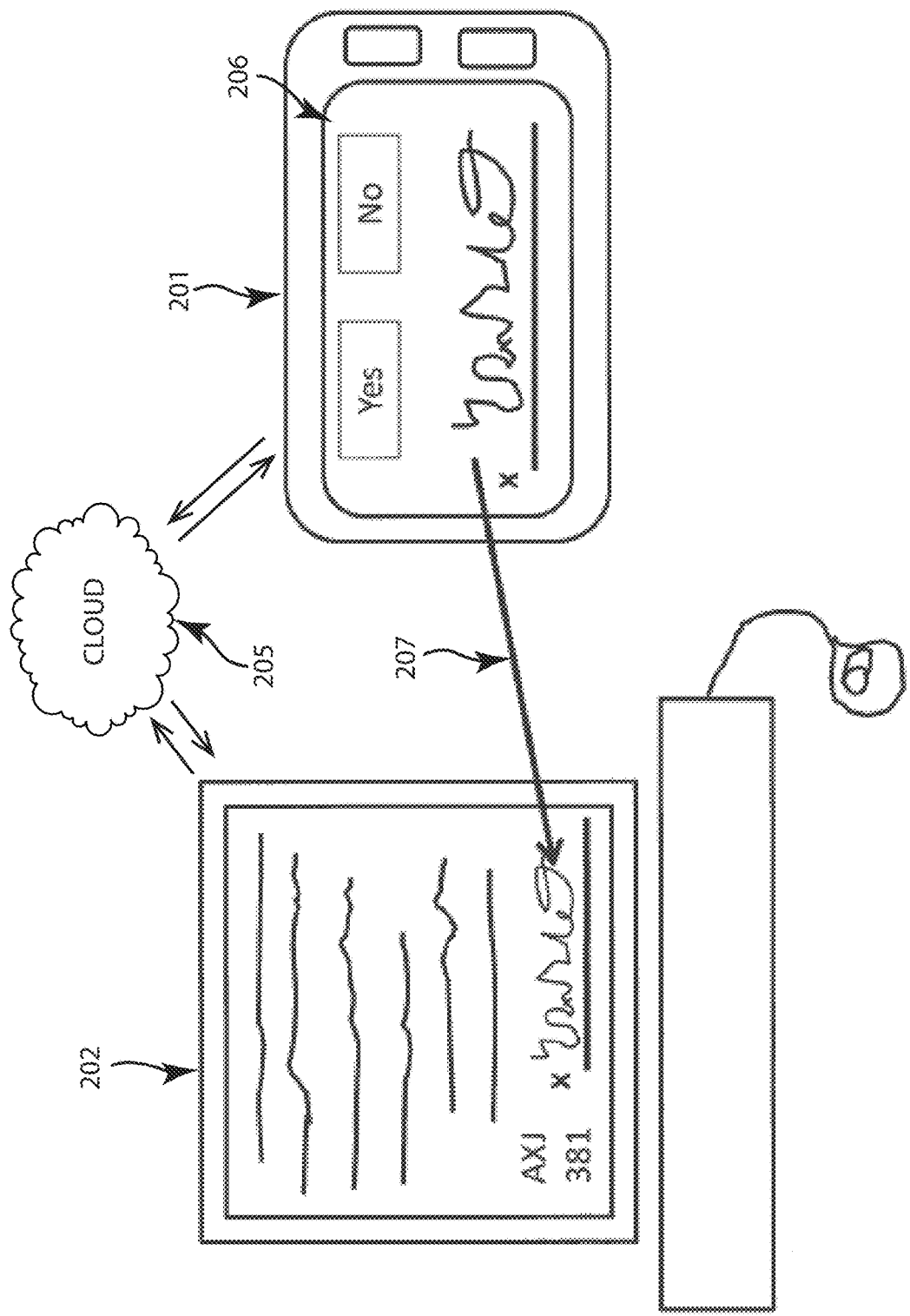
FIG. 2B is a diagram of an exemplary system and touch device where the signature has been linked into the electronic form identified by the manually inputted identification code.

FIGS. 2A-B show an exemplary system in which the collecting device 201 is linked to the receiving device 202 by an alphanumeric code 203 generated on the receiving device and manually entered by the user 204 on the collecting device. This accurately links the collecting and receiving devices, via the cloud 205. The collecting device then generates an image of a signature pad with "Yes" and "No" buttons 206 to accept or decline the user-generated signature image. The signature image is collected on the collecting device 201 and transmitted 207 via the cloud to the receiving device 205.

Figure 3A:
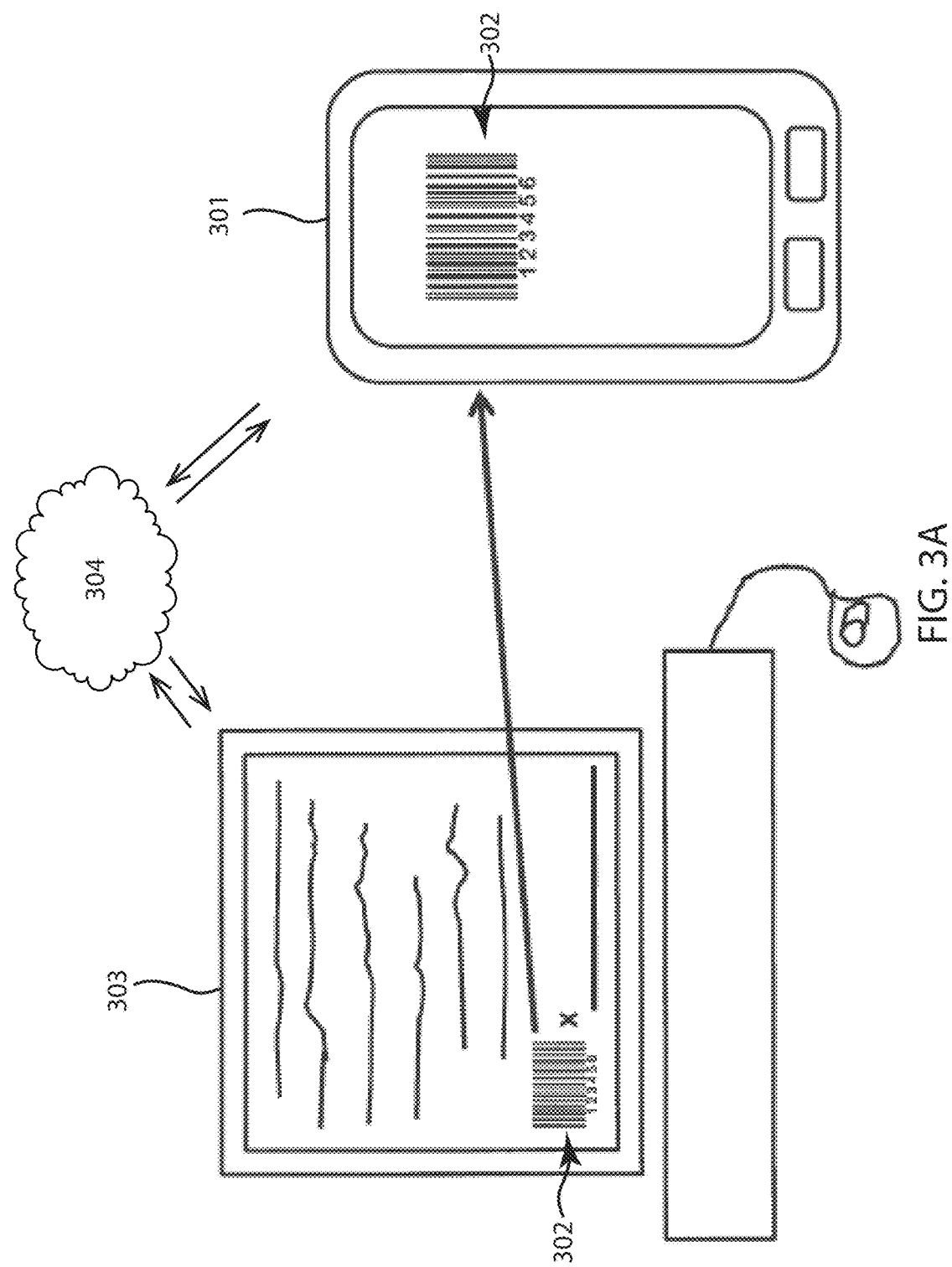
FIG. 3A is a diagram of an exemplary system and touch device that allows for scanning of a bar code to identify the electronic form for signature input.
Figure 3B:
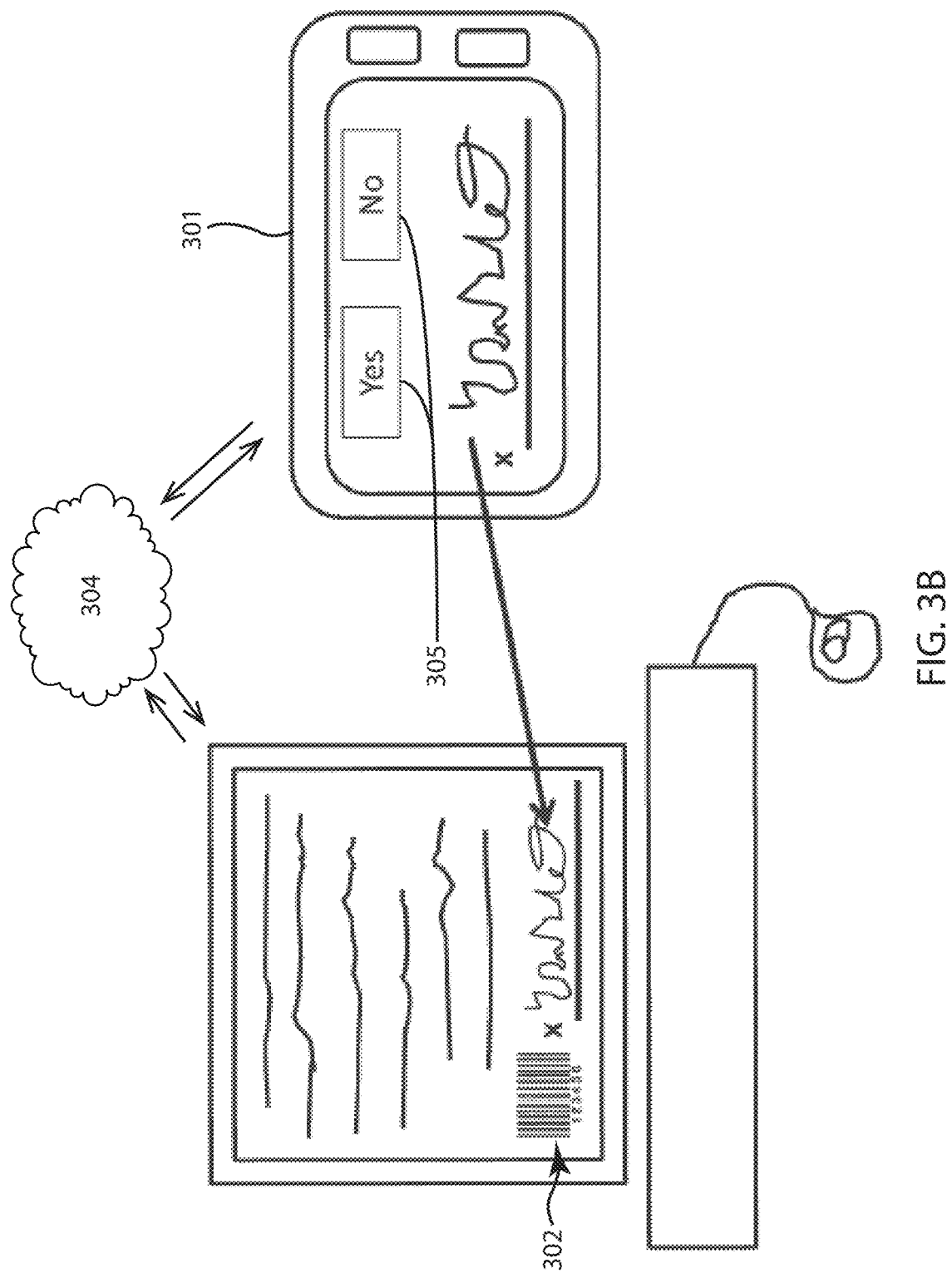
FIG. 3B is a diagram of an exemplary system and touch device where the signature has been linked into the electronic form identified by the bar code.

FIGS. 3A-3B show an exemplary system and devices for using a means to link such as a bar code 302 to link a receiving device 303 with a collecting device 301 for inputting a signature on a collecting device with a touch screen such as a tablet and/or smartphone 301. The receiving device 303 displays the bar code 302 to link the collecting device 301 over the system allowing wireless communication between the devices and a repository for information 304. As well there is also a means to input a signature and accept the signature 305 similar to FIG. 1A-B.

Figure 4A:
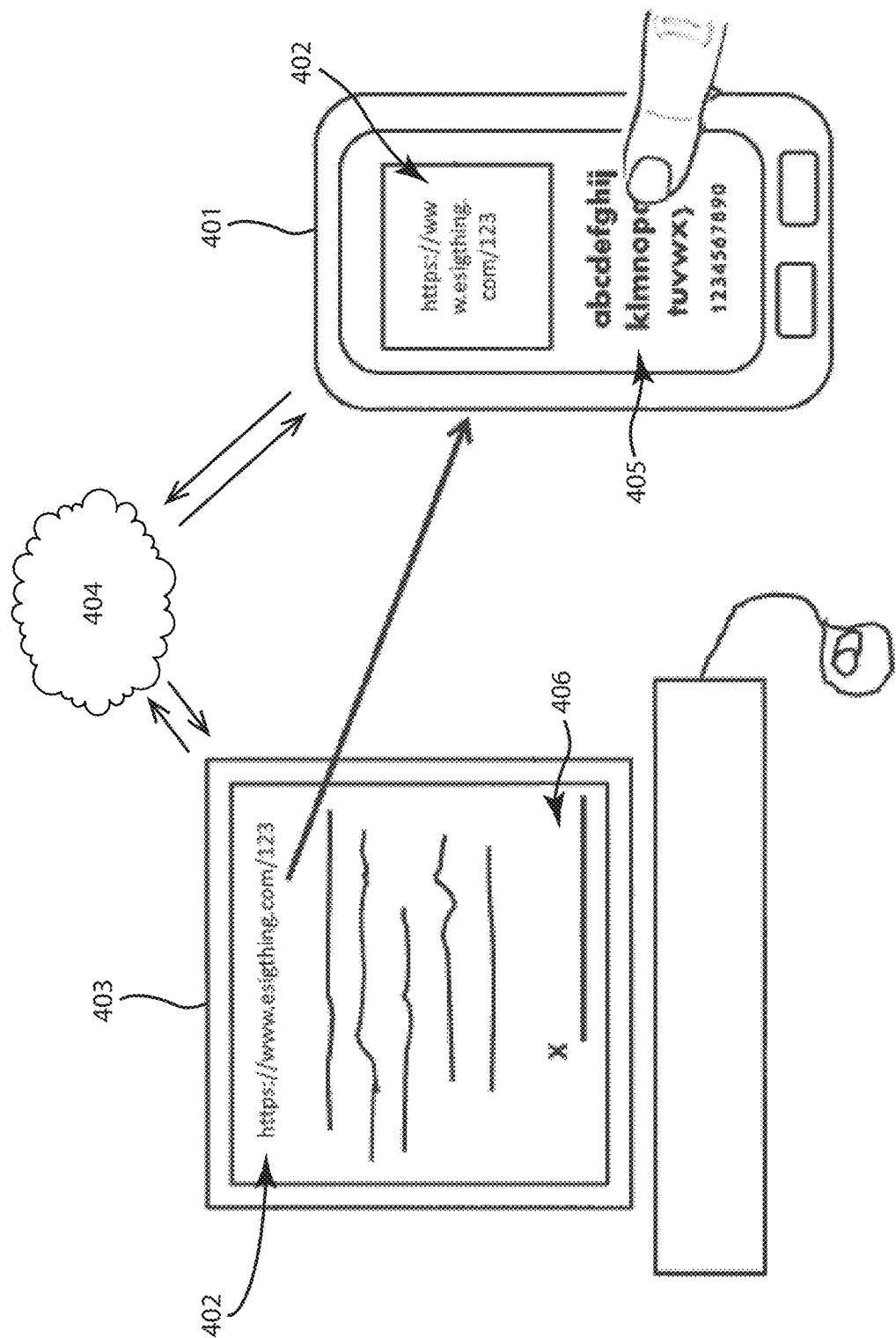
FIG. 4A is a diagram of an exemplary system and touch device that allows for input of a secure web link to identify the electronic form for signature input.
Figure 4B:
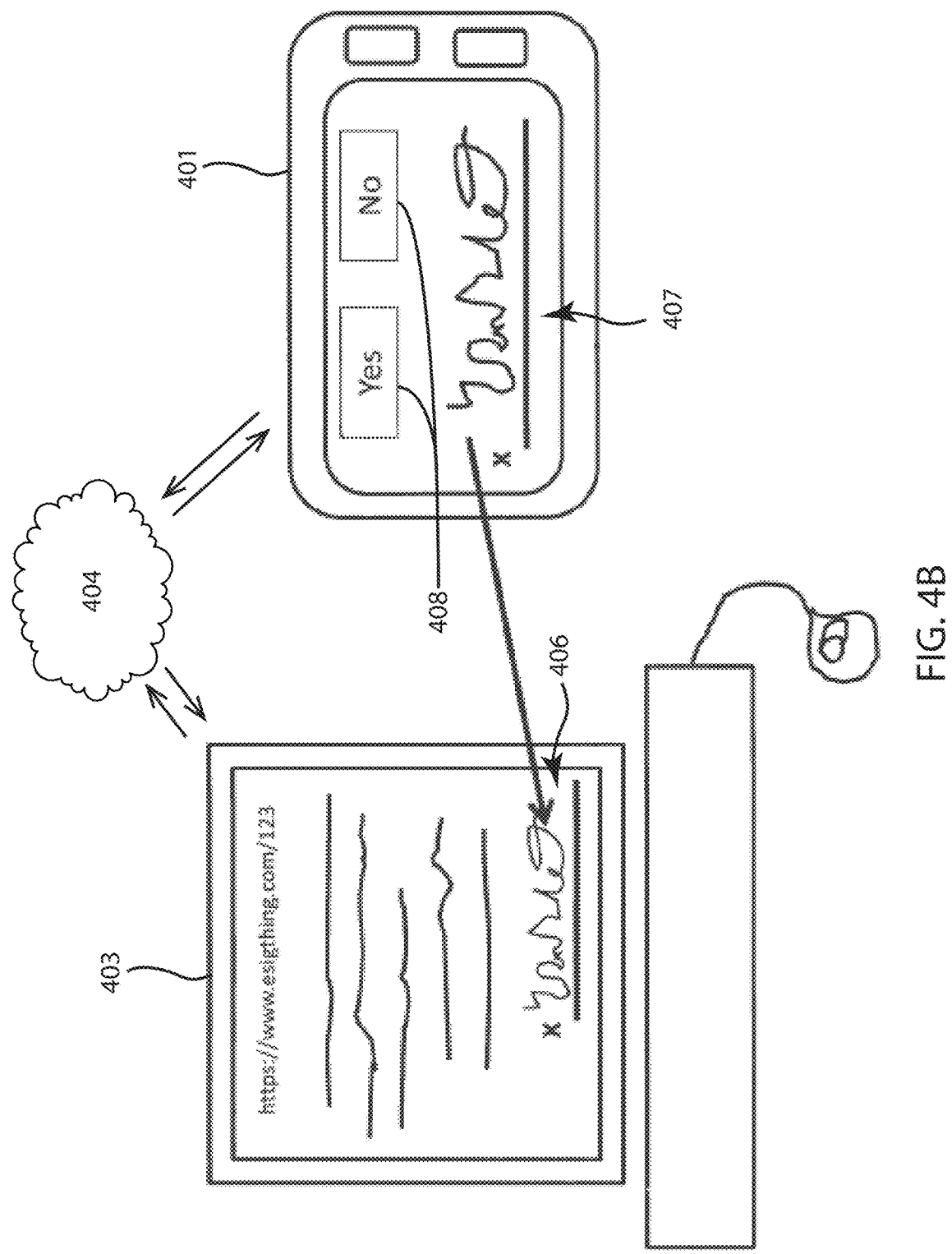
FIG. 4B is a diagram of an exemplary system and touch device where the signature has been linked into the electronic form identified by the secure web link.

FIGS. 4A-4B show an exemplary system and devices for using a means to link such as a web address 402 to link a receiving device 403 with a collecting device 401 for inputting a signature on a collecting device with a touch screen such as a tablet and/or smartphone 401. The receiving device 403 displays the web address 402 to link the collecting device 401 over the system allowing wireless communication between the devices and a repository for information 404. On the collecting device 401 a input feature such as a keypad or touch pad with letters and numbers 405 may be used to input the web address 402. There also exists a means to display the signature on both the collecting device 407 and receiving device 406. This display of the signature could take place as soon as it is signed pending the real time transfer of information across the system 404 or it could require the acceptance of the signature 408 if desired.

Figure 5A:
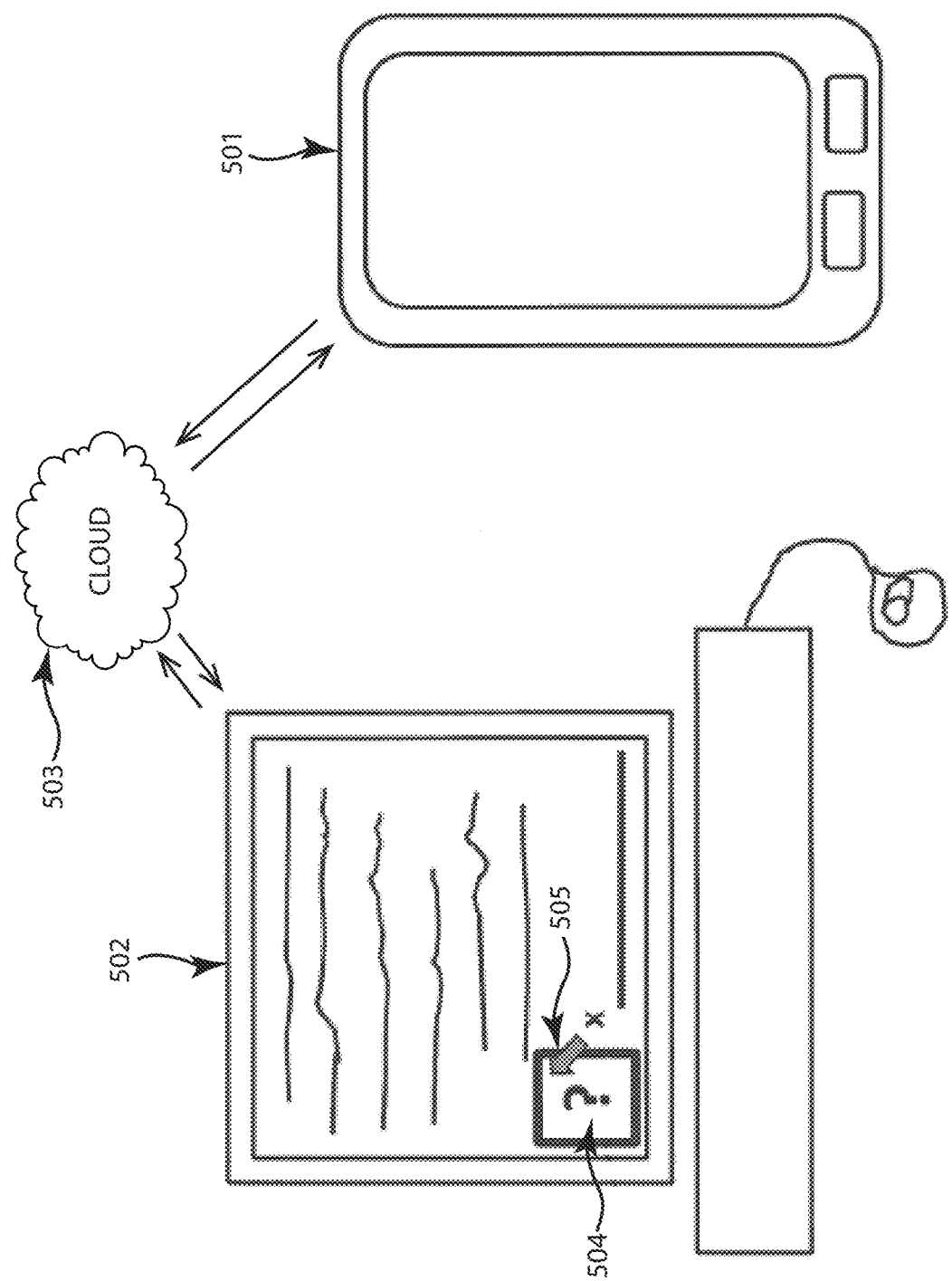
FIG. 5A is a diagram of an exemplary system and touch device that allows for input of a QR code to identify the electronic form for signature input while a countdown timer is active.
Figure 5B:
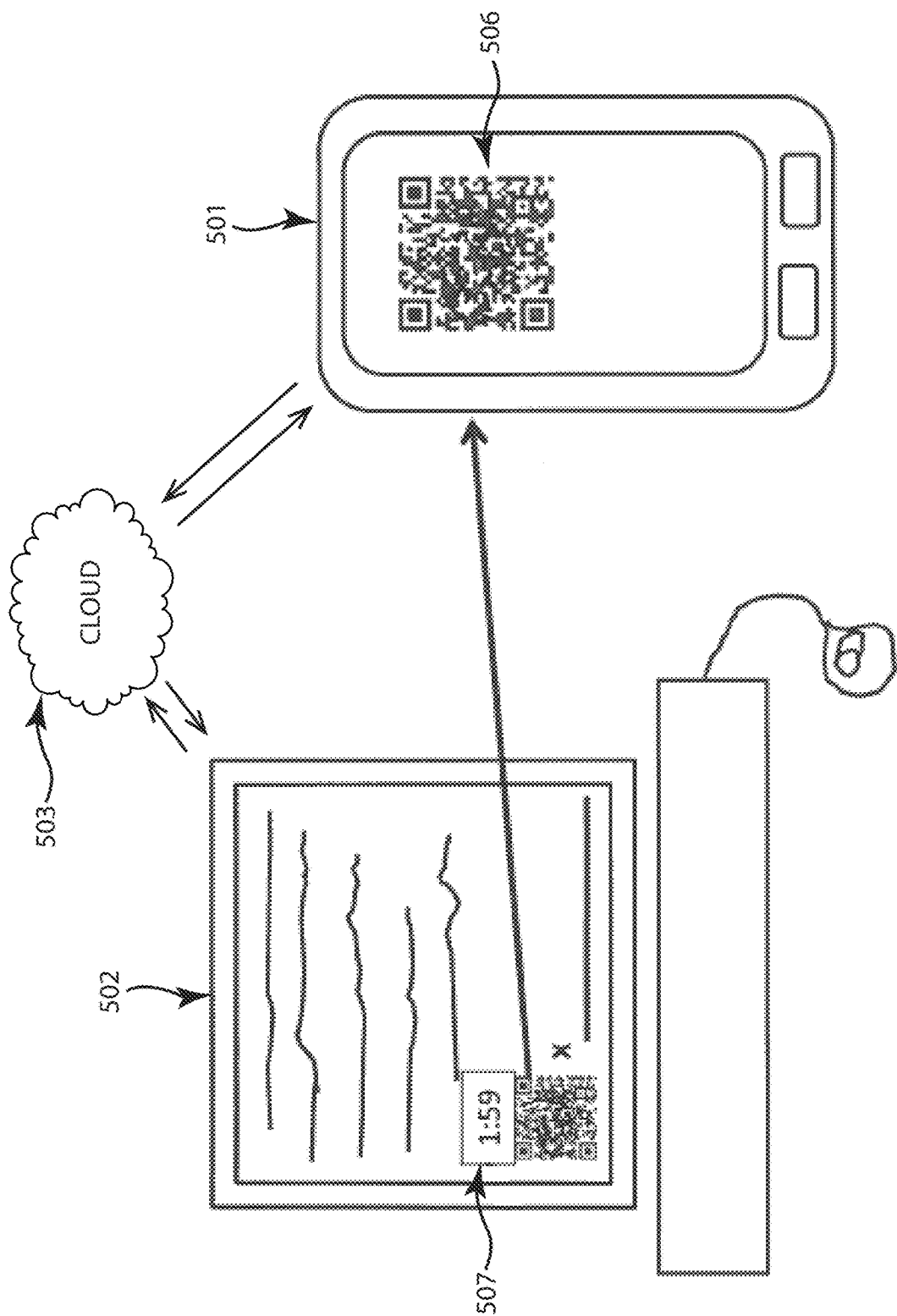
FIG. 5B is a diagram of an exemplary system and touch device that allows for scanning of a QR code to identify the electronic form for signature input but only while a countdown timer has enabled access.
Figure 5C:
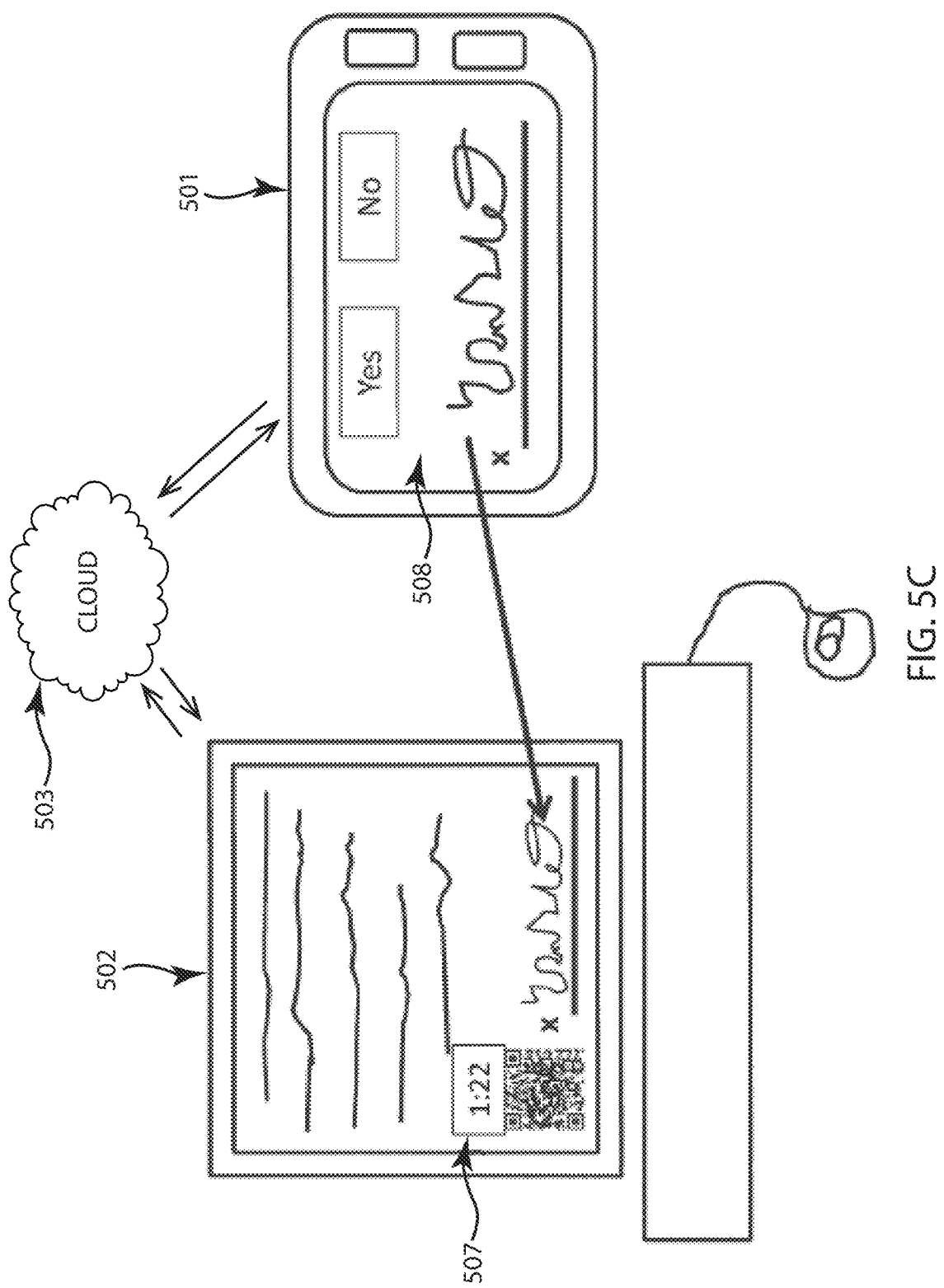
FIG. 5C depicts an exemplary system and touch device where the signature has been linked into the electronic form identified by the QR code that has only enabled access while a countdown timer is active.

FIGS. 5A-C show an exemplary HIPAA-compliant system comprising a smartphone functioning as the collecting device 501, a desktop computer functioning as the receiving device 502 and interfacing cloud 503. The unique identifier on the receiving device is blocked from view 504 until activated by a mouse click 505. The mouse click releases the unique identifier into view, in this instance a QR code, which is captured by the camera of the collecting device 506, thereby uniquely linking the devices via the interfacing secure cloud 503. The QR code and the linkage it provides is valid for a limited time, denoted by the timer displayed on the receiving device 507. The collecting device then generates an image of a signature pad with "Yes" and "No" buttons 508 to accept or decline the user-generated signature image. The signature image is generated by the user on the touch screen of the collecting device 201 and transmitted via the cloud 503 to the receiving device 502.

Figure 6:
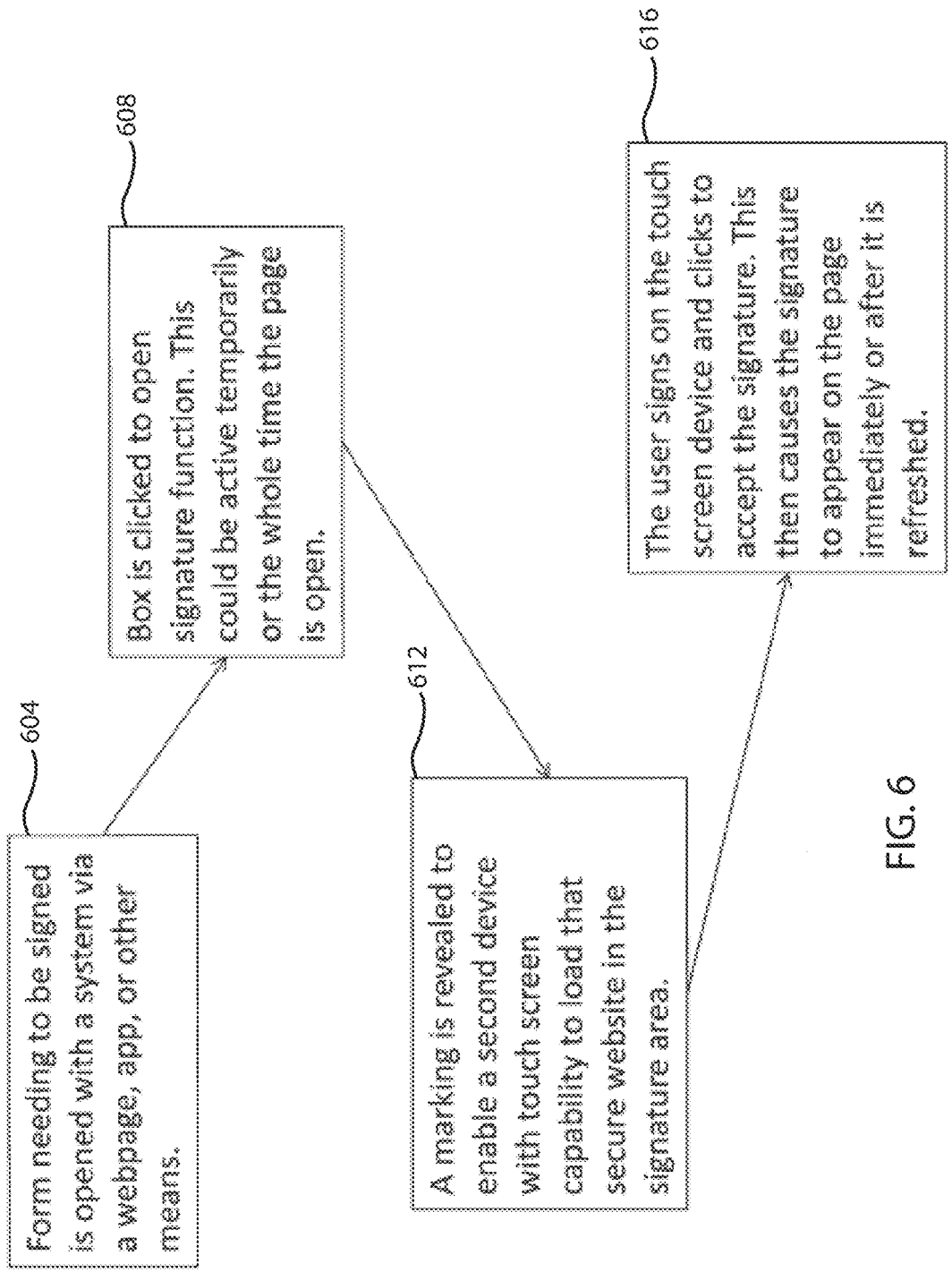
FIG. 6 is a flow diagram illustrating a method for uploading an electronic signature from a touch enabled device to a system, according to one embodiment.

FIG. 6 shows a system and method for input of a signature onto a form. First, in operation 604, a form needing to be signed is opened with a system via a webpage, app, or other means. Then, in operation 608, a box is clicked to open the signature function or the signature function is already open and available once the system opens the form. In operation 612, a marking may be revealed when the box to open the signature function is clicked or this marking may be present upon opening of the form to begin with. This marking is used as a unique identifier to link the collecting device, system, and receiving device. The collecting device uses the linking icon to link through the system. In operation 616, the signature is input on the collecting device after it is linked and the signature is transmitted to the system that transmits it to the receiving device. The receiving device then displays the signature in the box immediately, after the page is refreshed, and/or after a acceptance box is clicked on the receiving device and/or the collecting device. This acceptance box may identify the collecting device by an IP address, name, time, GPS stamp, or other identifier.

Figure 7:
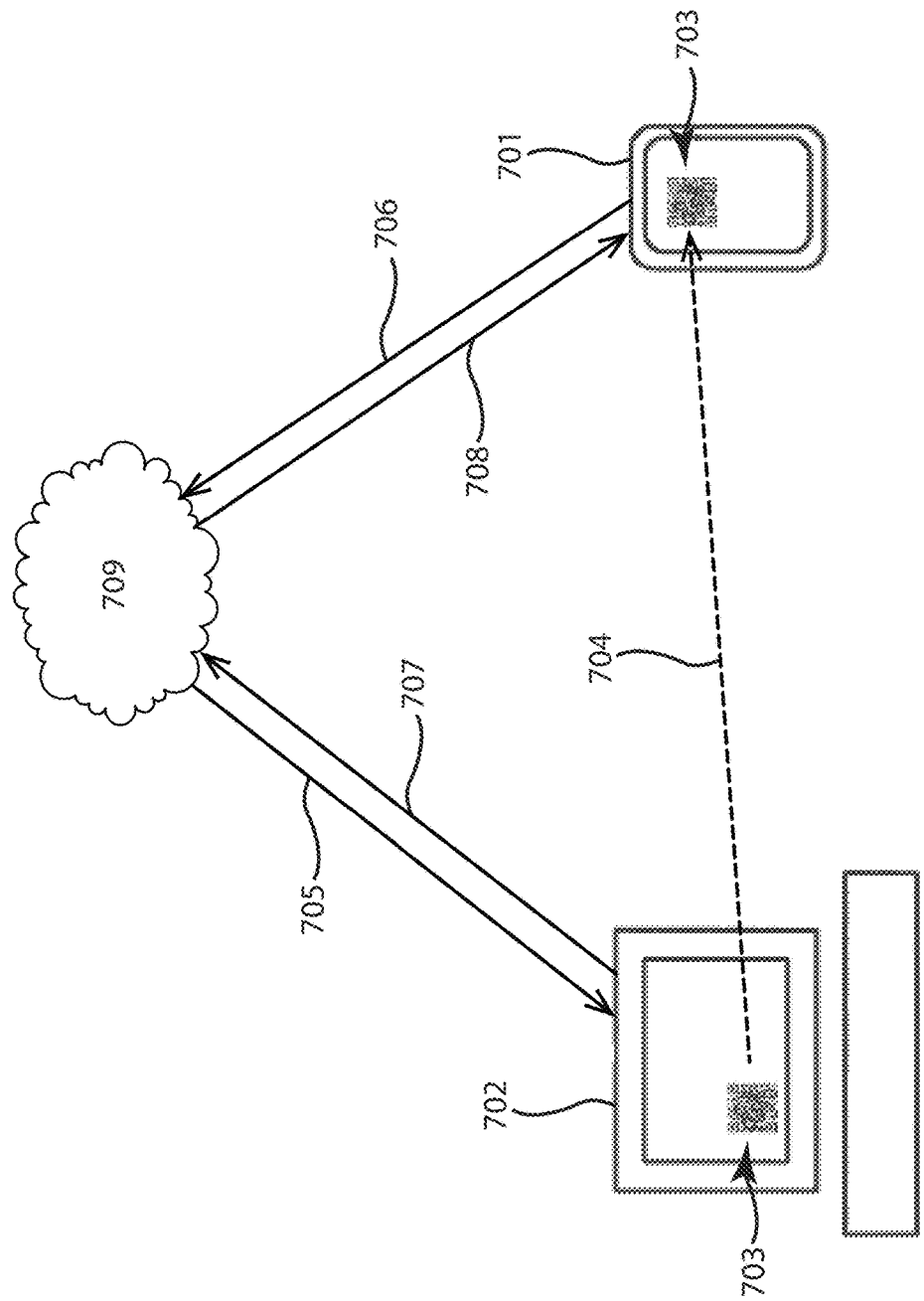
FIG. 7 depicts a system for interfacing a collecting device and a receiving device for the purpose of transferring user-generated or other content, according to one embodiment.

FIG. 7 shows an exemplary system 709 and devices 701 & 702 for filling out and displaying a signature through an identifier 703 that allows the devices to link to each other's display through a system 709. The receiving device 702 transmits a request to the system 707 to display a form. This request could be placed within the hardware of the receiving device 702 itself as the system or to a cloud computing area or internet 709. The communication is returned 705 in the form of a displayed form with a identifying mark or code such as a QR code 703. Then a collecting device 701 such as a tablet or smartphone is used to identify 704 the identifying mark 703 with a barcode scanner, camera, or other device to securely communicate with the system to request access 708 to the signature box of the form. Once access is granted by the system 706 the collecting device can use its sensors, touch screen, microphones, camera, or other functions to add audio, video, images, signatures, drawings, identifying biometric data, accelerometer, GPS sensor, compass, and/or any other identifying information accessible by the collecting device to be sent to the system 708 who then sends the information with or without confirmatory approval by one of the devices to the form displayed on the receiving device 702. This form, once completed, is then able to be sent to the system 707 and dispersed as needed to other devices.

Figure 8A:
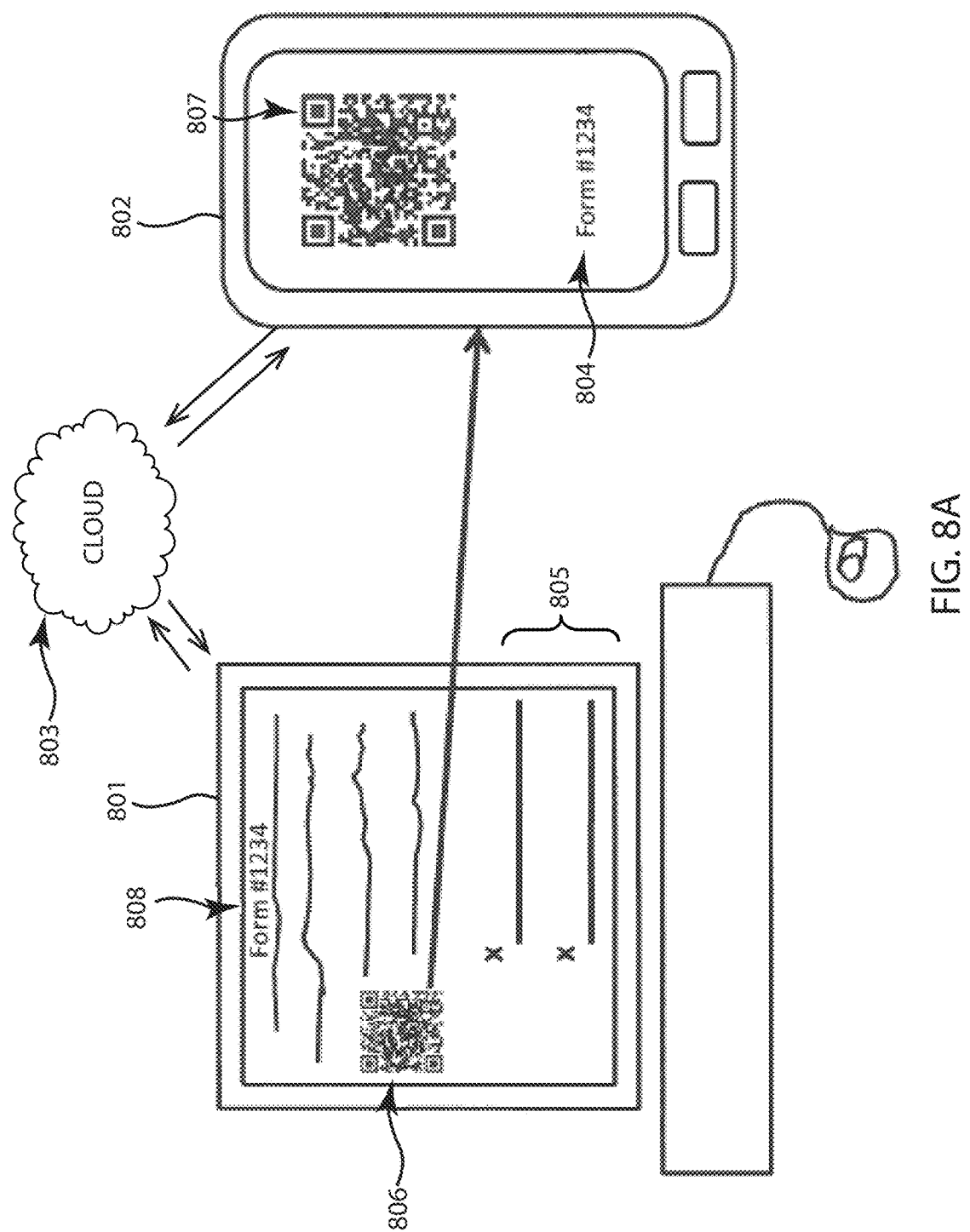
FIG. 8A depicts an exemplary system in which a unique identifier securely links a collecting and receiving device.
Figure 8B:
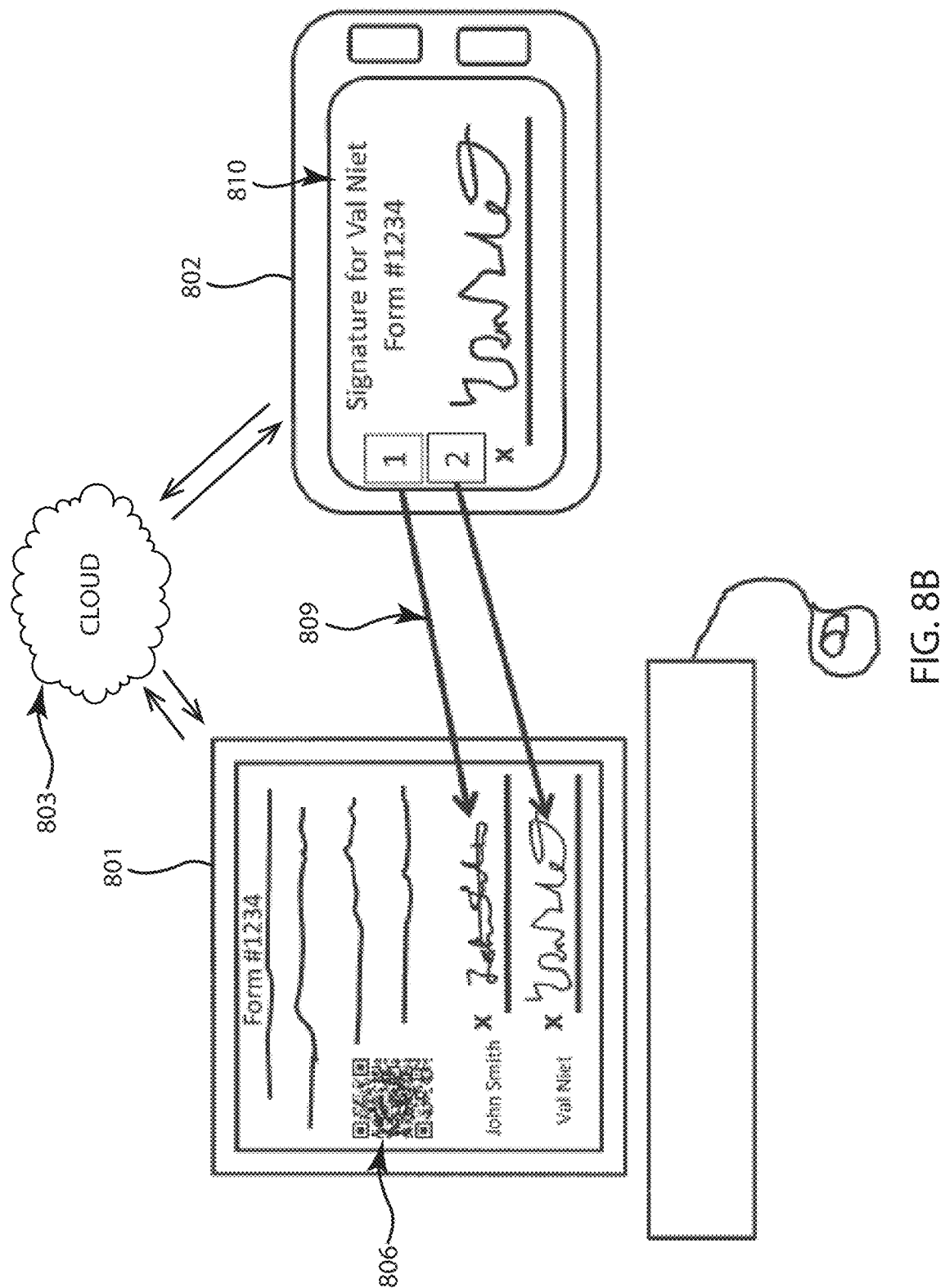
FIG. 8B depicts an exemplary system in which multiple signatures can be collected and accurately directed to different signature areas on the receiving device.

FIGS. 8A-B shows an exemplary system comprising a desktop computer functioning as the receiving device 801, a smartphone functioning as the collecting device 802, and an interfacing cloud 803. A QR code serves as the unique identifier which is displayed on the receiving device 806 and captured by the camera of the collecting device 807. Once captured, the unique label of the page on the receiving device 808 is then displayed on the collecting device 804. The page on the receiving device has two signature fields requiring completion 805. The collecting device then generates an image of a signature pad with "1" and "2" buttons indicating 809 allowing the user to select which signature field to complete. Simultaneously, the corresponding name of the signer, previously entered on the receiving device, is displayed on the collecting device to ensure accuracy 810. The signature image is generated by the user on the collecting device 802 and transmitted via the cloud 803 to the receiving device 801.

Figure 9A:
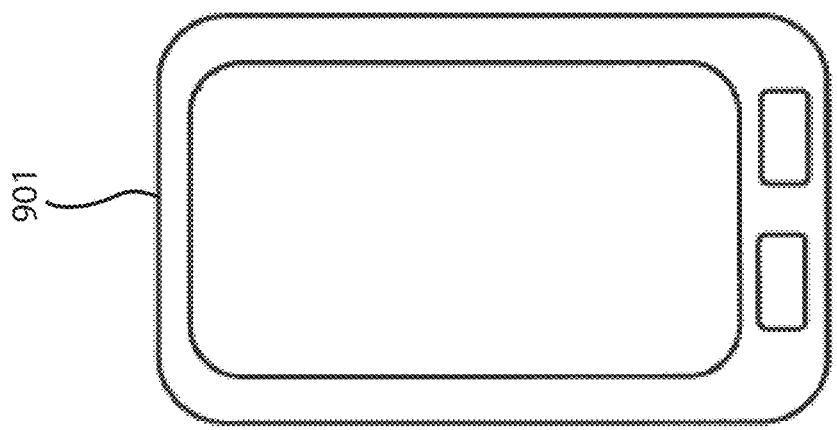
FIG. 9A depicts an exemplary system in which the unique identifier is not displayed until activated by a mouse click.
Figure 9A:
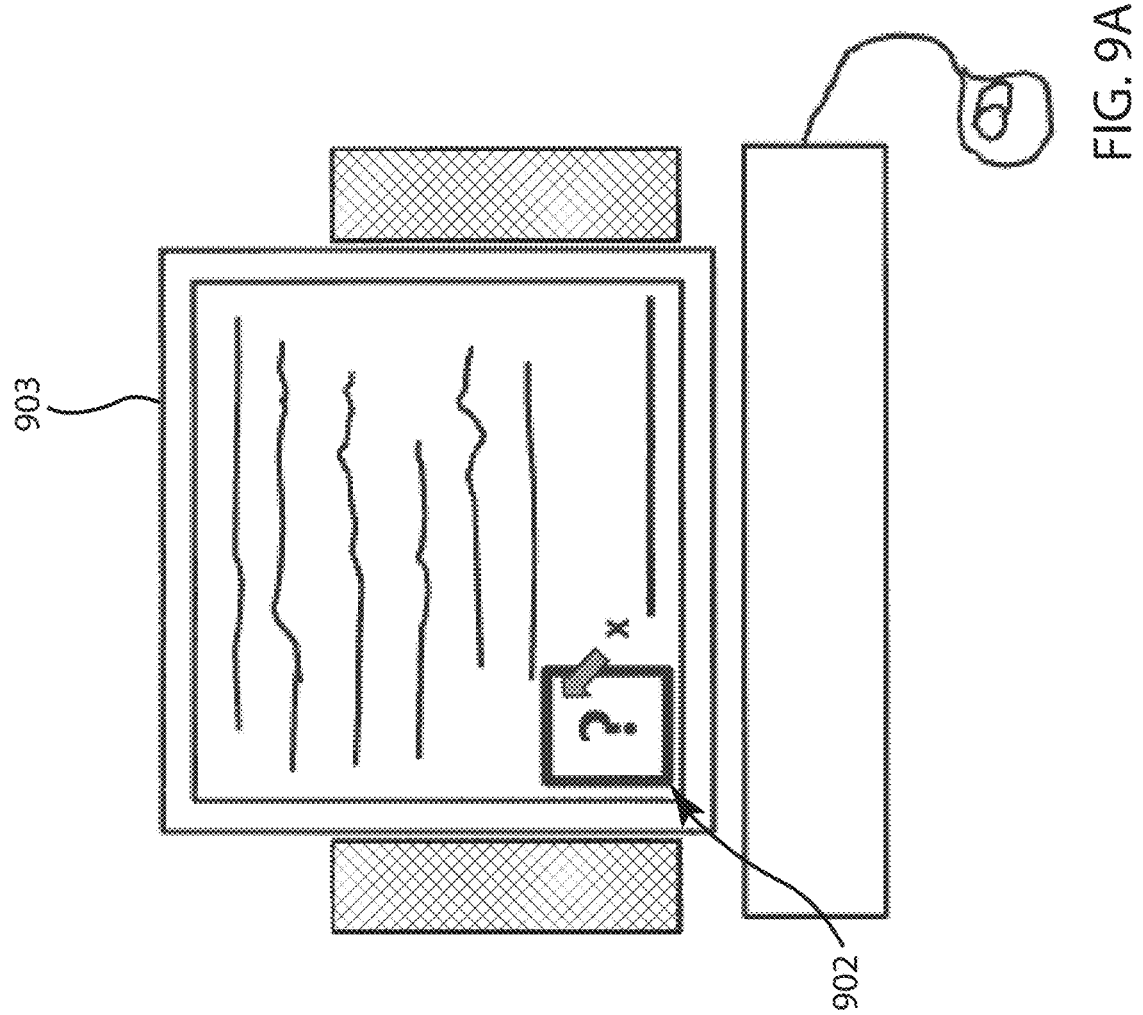
Figure 9C:
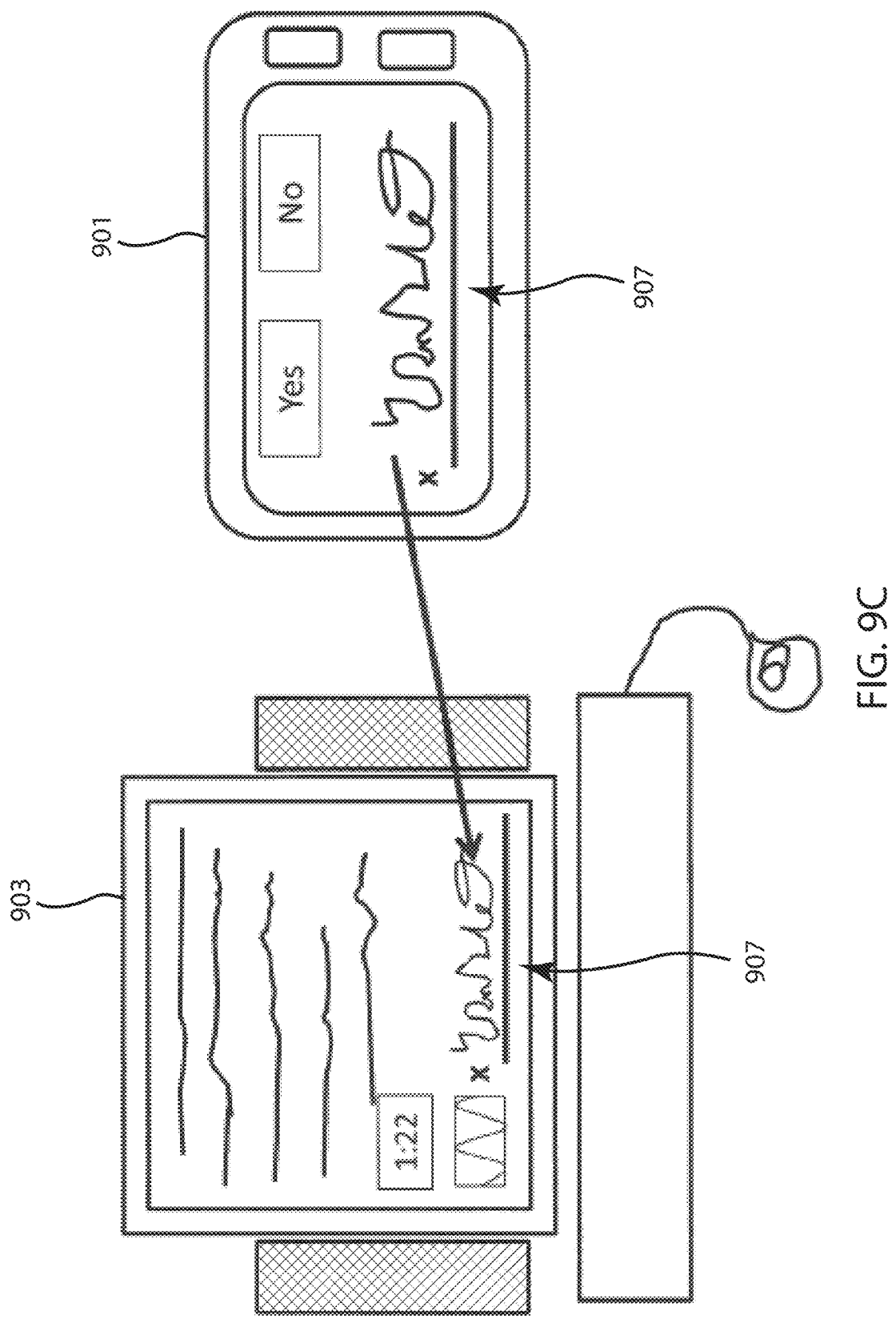
FIG. 9C depicts an exemplary system in which a confirmatory signal is generated by the receiving device once a link is successfully established with the collecting device.

FIG. 9A-9C show an exemplary system and devices for adding a signature 907 to a form. A receiving device 903 displays a form and an icon that can be activated 902. Once this icon is activated 902 the receiving device 903 gives off a signal 905 which can be measured, received, and/or captured 906 by a collecting device 901. This signal may be given off as long as the form is active or for only a short period of time indicated by a timer 904. This signal could be audio, visual, audible, or inaudible. Examples may be ultrasound, audible signals, Morse code, QR codes, bar codes, images, captcha, blinking lights, or other signals visual or audio.

Figure 10:
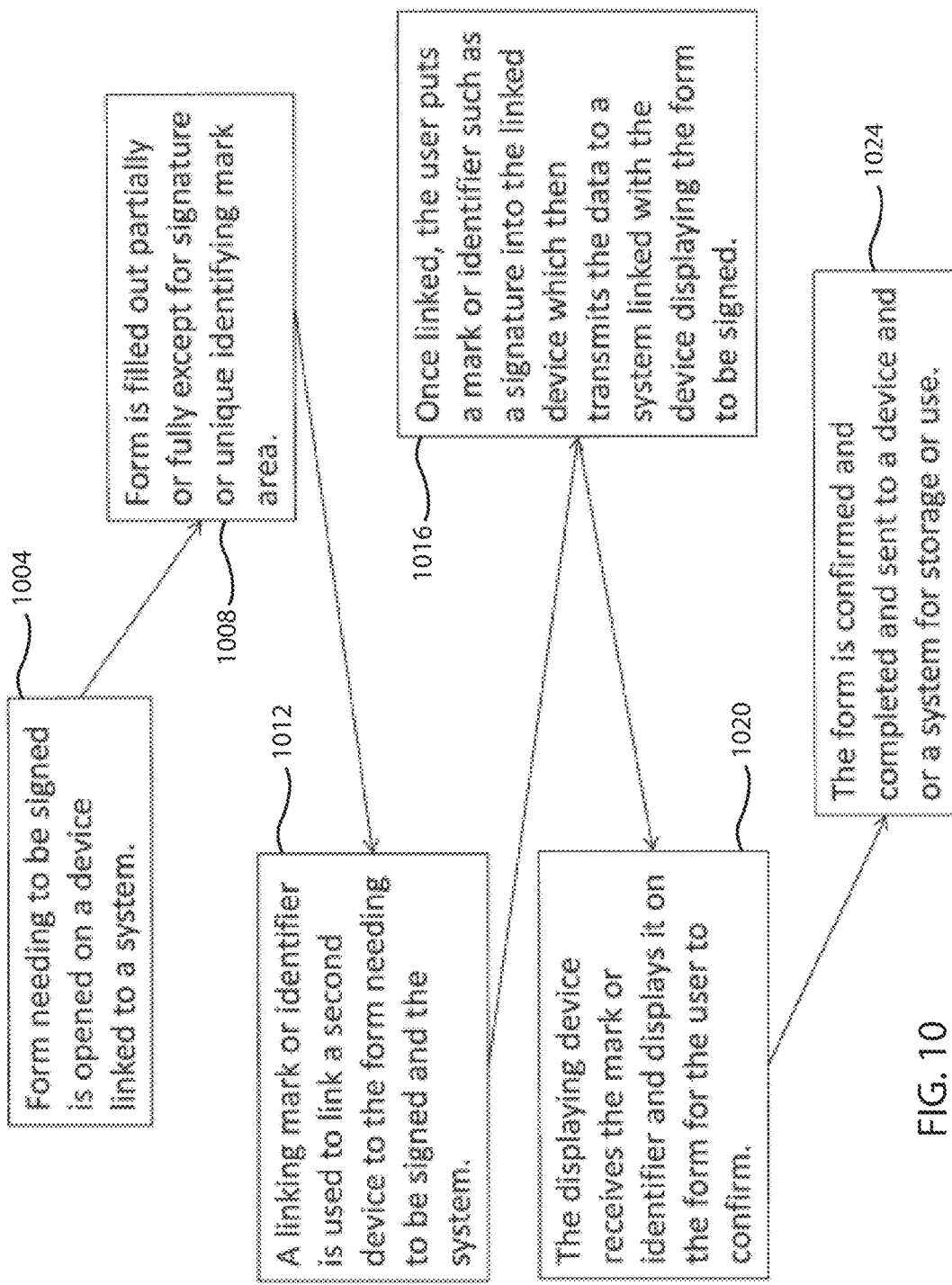
FIG. 10 is a flow diagram illustrating a system in which an electronic signature may be collected on one device and transmitted to the receiving device displaying the form requiring signature, according to one embodiment.

FIG. 10 shows an exemplary system and method for adding a signature to a form by an identifying mark or signal that facilitates the access of a collecting device to a receiving device through interactions with a system. Initially, in operation 1004, a form needing an identifying signature, image, video, or mark is opened on a receiving device. In operation 1008, the form is filled out some or not at all by the existing functionality on the receiving device such as but not limited to utilization of a mouse and keyboard. In operation 1008, a linking mark or identifying signal is then used to securely link a collecting device to the form displayed on the receiving device through interactions with a system. This linking signal or mark may be activated for a short time or throughout the whole time the form is displayed by the receiving device. In operation 1012, this linking signal or mark is used to identify the secure link from an access of a signature collecting device. This collecting device uses the existing touch capabilities and/or the sensors and features of the collecting device to record identifying information to be sent to the receiving device through interactions with a system. In operation 1016, the form can be confirmed and sent to the system or a storage area within another device or one of the two devices used to complete the form. In operation 1020, once stored the form is able can be accessible as appropriate from time to time from any device that is capable of displaying the form and communicating with the storage holding the form.

Figure 11:
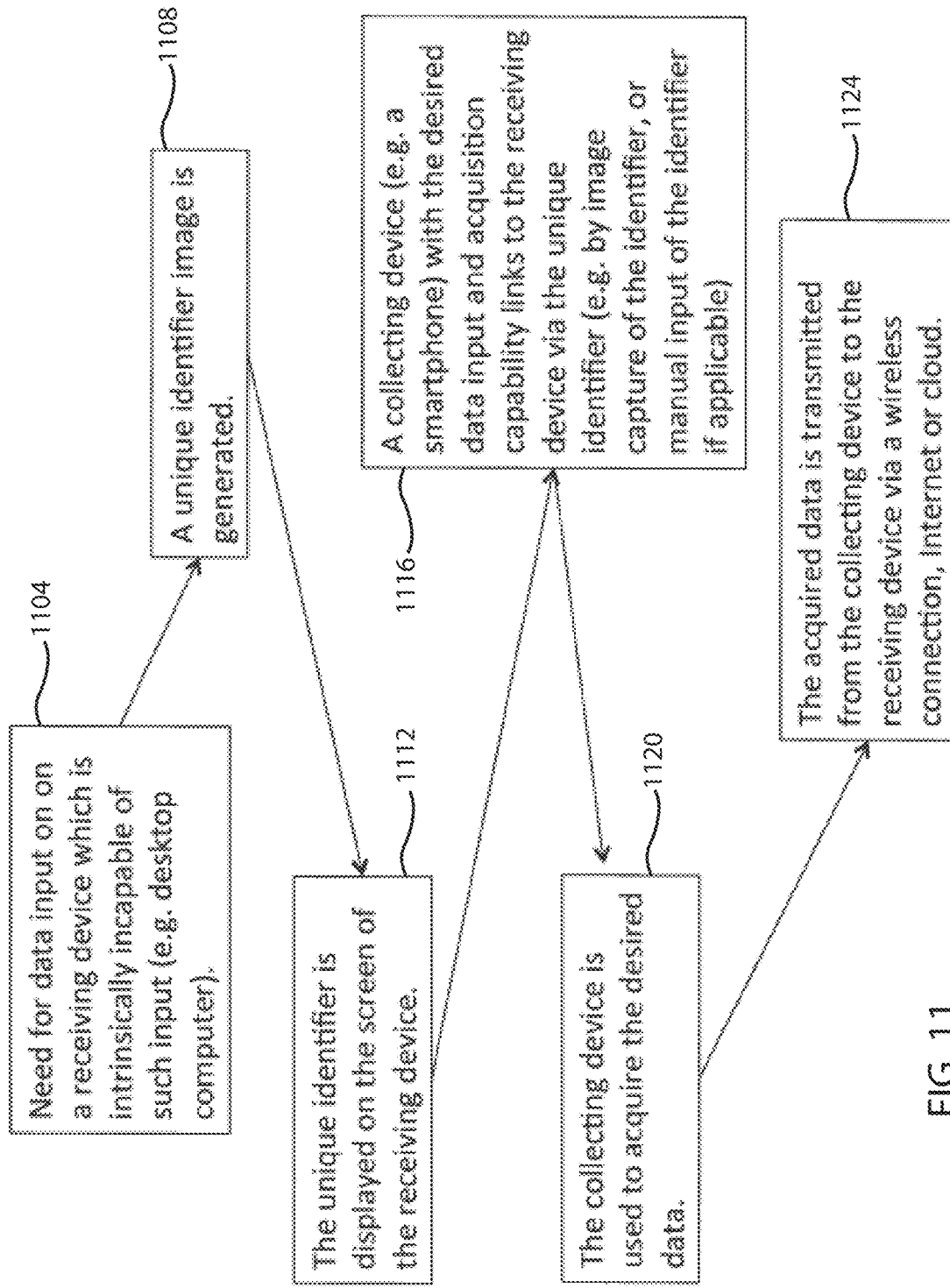
FIG. 11 is a flow chart describing the steps a user may take to link the collecting and receiving devices, according to one embodiment.

FIG. 11 shows a flow chart describing the steps the user may take to link the collecting and receiving devices using embodiments described herein. First, in operation 1104, a need arises for data input on a receiving device which is intrinsically incapable of such input (e.g. desktop computer). In operation 1108, a unique identifier image is then generated and displayed on the screen of the receiving device. In operation 1112, a collecting device (e.g. a smartphone) with the desired data input and acquisition capability then links to the receiving device via the unique identifier (e.g. by image capture of the identifier, or manual input of the identifier if applicable). Once the devices are linked, the collecting device is used to acquire the desired data in operation 1116. The acquired data is then transmitted, in operation 1120, from the collecting device to the receiving device via a wireless connection, Internet or cloud.

Figure 12A:
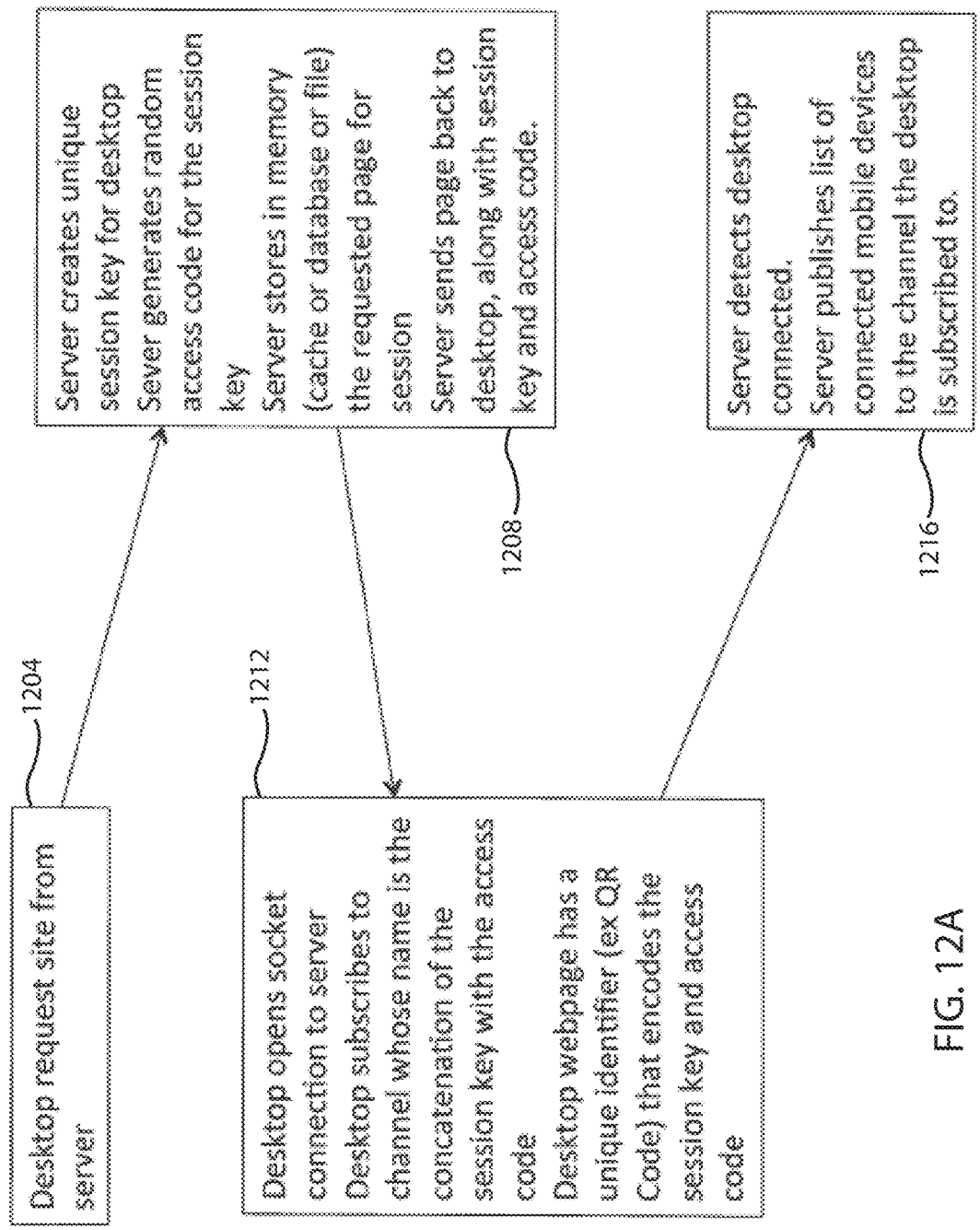

FIG. 12A-G describes in flow chart form a process by which the collecting and receiving devices may be linked. Referring initially to FIG. 12A, a desktop or other computing device requests, in operation 1204 a website or other online content from a server. In operation 1208, the server then creates a unique session key for the desktop. The server generates a random access code for the session key and stores in memory (cache or database or file) the requested page for the session. The server the sends the page back to desktop, along with session key and access code. In operation 1212, the desktop opens a socket connection onto the server. The desktop subscribes to the channel whose name is the concatenation of the session key with the access code. The desktop webpage may have a unique identifier (ex QR Code) that encodes the session key and access code. In operation 1216, the server detects that the desktop is connected. The server then publishes a list of connected mobile devices to the channel to which the desktop is subscribed.

Figure 12B:
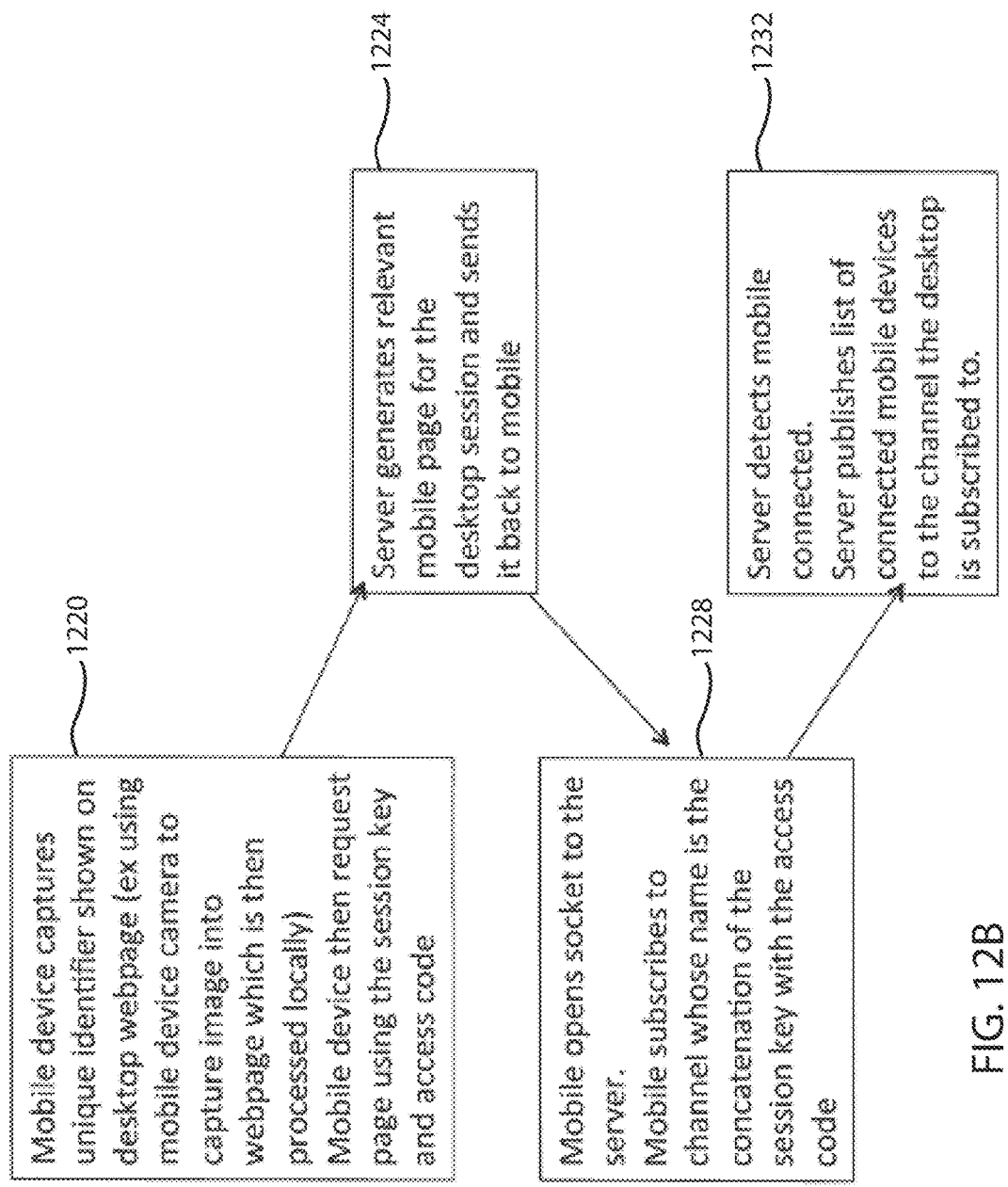

Referring now to FIG. 12B, in operation 1220, the mobile device captures the unique identifier shown on desktop webpage (ex using mobile device camera to capture image into webpage which is then processed locally). The mobile device then requests the page using the session key and access code. In operation 1224, the server generates the relevant mobile page for the desktop session and sends it back to mobile device. In operation 1228, the mobile opens a socket to the server. The mobile subscribes to the channel whose name is the concatenation of the session key with the access code. In operation 1232, the server detects mobile connected. The server then publishes a list of connected mobile devices to the channel to which the desktop is subscribed.

Referring now to FIG. 12C, in operation 1236, a user makes changes to the desktop webpage (such as entering any input to the current page). The desktop webpage then broadcasts changes to the entire channel to which the desktop is connected. In operation 1240, the server relays message to all connected device in the channel. In operation 1244, the mobile device then receives the broadcast and parses changes. The mobile device may then interpret the changes and display the changes locally.

Figure 12D:
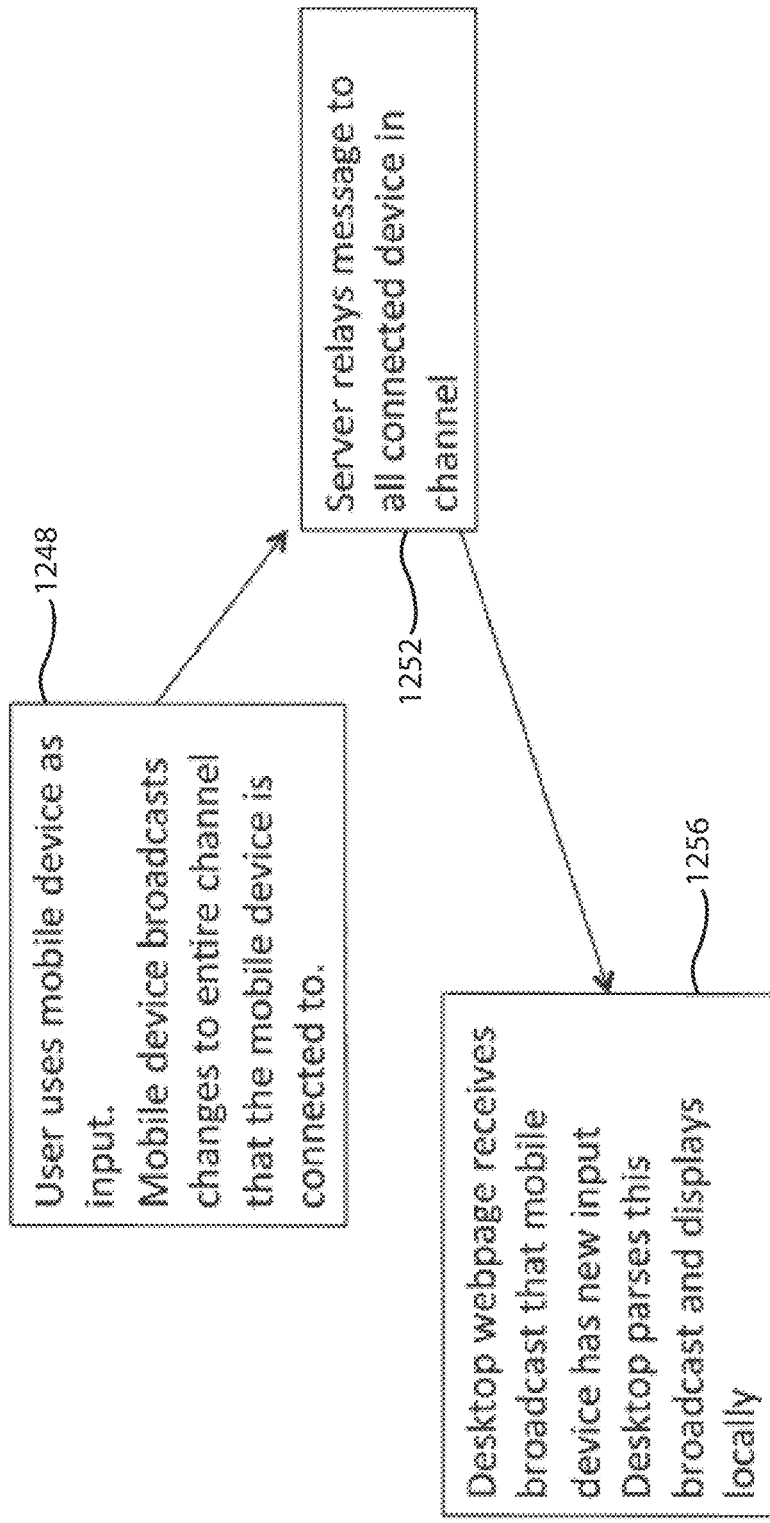

Referring now to FIG. 12D, in operation 1248, the user uses the mobile device as input. The mobile device then broadcasts changes to the entire channel to which the mobile device is connected. In operation 1252, the server then relays a corresponding message to all connected device in the channel. In operation 1256, the desktop webpage receives the broadcast that the mobile device has new input. The desktop then parses this broadcast and displays the input locally.

Figure 12E:
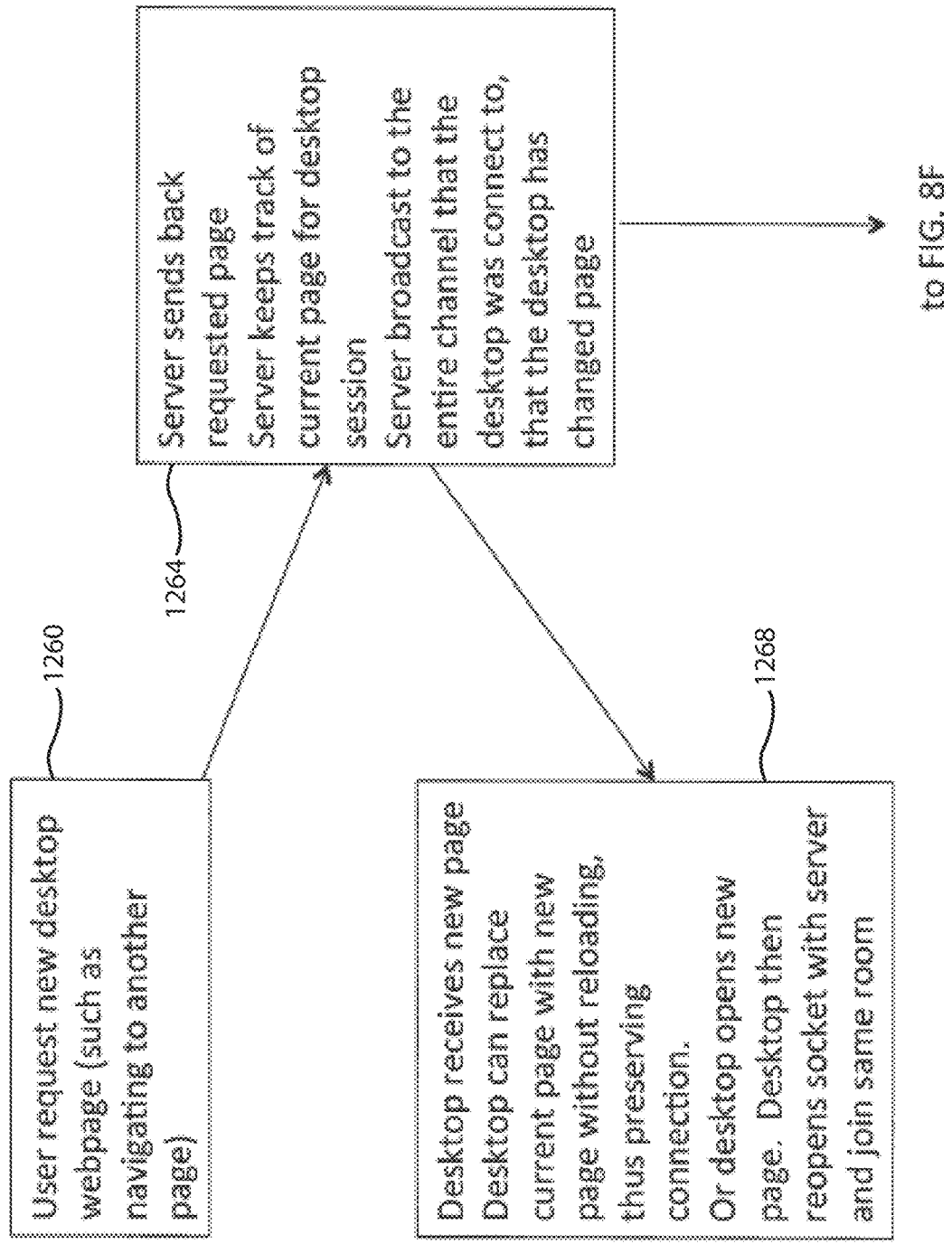

Referring now to FIG. 12E, in operation 1260, the user requests a new desktop webpage (such as navigating to another page). In operation 1264, the server sends back the requested page. The server may keep track of the current page for the desktop session. The server then broadcasts to the entire channel to which the desktop was connected, that the desktop has changed page. In operation 1268, the desktop then receives the new page. The desktop can replace the current page with the new page without reloading, thus preserving connection. Alternatively, the desktop opens a new page. The desktop then reopens the socket with server and joins the same room.

Figure 12F:
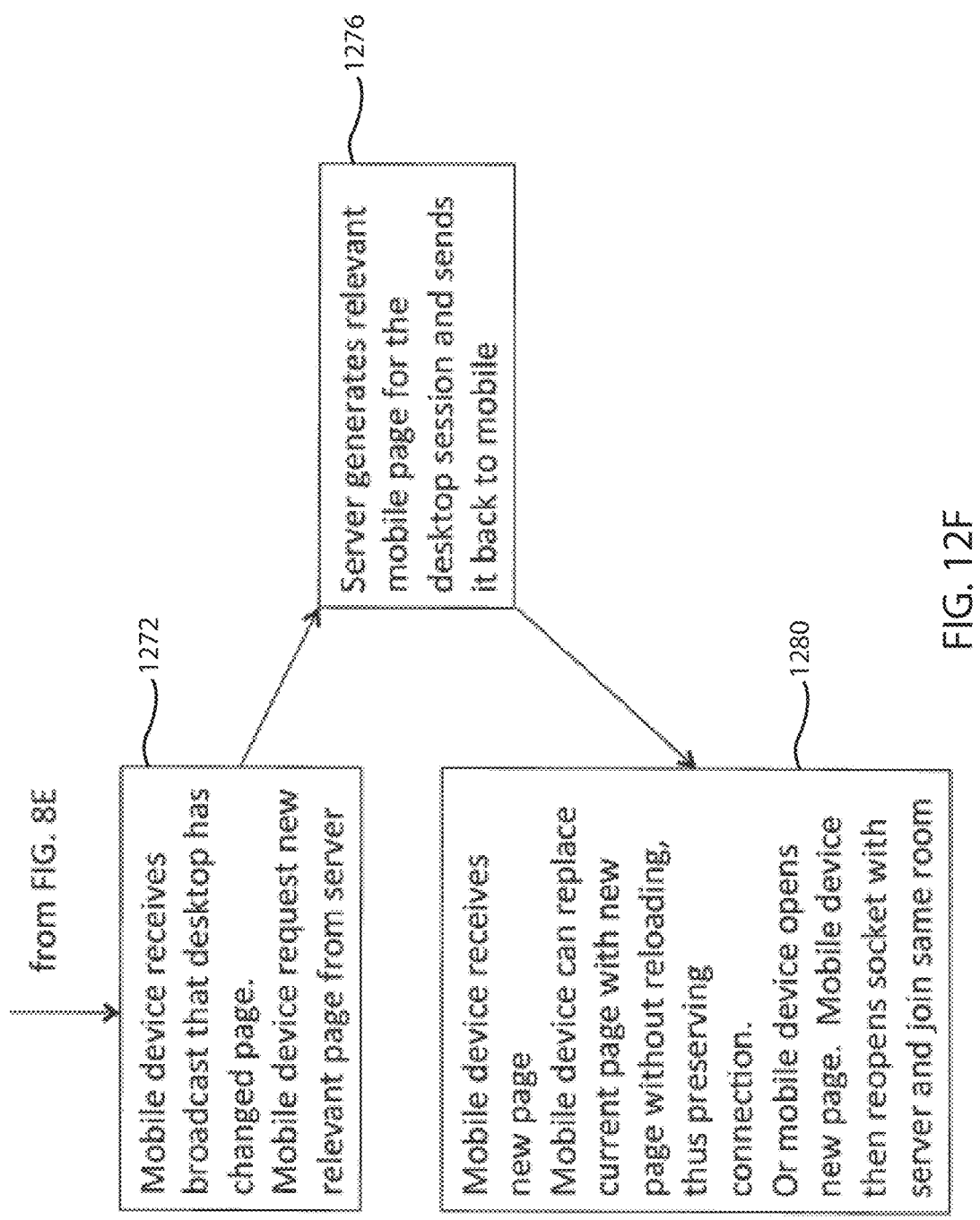

Referring now to FIG. 12F, in operation 1272, the mobile device receives the broadcast that the desktop has changed page. The mobile device then requests a new relevant page from the server. In operation 1276, the server generates the relevant mobile page for the desktop session and sends it back to mobile device. In operation 1280, the mobile device receives the new page. The mobile device can replace the current page with the new page without reloading, thus preserving connection. Alternatively, the mobile device can open the new page. The mobile device then reopens the socket with the server and joins the same room.

Figure 12G:
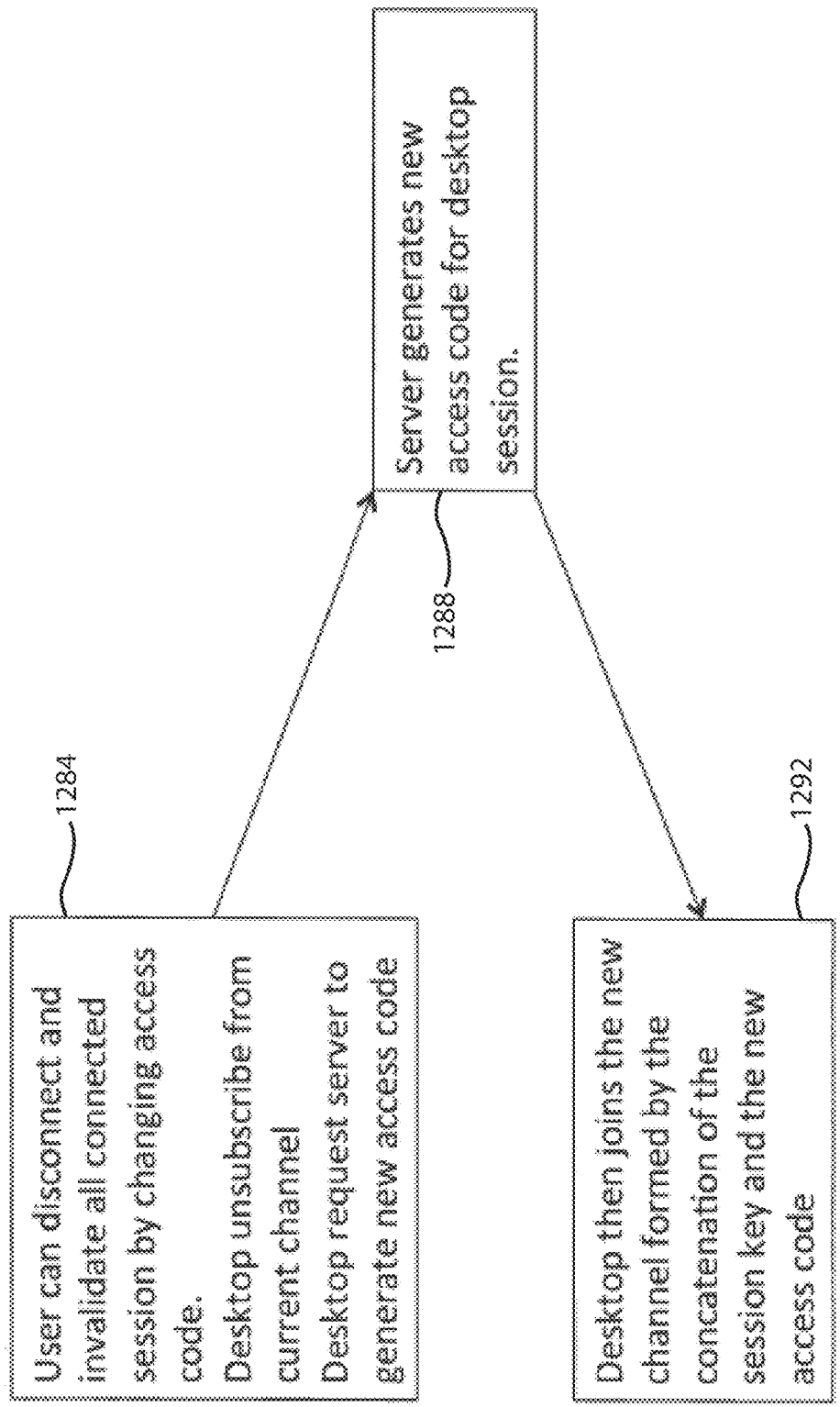

Referring now to FIG. 12G, in operation 1284, the user can disconnect and invalidate all connected session by changing the access code. The desktop can unsubscribe from the current channel. Here, the desktop requests that the server generate a new access code. In operation 1288, the server generates a new access code for the desktop session. In operation 1292, the desktop then joins the new channel formed by the concatenation of the session key and the new access code.

Additional Verifying Information

Turning now embodiments that collect and use additional verifying information in connection with authenticating the secure web session or to bolstering the authenticity of the electronic signature. A collecting device is linked to a receiving device by a unique identifier. Such unique identifiers include, but are not limited to a Quick Response (QR) code, a bar code, objects in the visible and non-visible wavelength of light for humans (such as but not limited to IR), string of alphabetical and/or numerical characters, images, trademark images, brand images, audible or inaudible sound from a speaker, phrases or any other unique image, signal, or code displayed by a device or system, such but not limited to a desktop, requesting to be linked to another device. The unique identifier is displayed on the receiving device. The collecting device acquires the unique identifier. For example, the receiving device may capture an image of the unique identifier using a built-in or accessory camera. Alternatively, a user may manually enter the code displayed on the receiving device using the keypad of the collecting device. Alternatively, the unique identifier may be displayed on the collecting device and acquired by the receiving device.

The unique identifier is generated by an algorithm, program, or software which may reside on the receiving device, collecting device, or on an alternate location, including but not limited to a server or third device. The unique identifier may be specifically generated for a single session between the receiving and collecting device, or be used to link the two devices on a long term basis. Auxiliary services for generating or reading the unique identifier may be utilized, for example a third-party QR reader or a web site with the capability of activating a smartphone's camera to capture and/or process the QR code or unique identifier image.

Once a collecting device is linked to a session, via the web or other communication means, then the system verifies the identity and/or authenticity of the user of the collecting device. This may be done by using the collecting device to scan a barcode of an ID badge, such as that found on, for example, on a driver license, student ID, Identification Card, Nexus Card, Passport, credit or debit card, gift card, rewards card, loyalty card, corporate or other employee identity card, or other identifying object or card. Scanning means may occur via peripheral device attached to the collecting device designed for said purpose, or alternatively using image acquisition features of the smartphone (e.g., the camera). The contents of the barcode are then decoded using standard algorithms.

Additionally, other identifying mechanisms such as but not limited to a, smartphone, tablet, or computer that has been unlocked via secure password, notary book verifier, biometric data including but not limited to an iris scan, retinal scan, facial recognition, finger prints, or other means may be used to authenticate an individual including but not limited to nucleotide/amino acid sequence, mass spectroscopy signal etc. Such identifiers may be captured from the collecting device itself, or from peripheral devices attached to the collecting or receiving device or from other stored inputs on the collecting or receiving device. Any of these and other means to authenticate the identity of an individual may be used by scanning a bar code, but also the reading of data from other unique mechanisms with identifying features uniquely tied to the user. These other mechanisms may include but are not limited to, RFID tag, microchip, near field communication signal, magnetic strip, image verification, QR code, holographic verification, thumbprint data, iris scan data, or various other information pieces.

The system may also capture specific identifying information from a picture of a photo ID and/or other identification badge to capture all the demographic and/or identifying information on the ID. In the case of a driver's license, credit card or other card with a signature, the signature image may also be captured by taking a photo of the driver's license, which can then be compared to a user signature generated on the collecting device. Additionally, taking a photo of a driver's license or ID card picture and then matching it with a photo of an individual who is using the collecting device may serve as another means of authentication through comparative facial recognition. Another means of verifying that the identification is not a forgery may be to take a short video and/or multiple successive photos from different angles of a holographic image on an ID card. Additionally or separately, flash could be incorporated with a randomized or programmed sequence to improve security and verification. This and other methods or features could verify that the ID is in fact real. Similarly this technique could be applied to currency in order to verify that the currency is real. It may be done with a single bill or with a large swatch of bills laid out. This currency verification technique could be done with any device, no matter if it is linked or not to another system. In such instances, the images of interest would typically be collected using the smartphone camera, and interpreted against standard images or characteristics known to be authentic.

Authentication may be with one, two, or multiple unique factors. For instance, after the linking of the capture device to a system or interface, one factor may include the user may be asked to shake the phone in a distinct pattern, such as a "figure 8" or in a circle. This may be used, similarly to capture passwords, to verify that the user is in fact a human and not a machine. This distinct pattern rotation would give the machine the ability to see random variations that could be analyzed to be a human and not a machine which is incapable of replicating the imperfect nature of human motion. Similarly, other human signals such as biometric data (voice, pulse, electrical signals, iris scan, fingerprints, etc.) could be used to verify that a human is using the device and that the device is not being fooled with a software program.

Another factor of authentication may include capturing, via direct photo or scanning of a bar code, QR code, or other digital code transmission system, that the ID has demographic information on it. This information could be used to link the ID to the purchase, signature, or other mechanism that is being used for the capture device linking to the system. This could be done with one or multiple forms of identification such as imputing the credit card number and information manually and then using the capture device to take a picture of the credit card number showing that it is the same physical card. Also, verifying the hologram or other security feature detectible by image processing by successive picture flash sequence could also verify that it is a card. Additionally, the card could be scanned via the magnetic strip or a bar code or QR code on the card. This multi-factor authentication may help to verify against identify theft and could in addition be used, in the case of a credit card, with an identity verification service to run a credit check and/or submit for a purchase.

Yet another means to use a capture device with a system to authenticate a user would be to take a picture or video of a holographic image or watermark on a document or bill of currency. This watermark or holographic image could be taken from multiple angles to verify that the color change and/or signal change would match against a standard set for verification that this is the correct holographic image or watermark. Alternatively, utilizing the dual flash on a mobile device, such as the iPhone 5s in conjunction with the camera may be used to validate the presence of the hologram. In this instance, two photos would be captured in sequence, one photo taken with the first LED flash, and the second photo with the second LED flash. The difference in distance between the two light sources would cause a shift in the reflected angle from the light source to the camera, thus capturing the color change associated with the hologram. This would obviate the need to take the photos at two different angles, which is an alternate approach if the dual flash capability is unavailable. Some government issued ID also employ image-based watermark, such as the technique developed by Digimarc. After the capture of the ID image, such digital watermarks may be decoded to make sure that the ID is valid and has not been tampered with. This would serve as another verification means that the ID being used is in fact authentic.

Yet another means to use a capture device with a system to authenticate a user would be to take an image or video of a sample piece of documentation with a signature on it. This for instance could be but is not limited to a driver's license or passport. This signature would then be matched to one that would be signed on a digital capture means to verify that key features were conserved.

Yet another means to use a capture device with a system to authenticate a user would be to take an image or video of a sample piece of documentation with a signature on it. This for instance could be but is not limited to a driver's license or passport. This signature would then be matched to one that would be signed on a digital capture means to verify that key features were conserved.

Yet another means to use a capture device with a system to authenticate a user would be to take an image or video of a sample piece of documentation with a photo of the user on it. Additionally a photo of the user could be stored in the capture device as a reference. Then a picture of the user would be taken prior to use of the capture device to authenticate that the person using the device is in fact a real person that has an identity. Then the image in the reference library on the capture device and/or the image on the sample piece of documentation (example: Drivers License, Student ID, Passport, etc.) could be cross referenced to verify the identity of a user. Similarly, additional images of different body parts or anatomical features, such as fingers, toes, arms, freckles, iris, fingerprints, palm print, etc., could be used for a similar authentication against a reference.

Yet another means to authenticate a user would be from taking a picture of a form of identification. Then the image or picture would be displayed on the screen of the capture device. The screen content would be accessed through the screenshot, random access memory, graphics driver, or other means to determine what is currently being displayed. Determination of pixels and/or other text or information defining features could be used to extract information from the ID image.

Yet another means of authentication would be to scan a fingerprint via a capture device that may or may not be linked to any other device or system. The capture device, linked or not, would then capture data of a fingerprint from information stored on a ID such as a driver's license or passport. This captured information would be cross referenced from the physical fingerprint input onto the capture device from the user. A match between the digitally capture fingerprint data from an ID and the digitally captured information from the physical finger would authenticate the user. Additionally it should be noted that the physical fingerprint capture could precede the action of scanning the digital barcode or other information means containing fingerprint cross reference data from an ID. Then the authentication upon a match could occur. This two factor form of authentication would allow for a driver's license and a thumbprint to be validated and verified against each other. The capture device if linked to a computer, system, and/or database, would then be able to verify the user's identity externally to the capture device. If not linked then the capture device itself could authenticate a user's identity to the inner workings systems of the capture device.

It should be understood to one skilled in the art that these authentication means could be used together, in various orders, or separately, in various combinations with or without other verification mechanisms not explicitly stated in this document. Additionally to verify the identity of an individual, demographic information may be automatically inputted into a system as a result of the verification techniques either through capture from an ID or documentation or via matching the user's verified ID against that from a reference library with corresponding demographic information.

Additionally there could be a plurality of features that would improve workflow of linking and/or authenticating a device and/or its user identity to another device, system, or network. These features could include the automatically linking the device via detection of it on a wifi network. If the device is the only mobile device on the wifi network then by default the system could auto-authenticate the smartphone to the computer signature terminal or other data input terminal. If there are more than one smartphones on the wifi network then a secondary level of authentication such as entering a code on the phone that is displayed on the screen of the computer in a box that auto-pops up on the phone browser. Additionally this secondary level of authentication could be accomplished by scanning a QR code or any other means previously discussed and others. It should be noted that these secondary levels of authentication could automatically be done in the case where there is only one device on a wifi network or multiple devices on the same network. The smartphone or other devices identity can be recorded by an identifying cookie. This feature could link the two cookie sessions from the device and collecting device together to remember that this device is authenticated to input data onto the other device. The two cookies could be linked through a time to live database that could also expire after a pre-set duration. Every time a user logs in the expiration date could be extended for a set amount of time. This could prevent persistent log on for added security and enable the user to only need to input a security verifying item such as a password on the computer and not necessarily the collecting device.

An authentication code for verifying that a collection device can connect to a session may vary in length depending on the number of users detected on the site using different sessions. This will vary based on the relative probability of collisions of users accidentally logging into other sessions because they accidentally enter the wrong numbers that happen to be the right number for somebody else. Varying the code length will improve the user speed for inputting the code but also improve stability of the security authentication if done by number of users. For example, if the site has one concurrent user then only one letter would be displayed. If the site has a few hundred concurrent then you may need 3 or more coded numbers and letters to ensure sufficient distance between codes to prevent accidental log-ins of other sessions. If a session has a few hundred thousand active users at a time then the number of coded items requiring input may increase to 6 items or more as an example. In this way the user is less burdened during a period of low activity on the site, requiring only a few numbers to be input compared to a period of high traffic which would require a lot of numbers to be input to ensure a unique session.

The purpose of identifying an individual user with linking a collecting device such as but not limited to a smartphone that has camera capture capabilities, would be to enable a user to authenticate them to a system. This authentication could be done for the first time a user logs into create a password and username or it could be done periodically as the user logs into the system. The smartphone would scan a barcode on the back of an identifier. Preceding this action and/or following this action the user may or may not be asked to input various identifying information that may or may not be publicly available. The purpose of this would be to link the user to the identification. Additionally, the physical GPS location and other authenticating tracking data could be captured at the time the smartphone collecting device is linked to another device and also when the collecting device scans and/or authenticates a form of identification. Checking to make sure that these locations are the same, or very close to each other, will help the system determine if the user is in the same location as their identification.

Using a smartphone, connected to another device or network or not, to scan a barcode on a driver's license or other form of Identification can capture demographic and authenticating information from the ID. In some instances even the fingerprint data can be captured from the ID barcode or other label. In addition to matching demographic information the biometric data stored on the ID such as the fingerprint and/or thumbprint could be used in conjunction with the scanning device's fingerprint scanner to cross reference if the user is the same user on the identification that was scanned. In that workflow a user would scan their finger or thumb on a smartphone device such as an iphone or thumbprint scanner with barcode scanner and/or camera, and then scan the ID such as a driver's license barcode with the iphone or similar device. Then the device would cross reference the information from the physical data collection on the user's biometric information with that of the biometric information collected from the ID and/or stored on the device from a previous instance of cross-referencing.

In the case of a smartphone or other device linked to a computer device or other system via a secure scanned identifying icon such as a QR code or a bar code, the smartphone and/or other linked device will become a remote terminal of the linked system via a connection through wireless data transmission system such as but not limited too Bluetooth, wifi, or even a non-wired system if both devices are connected via a wired data transmission connection.

In the case of authenticating a physician the user would be prompted to authenticate themselves by entering their name and their physician license number. Then they would scan, by capturing with video or camera, their ID such as a driver's license. This will then cross reference through the internet or on a local system to a database to authenticate the physician against their license credentials and their identification at the site of use.

Once authentication has occurred, credentials for the users may be transmitted to other applications for authentication purposes, without additional steps required by the user. Furthermore, authentication may also facilitate customization of features for the user interface within the primary or third-party application.

A dongle or other security feature on one device, including but not limited to a username and password entry event, may authenticate the user automatically on the other device within a certain proximity of it. Proximity may be detected between the two devices using the aforementioned methods. Similarly, when the devices become separated, the authentication will be revoked and the application, computer, web site, web service or web server re-locked.

Figure 13:
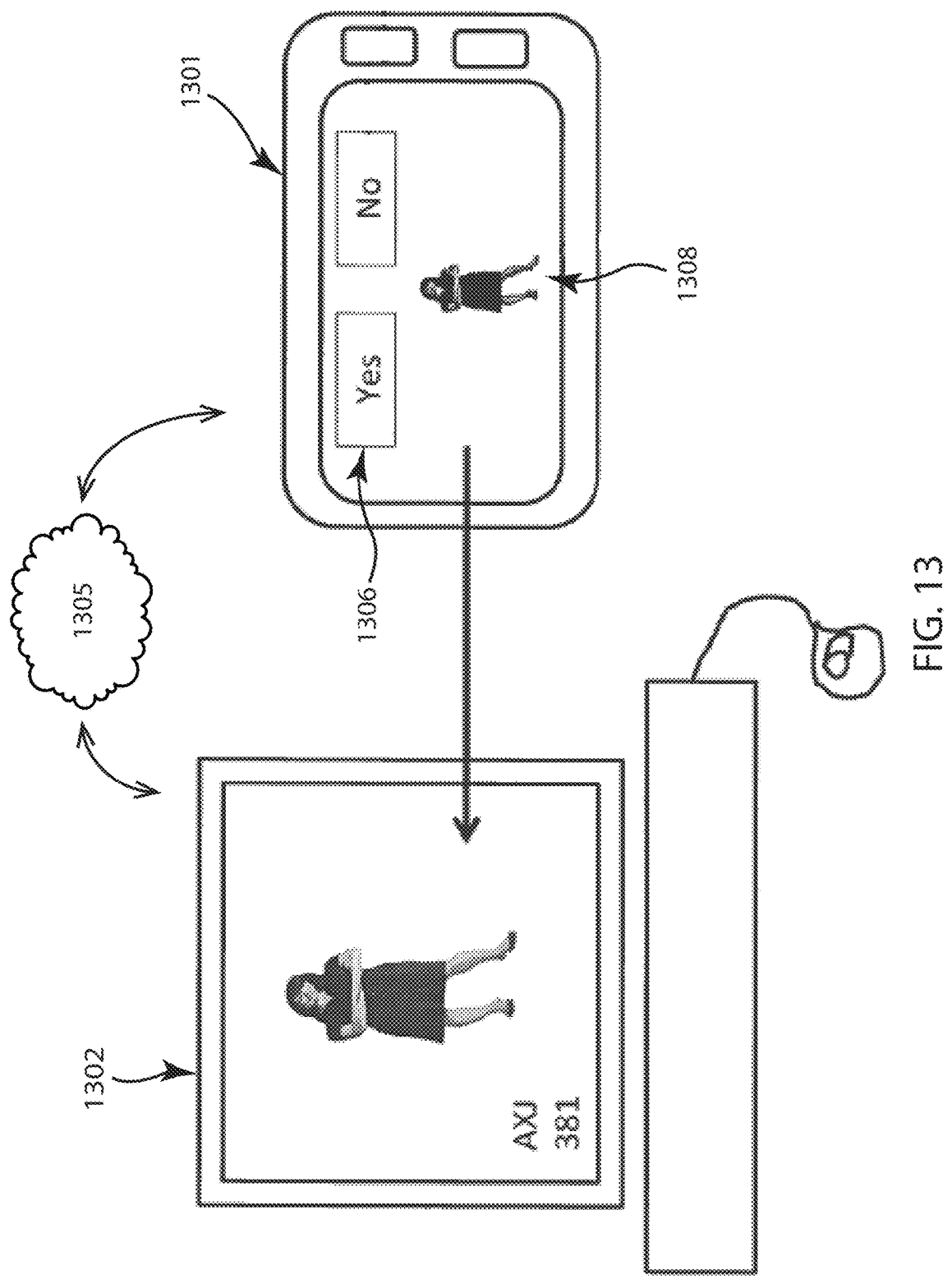
FIG. 13 is a diagram of an exemplary system used to capture a photo on a collecting device, which may be transmitted to a receiving device.

FIG. 13 shows an exemplary system in which the collecting device 1301 is linked to the receiving device 1302 by a unique identifier generated on the receiving device 1302 and received as input at the collecting device 1301. This accurately links the collecting and receiving devices, via the cloud 1305. The collecting device 1301 then captures a photo 1308 using a built-in or peripheral camera, with "Yes" and "No" buttons 1306 to accept or decline the image. The image 1308 is transmitted via the cloud 1305 to the receiving device 1302.

Figure 14:
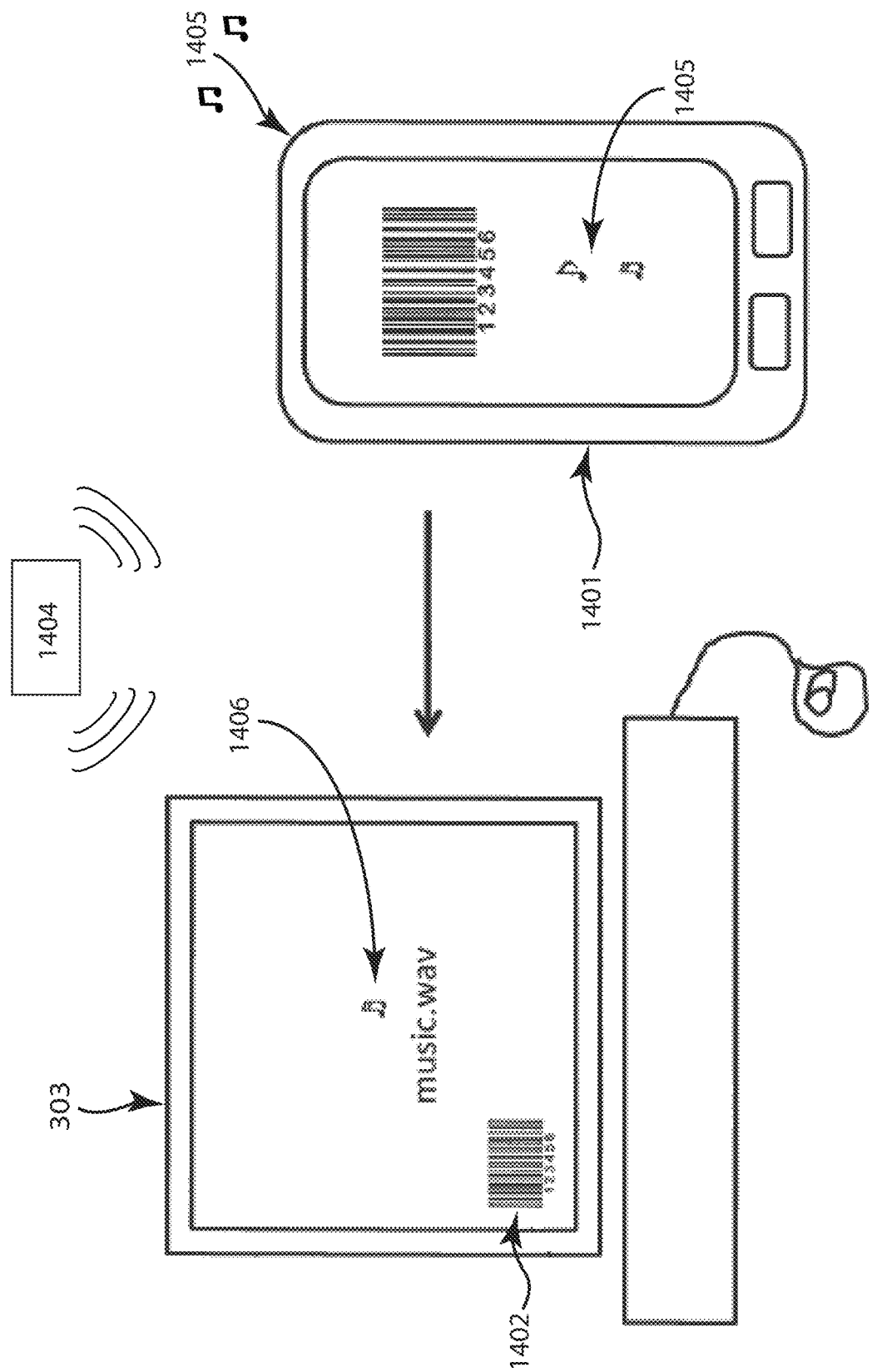
FIG. 14 is a diagram of an exemplary system used to collect sound recordings.

FIG. 14 shows an exemplary system and devices for using a means to link such as a bar code 1402 to link a receiving device 1403 with a collecting device 1401 for capturing an audio recording 1405. The receiving device 1403 displays the bar code 1402 to link the collecting device 1401 over a system allowing wireless communication between the devices and a repository for information 1404. A sound recording is then transmitted to the receiving device 1403. In this instance it is placed as a sound file on the computer desktop or web site 1406.

Figure 15A:
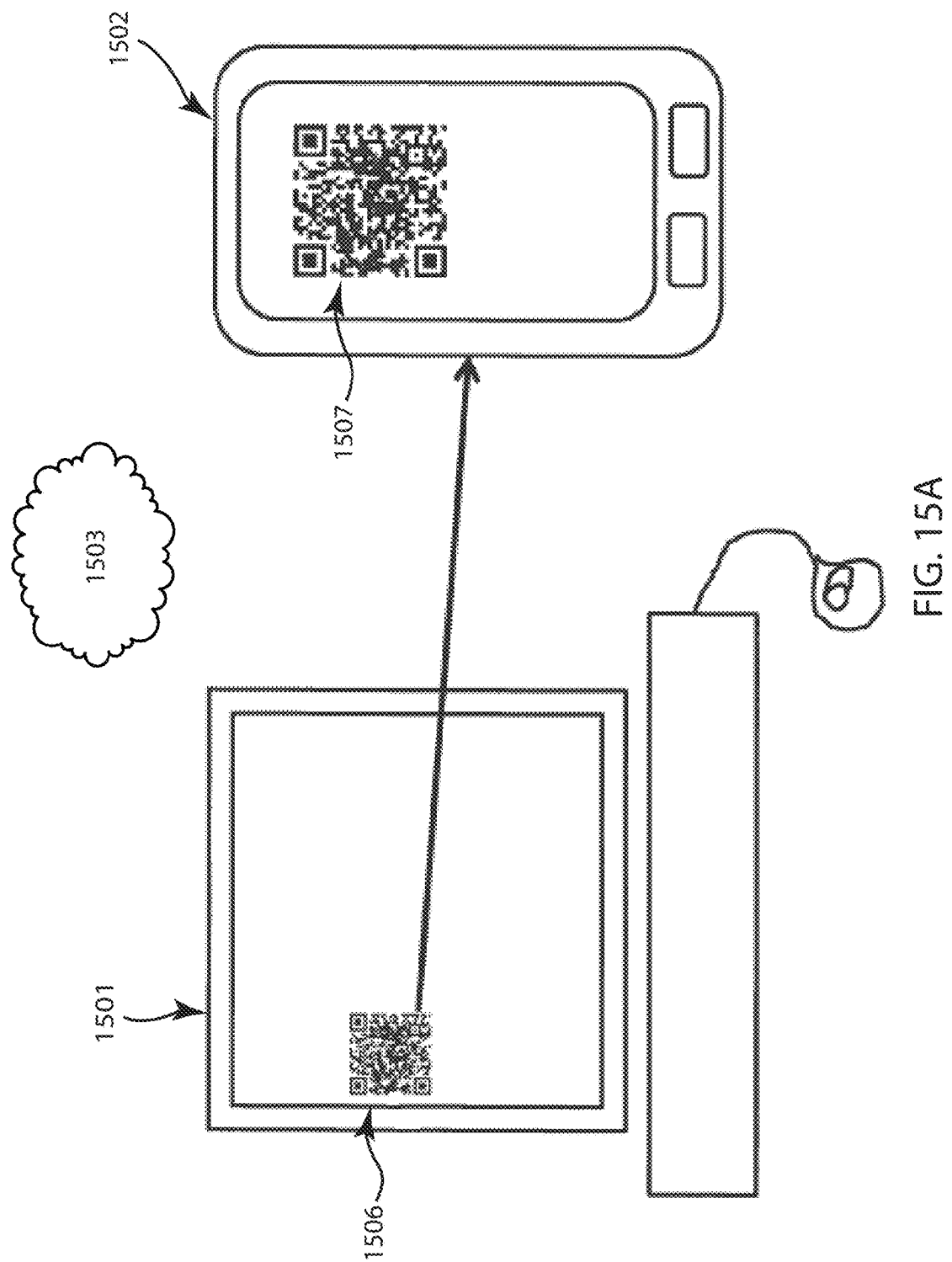
FIG. 15A depicts an exemplary system and touch device that allows for input of a QR code to link devices to collect sequential information.
Figure 15B:
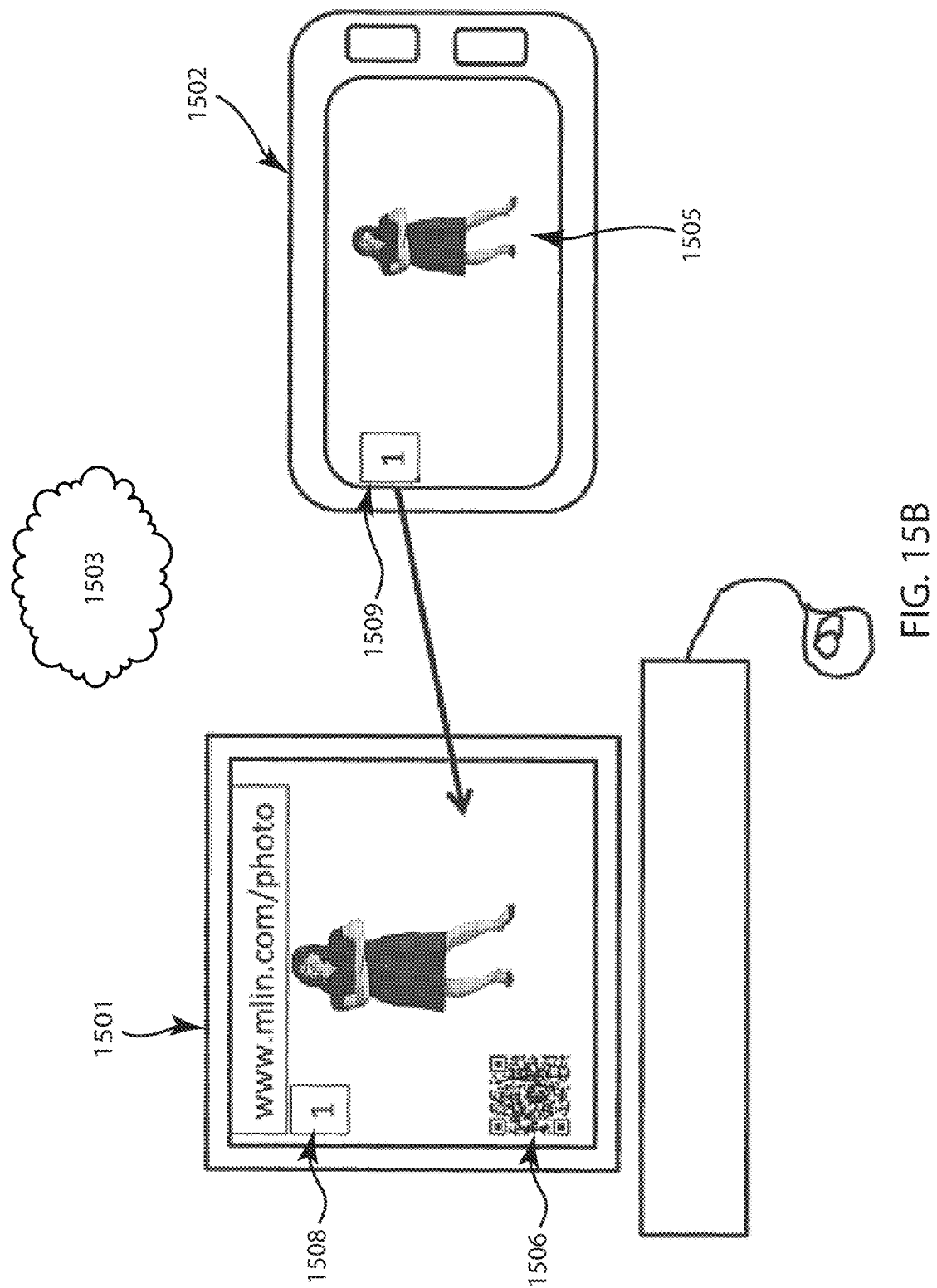
FIG. 15B depicts an exemplary system used to collect a photo.
Figure 15C:
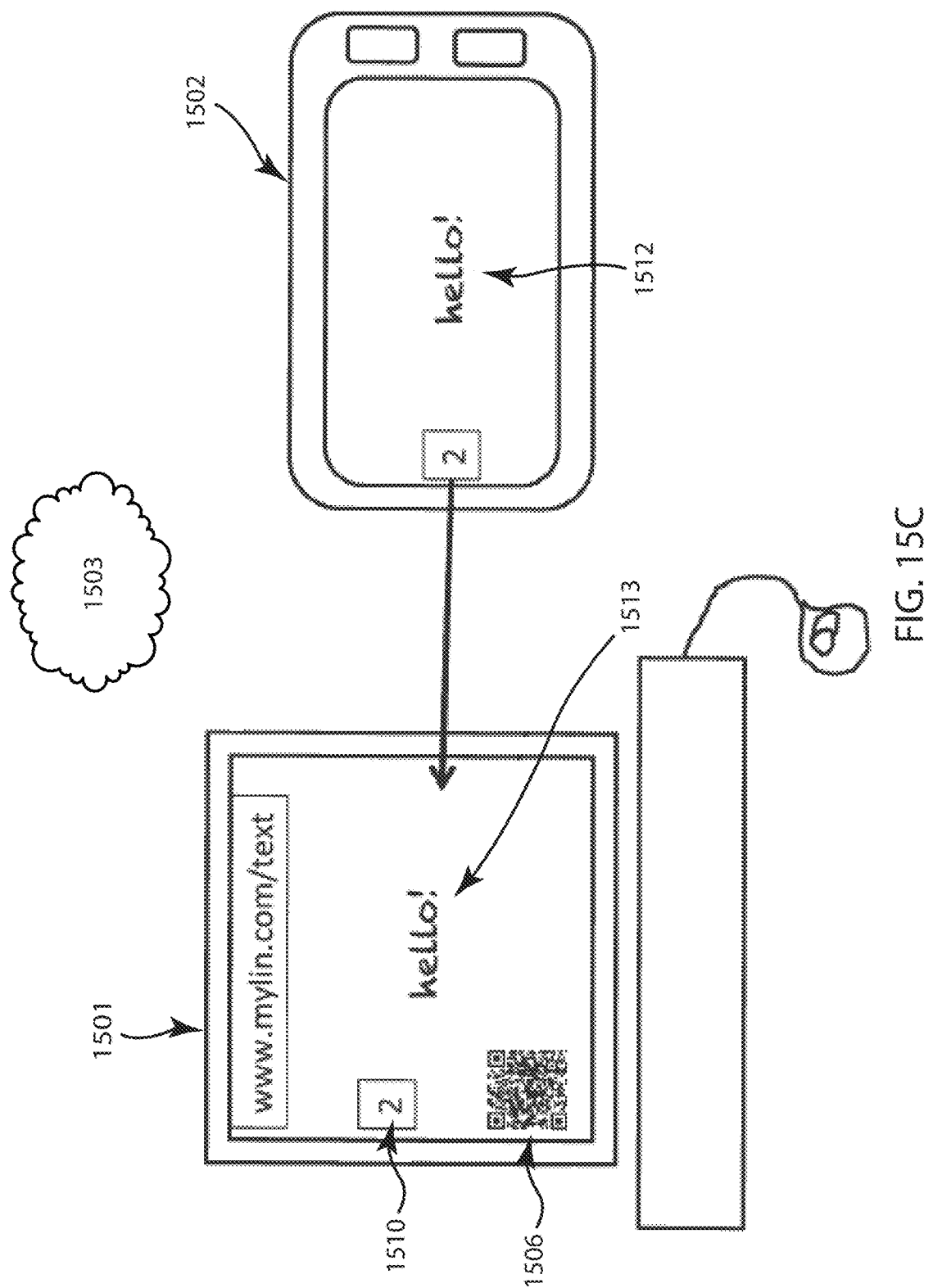
FIG. 15C depicts an exemplary system used to collect free text.

FIGS. 15A-C shows an exemplary system for sequential data collection comprising a desktop computer functioning as the receiving device 1501, a smartphone functioning as the collecting device 1502, and an interfacing cloud 1503. A QR code serves as the unique identifier which is displayed on the receiving device 1506 and captured by the camera of the collecting device 1507, thus linking the two devices. The receiving device displays web page "1" 1508 wherein it is desired to collect a photo image. The collecting device then generates an image "1" 1509 and activates the build-in or peripheral camera of the device to capture an image "1" 505. The first web page on the receiving device 1501. The user advances to the next web page, labeled "2" 1510 in order to capture free form text from the user on the collecting device 1502. The collecting device in turn displays an image "2" 1511 and allows the user to enter free form text or drawings using the touch pad 1512. The data input from the collecting device 1502 are transmitted via the cloud 1503 to the receiving device 1501 and displayed on the web page "2" 1513.

Figure 16A:
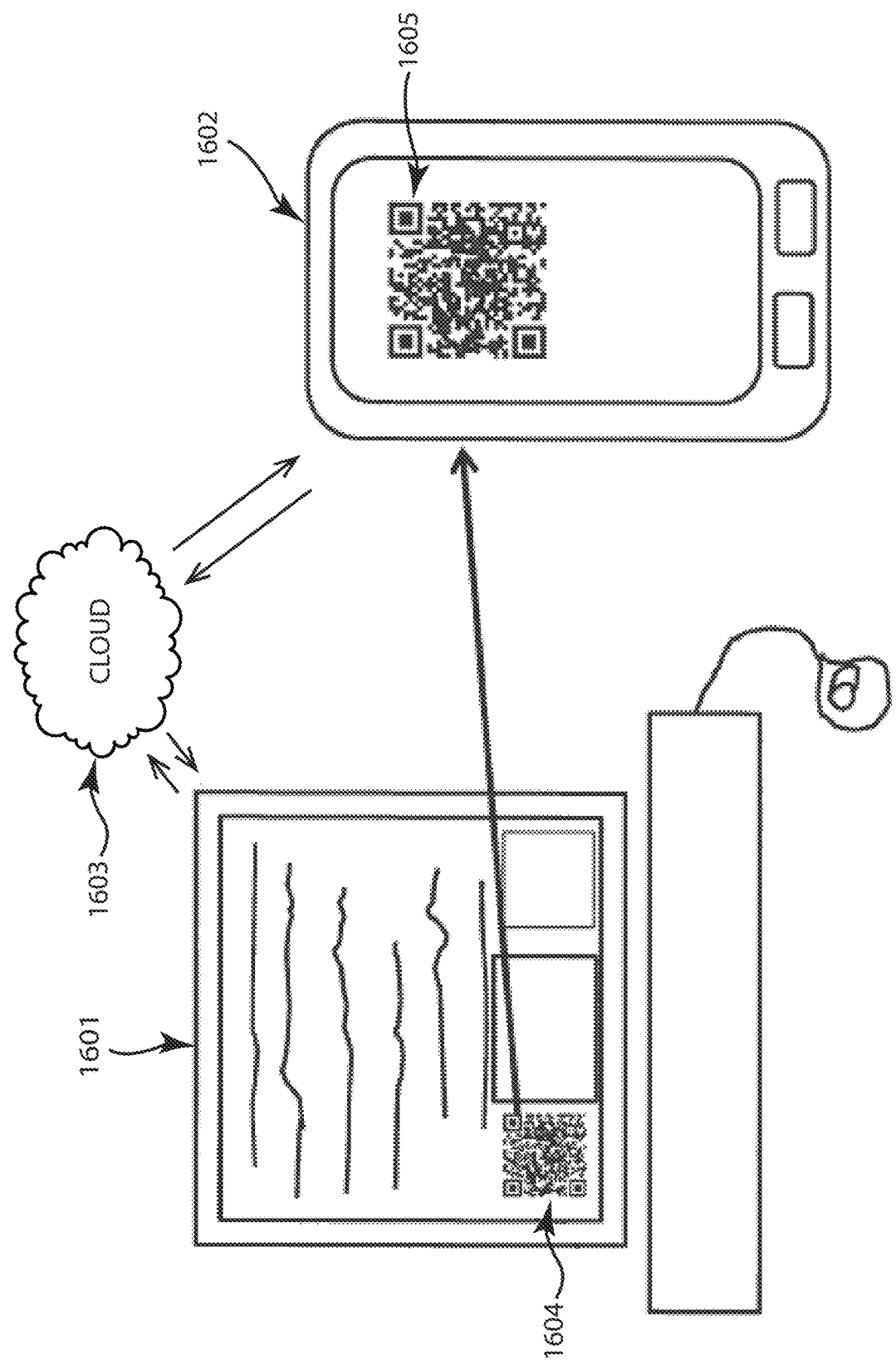
FIG. 16A depicts an exemplary system in which a unique identifier securely links a collecting and receiving device.
Figure 16B:
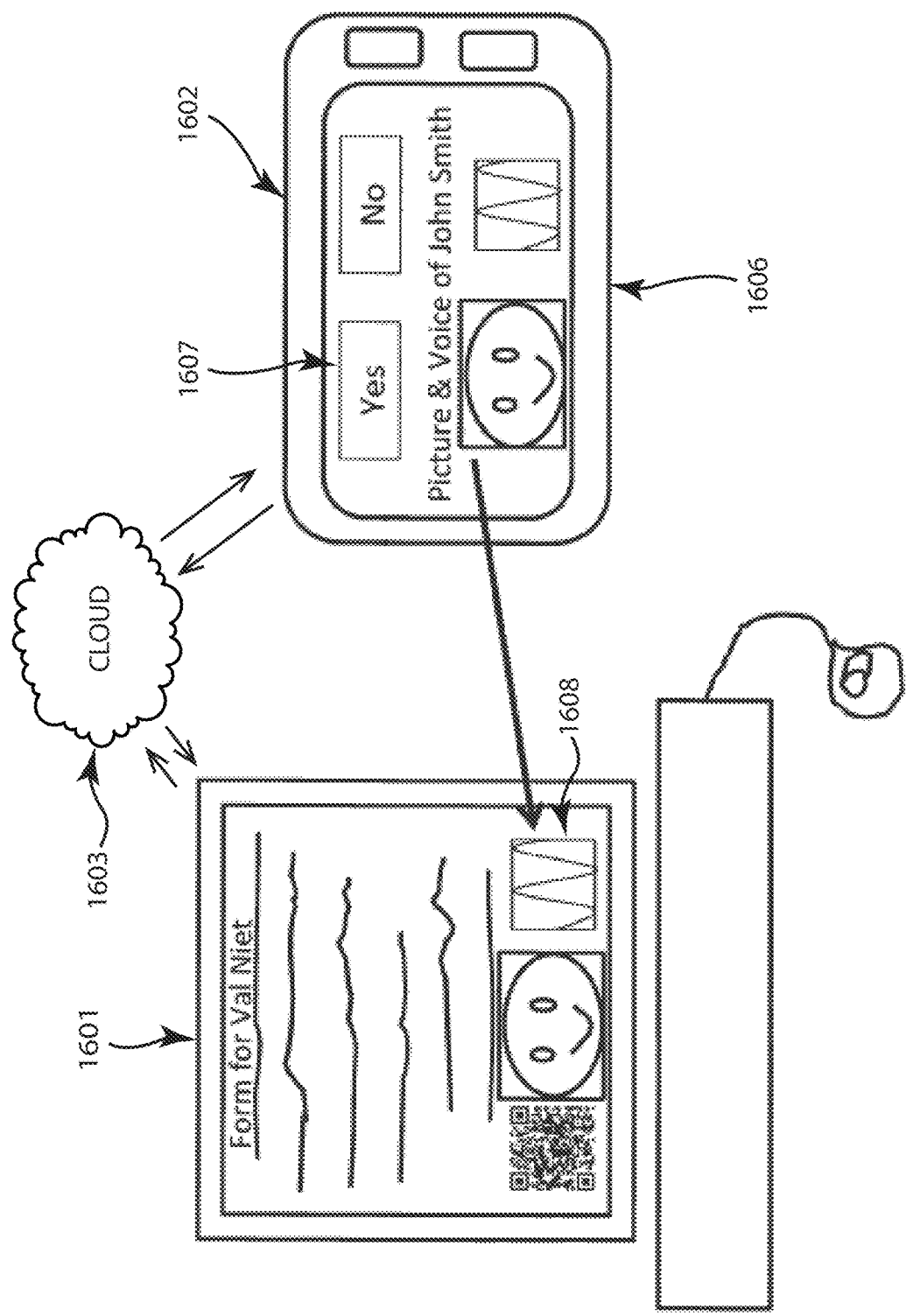
FIG. 16B depicts an exemplary system in which photo, video and audio recordings are collected and transmitted to a receiving device.

FIGS. 16A-B shows an exemplary system comprising a desktop computer functioning as the receiving device 1601, a smartphone functioning as the collecting device 1602, and a secure interfacing cloud 1603. A QR code is displayed on the receiving device 1604 which is captured by the camera of the collecting device 1605 so as to authenticate and link the devices. Photo, video and voice content are recorded by the user on the collecting device 1606 and accepted or declined by the user for transmission to the receiving device using "Yes" and "No" buttons 1607. The photo, video and voice content is then transmitted by the secure cloud 1003 and displayed on the receiving device 1601. Such content may be saved in the cloud, on the receiving or transmitting device, or on other storage media attached to or linked with any of the abovementioned components.

Figure 17:
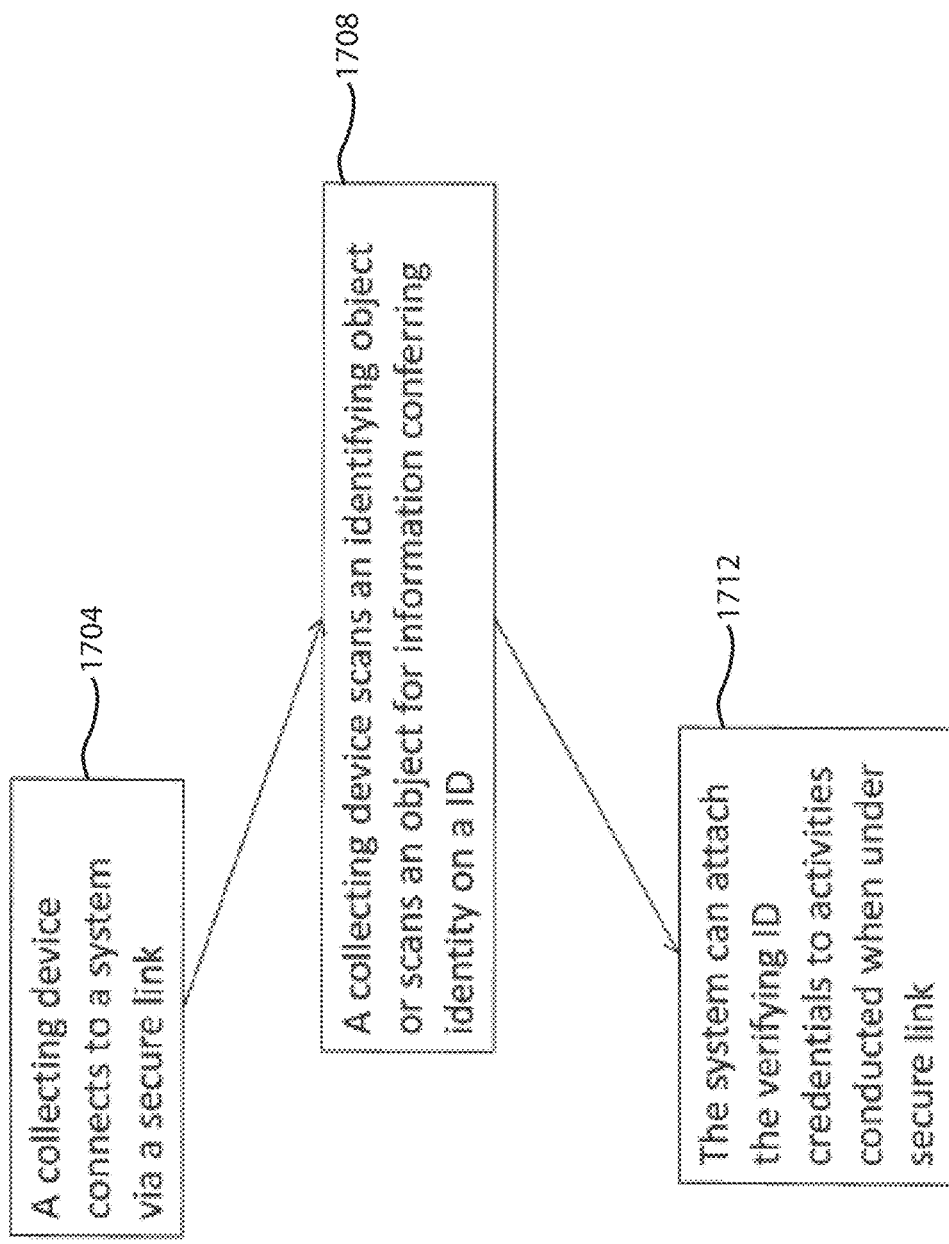
FIG. 17 depicts a method for attaching scanned credentials within a secure link.

FIG. 17 depicts a method for attaching scanned credentials within a secure link. Initially, in operation 1704, a collecting device connects to a system via a secure link. In operation 1708, the collecting device scans an identifying object or scans an object for information conferring identity on an identification card or badge (ID). In operation 1712, the system attaches the verifying ID credentials to activities conducted when under secure link.

Figure 18:
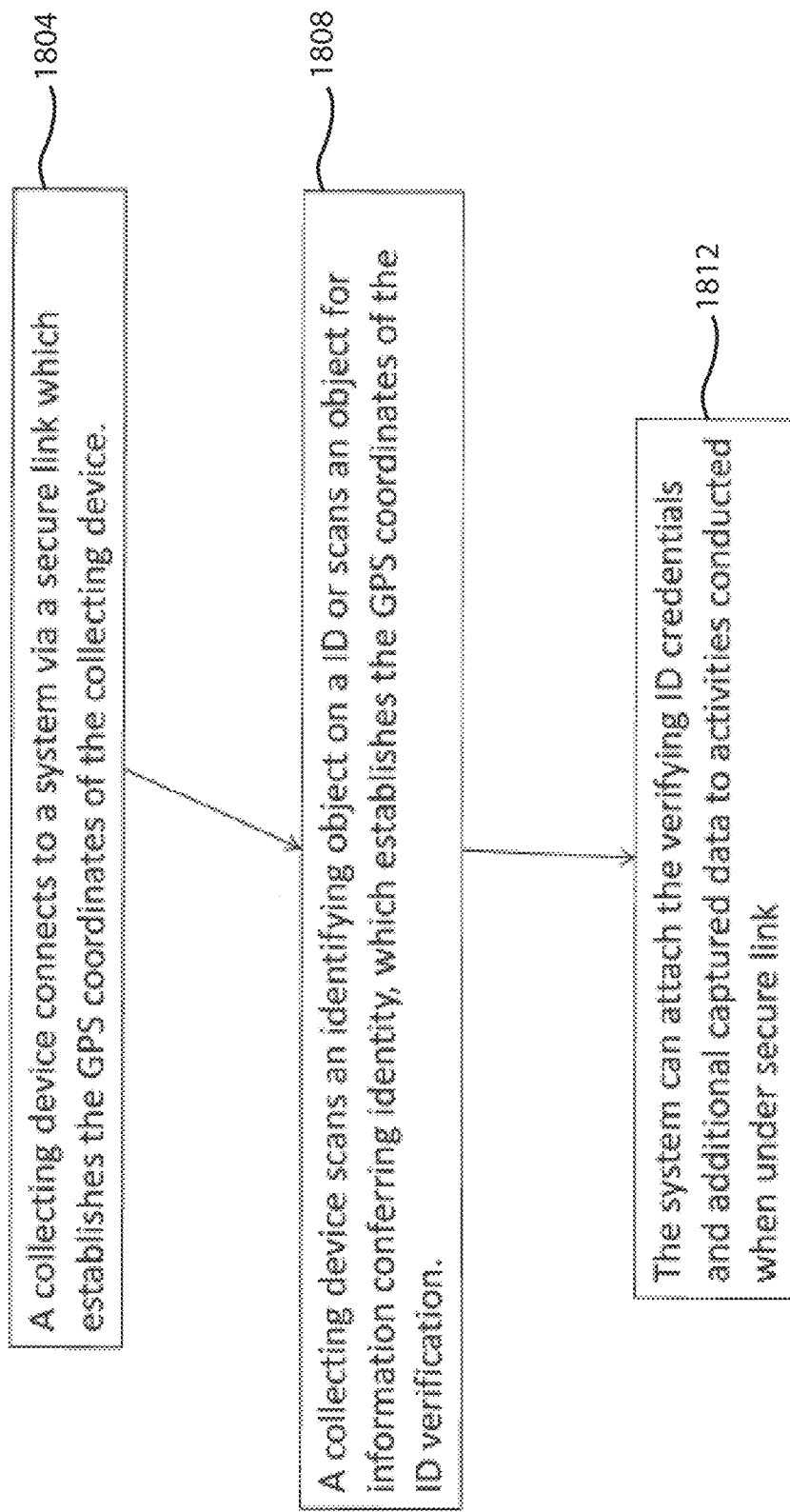
FIG. 18 depicts a method for attaching scanned credentials within a secure link that includes global positioning system data.

FIG. 18 depicts a method for attaching scanned credentials within a secure link that includes global positioning system data. Initially, in operation 1804, a collecting device connects to a system via a secure link, which establishes the Global Positioning System (GPS) coordinates of the collecting device. In operation 1808, the collecting device scans an identifying object on an ID or scans an object for information conferring identity, which establishes the GPS coordinates of the ID verification. In operation 1812, the system attaches the verifying ID credentials and additional captured data to activities conducted when under secure link.

Figure 19:
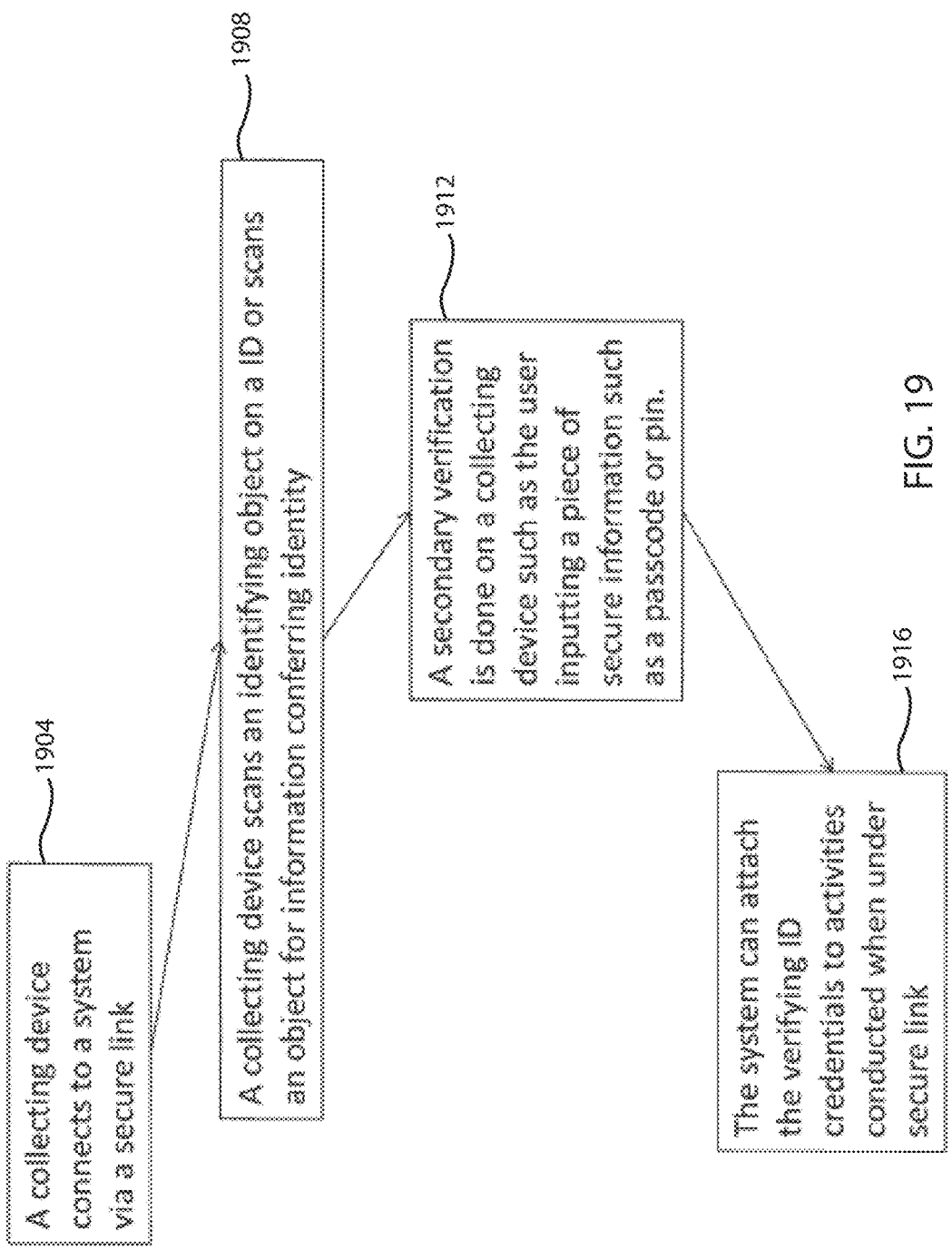
FIG. 19 depicts a method for attaching scanned credentials within a secure link that includes a secondary verification.

FIG. 19 depicts a method for attaching scanned credentials within a secure link that includes a secondary verification. Initially, in operation 1904, a collecting device connects to a system via a secure link. In operation 1908, the collecting device scans an identifying object on an ID or scans an object for information conferring identity. In operation 1912, secondary verification is done on the collecting device such as the user inputting a piece of secure information such as a passcode or pin. In operation 1916, the system attaches the verifying ID credentials to activities conducted when under secure link.

Figure 20:
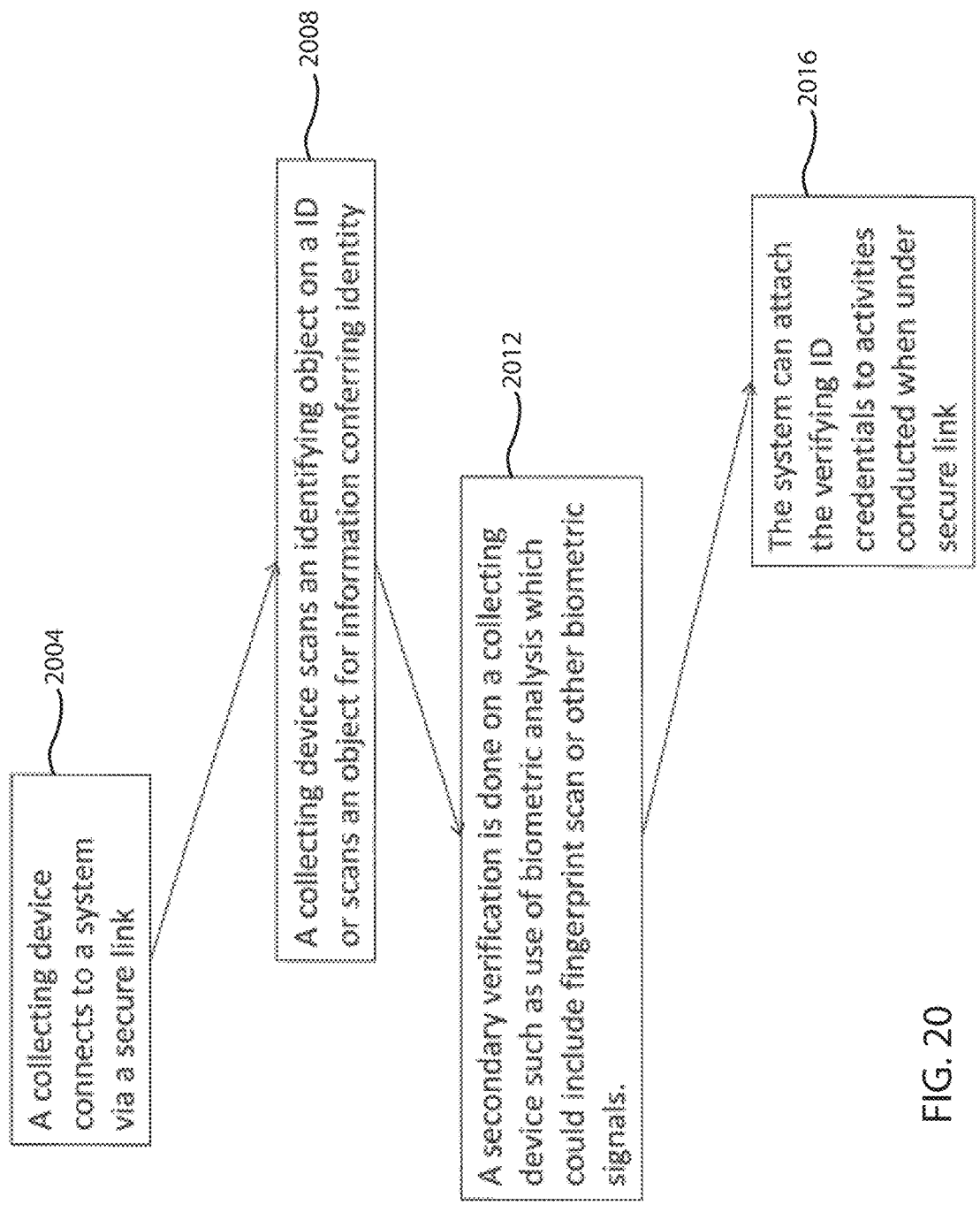
FIG. 20 depicts a method for attaching scanned credentials within a secure link that includes biometric data as a secondary verification.

FIG. 20 depicts a method for attaching scanned credentials within a secure link that includes biometric data as a secondary verification. Initially, in operation 2004, a collecting device connects to a system via a secure link. In operation 2008, the collecting device scans an identifying object on an ID or scans an object for information conferring identity. In operation 2012, secondary verification is done on the collecting device such as use of biometric analysis which could include fingerprint scan or other biometric signals. In operation 2016, the system attaches the verifying ID credentials to activities conducted when under secure link.

Figure 21:
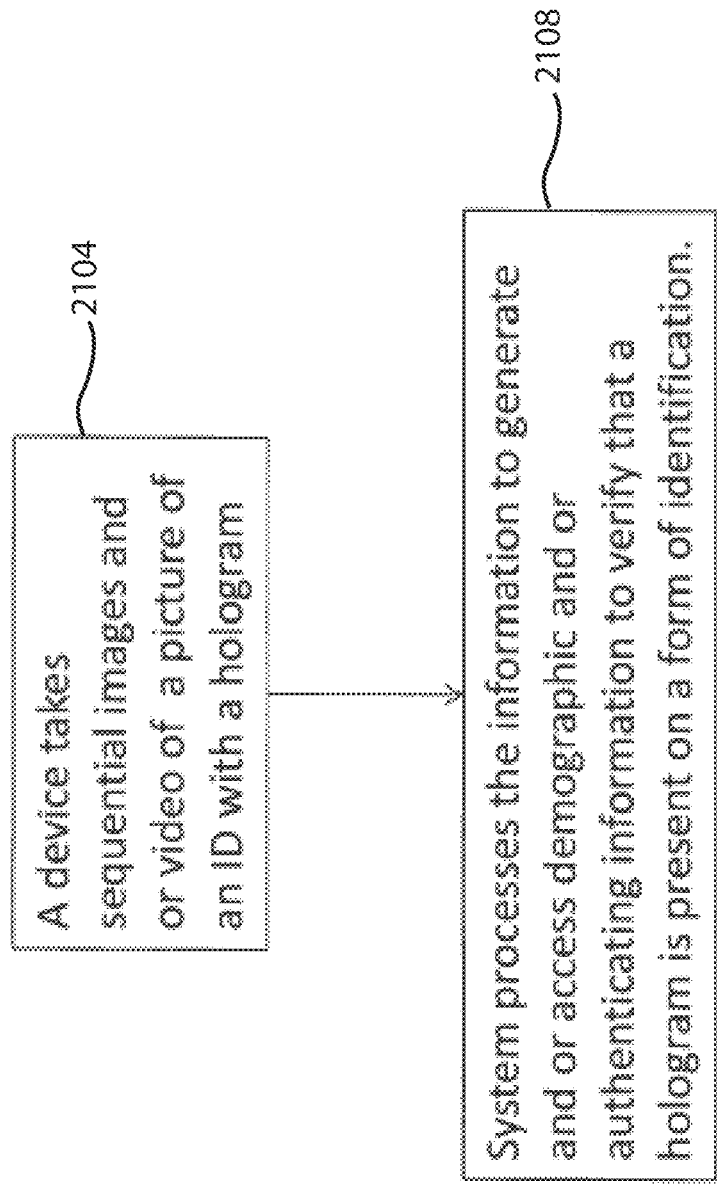
FIG. 21 depicts a method that confirms the presence of a hologram as a verification method.

FIG. 21 depicts a method that confirms the presence of a hologram as a verification method. Initially, in operation 2104, a device takes sequential images and/or a picture of an ID with a hologram. In operation 2108, the system processes the information to generate and/or access demographic and/or authenticating information to verify that a hologram is present on the identification.

Figure 22:
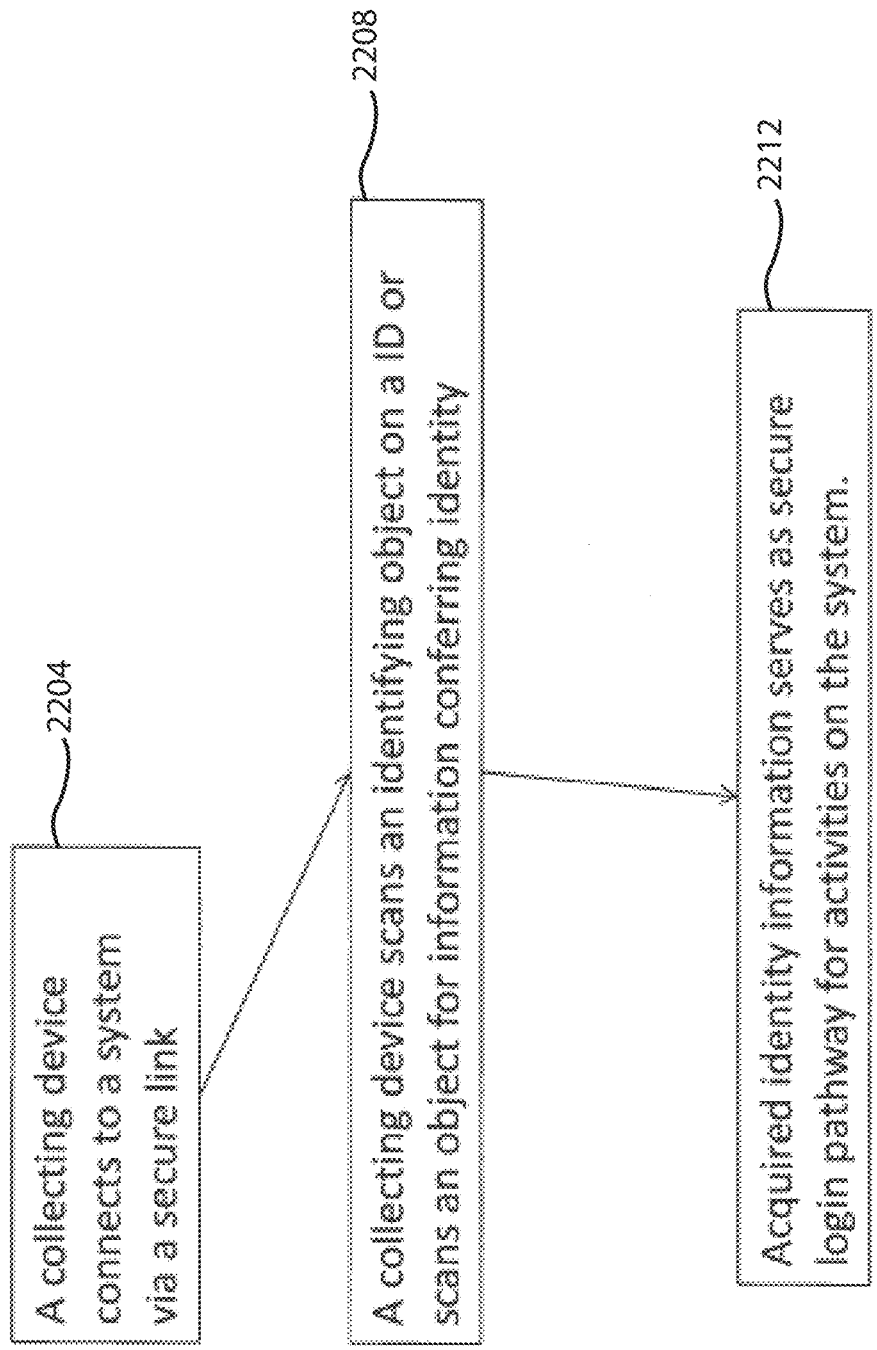
FIG. 22 depicts another method for attaching scanned credentials within a secure link.

FIG. 22 depicts another method for attaching scanned credentials within a secure link. Initially, in operation 2204, a collecting device connects to a system via a secure link. In operation 2208, the collecting device scans an identifying object on an ID or scans an object for information conferring identity. In operation 2212, the acquired identity information serves as secure login pathway for activities on the system.

Platform Independent Data Transmission

Turning now to embodiments that are directed to platform independent methods of transmitting information between applications running on different devices. The system first analyzes screen content displayed or audio content produced on a device. Such information includes but is not limited to words, letters, numbers, images, animations, videos or other information, spoken words, audible sounds, music. Among other means, the algorithm may search for specific content known to be displayed at specific X-Y coordinates within a particular window or display in an absolute or relative position. In another embodiment the system searches for data near or relative to certain landmarks or unique or usual features of the display. In yet another embodiment, specific audio signatures, waveforms or patterns will be sought. For example, if looking for a signature element, the system may search for data near a horizontal line of a certain length on a certain area of the page. Yet another example is searching for birthdate content next to "DATE OF BIRTH". Yet another example is searching for medication information by finding content located beneath the word "MEDICATIONS".

Additional information may also be collected such as the title of the active window or panel in the instance, position of the mouse, location and number of user clicks or screen touches or swipes, time and date information, software version, file names, other application names, the status of an application (open, closed, minimized, maximized).

Screen and audio content is but one method of analyzing the data content. Additionally, the codes, commands or data content on the memory mapped files, random access memory, or graphics driver, sound drive, network, network packets, commands, code or other programming elements from which a specific event or data element can be inferred and/or determined may also be analyzed.

Once the system has analyzed and identified the desired data elements using the aforementioned algorithms, said data elements are captured and/or organized into pre-specified data entry fields, labeled according to the content. The data can then be transmitted to a receiving web page, web service or web server or application in order to facilitate interchange of data between the application(s) and/or web page, web service or web server(s) without the need to formally integrate with the "sending" or "receiving" application(s) and/or web page, web service or web server, web service or web server(s).

Further information may be collected by monitoring packet content across a network through a "sniffer" mechanism. Such information may be used to infer what is being displayed on the screen, or what is queried, desired, input by or output to one or more users, applications or web page(s), web service(s) or web server(s).

For example, the system may be used to analyze and extract data from a fillable or non-fillable pdf form. In the instance of a fillable pdf form, the system identifies each data entry field then identifies the embedded label for said field. Both the data content and the label are collected. In addition, adjacent displayed information from within the pdf document may also be collected for later processing. The collected data can then be organized as desired and/or transmitted to one or more receiving applications, database or web page, web service(s) or web server(s).

In addition, information about user characteristics and behaviors may also be collected. This includes but is not limited to the order in which data, web page, web service or web servers or other information is accessed, the absolute or relative time spent on each screen, the location and number of mouse clicks and/or screen touch movement and/or position, the size of the window, web page, web service or web server accessed concurrent to the use of the web page, web service or web server or application in question.

The user information collected may then be analyzed using artificial intelligence and/or predictive tools to determine user habits and preferences. Said habits and preferences may then be used in a predictive manner to improve the user experience in a prospective fashion. For example, if a user is seen to concurrently access an informational web page, web service or web server when certain content is viewed on the application or web site in question, the informational web page, web service or web server will automatically open when the triggering content is viewed. In yet another example, if a user consistently accesses one kind of data prior to accessing a second kind of data, accessing the first kind of data will automatically trigger display of the second type of data, change aspects of the screen display, including but not limited to enlarging or otherwise emphasizing specific content on the display, after a specified period of time, or when the motion of the user's mouse or screen touch and/or swipe suggests the transition would otherwise be imminent.

For example, in an electronic medical record, a user may access the elements of a patient's chart in a particular sequence or order depending on such factors as the healthcare provider's individual preferences, the type of clinic or healthcare setting, the diagnosis of the patient, etc. The tools may be applied to an individual user, to a group of users with, for example, a common specialization within medicine, or a group of users within a particular clinic, hospital or other practice environment. Said system could be applied locally, or across multiple sites regionally, nationally or globally. Once the system learns the habits of an individual or group, the predictive algorithm can then be applied to individuals or groups within a similar practice environment. In the instance of an electronic medical record, such data may or may not be collected, analyzed and transmitted in a secure, HIPAA-compliant fashion.

In another embodiment, the artificial intelligence and/or predictive algorithms are used to create a summary page of information with information felt to be most relevant to a particular user. In this instance of an electronic medical record, such information may include, but not be limited to time, date, demographic information of interest to the user, past medical history, laboratory and imaging result types relevant to the user.

In another embodiment, the system captures certain data displayed in statistical modeling software. Said data may then be organized into discrete data elements and be transmitted and input to other statistical software or spreadsheet by means of the system.

In another embodiment, relevant data from within a financial or accounting application or web page, web service or web server is captured using the system. Said data may then be organized into discrete or aggregated data elements and transmitted and/or input to other financial or accounting applications, spreadsheets or web page, web service or web servers.

In yet another embodiment, the system queries outside databases, resources, publications, advertisements, journal articles, market reports, displaying them or making them readily accessible when the user completes some prompting activity, learned by the system. Such additional data may be identified using keyword searches of databases, or based on the user's historical access of these additional data.

Figure 23:
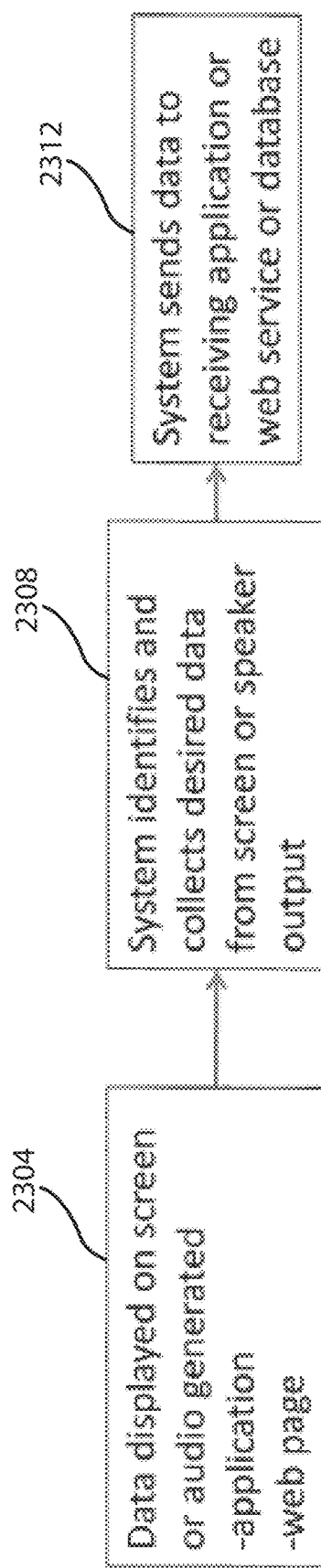
FIG. 23 depicts a flow diagram of an interfacing ability of the system.

FIG. 23 is a flow diagram depicting the identification and collection of data displayed on a screen by an application or web page, web service or web server, and sent to a receiving application, web page, web service or web server or database. The system allows for data to be transmitted without specific modifications to software or code intrinsic to a particular application, web page, web service, web server, registry, repository or database. Initially, in operation 2304, data is displayed on a screen or audio is generated. In operation 2308, the system identifies and collects desired data from the screen or speaker output. In operation 2312, the system sends the collected data to a receiving application, web service, or database.

Figure 24:
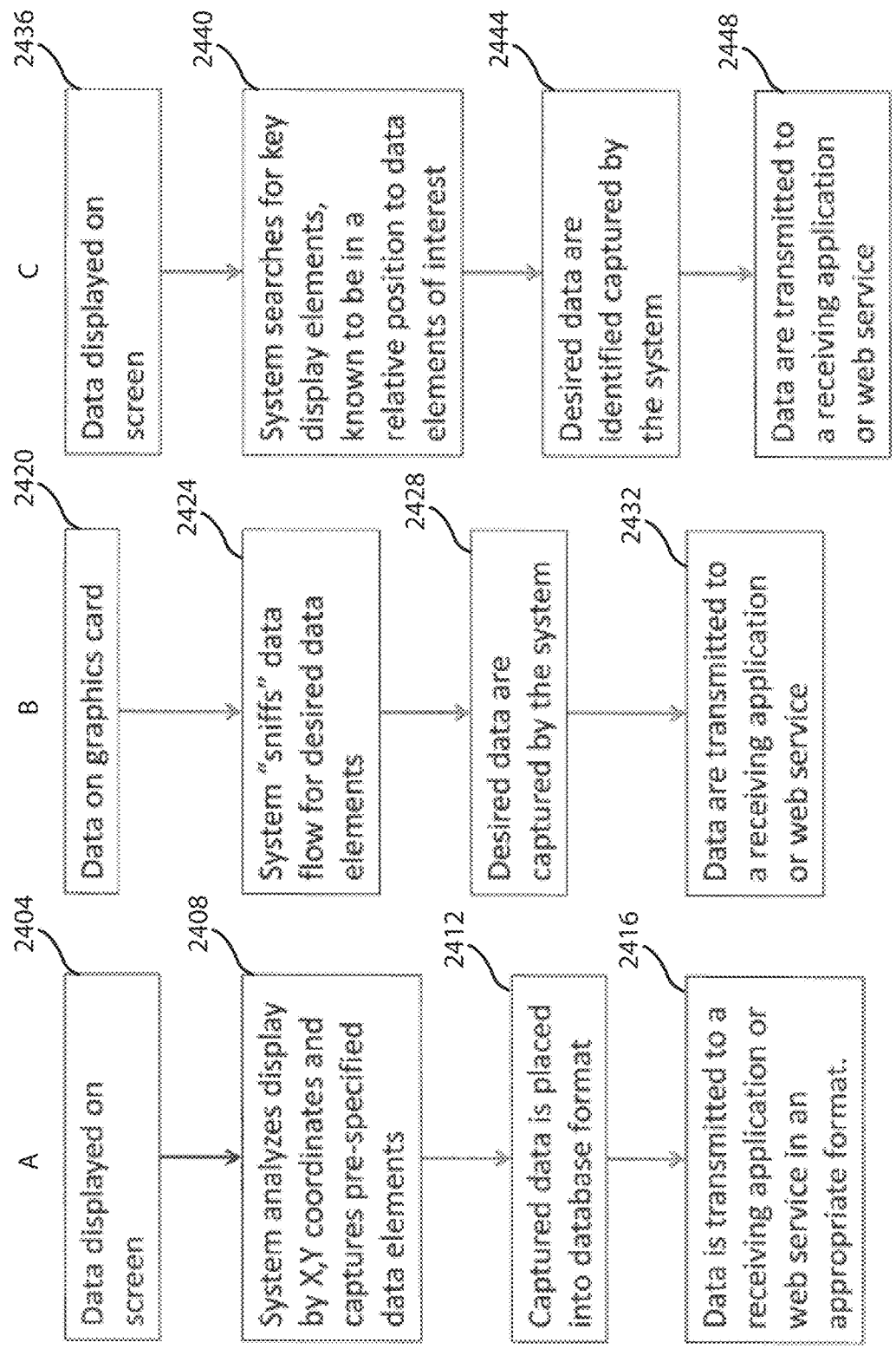
FIGS. 24A-C depict various embodiments of an interfacing system, according to one embodiment.

FIG. 24A is a flow diagram describing a system in which display data are collected from specific X,Y coordinates on the screen or window. Data are then organized into a database and transmitted to a receiving application, web page, web service, web server, registry, repository or database. Initially, in operation 2404, data is displayed on a screen. In operation 2408, the system analyzes the display by X,Y coordinates and captures pre-specified data elements. In operation 2412, the system places captured data into a database format. In operation 2416, the system transmits the data to a receiving application or web service in the appropriate format.

FIG. 24B is a flow diagram describing a system that monitors or "sniffs" data passing through a graphics card. When pre-specified data of interest are detected, said data are captured by the system and then transmitted to a receiving application web page, web service, web server, registry, repository or database. Initially, in operation 2420, data is present on a graphics card. In operation 2424, System "sniffs" data flow for desired data elements. In operation 2428, the system captures desired data. In operation 2432, the system transmits the data to a receiving application or a web service.

FIG. 24C is a flow diagram describing a system that searches for display data. The system first searches for a reference item. Once located, the system captures data known to be in a position relative to the reference item. The captured data can then be transmitted to a receiving application, web page, web service, web server, registry, repository or database. Initially, in operation 2436, data is displayed on a screen. In operation 2440, the system searches for key display elements, known to be in a relative position to data elements of interest. In operation 2444, desired data elements are identified and captured by the system. In operation 2448, the data elements are transmitted to a receiving application or web service.

Figure 25:
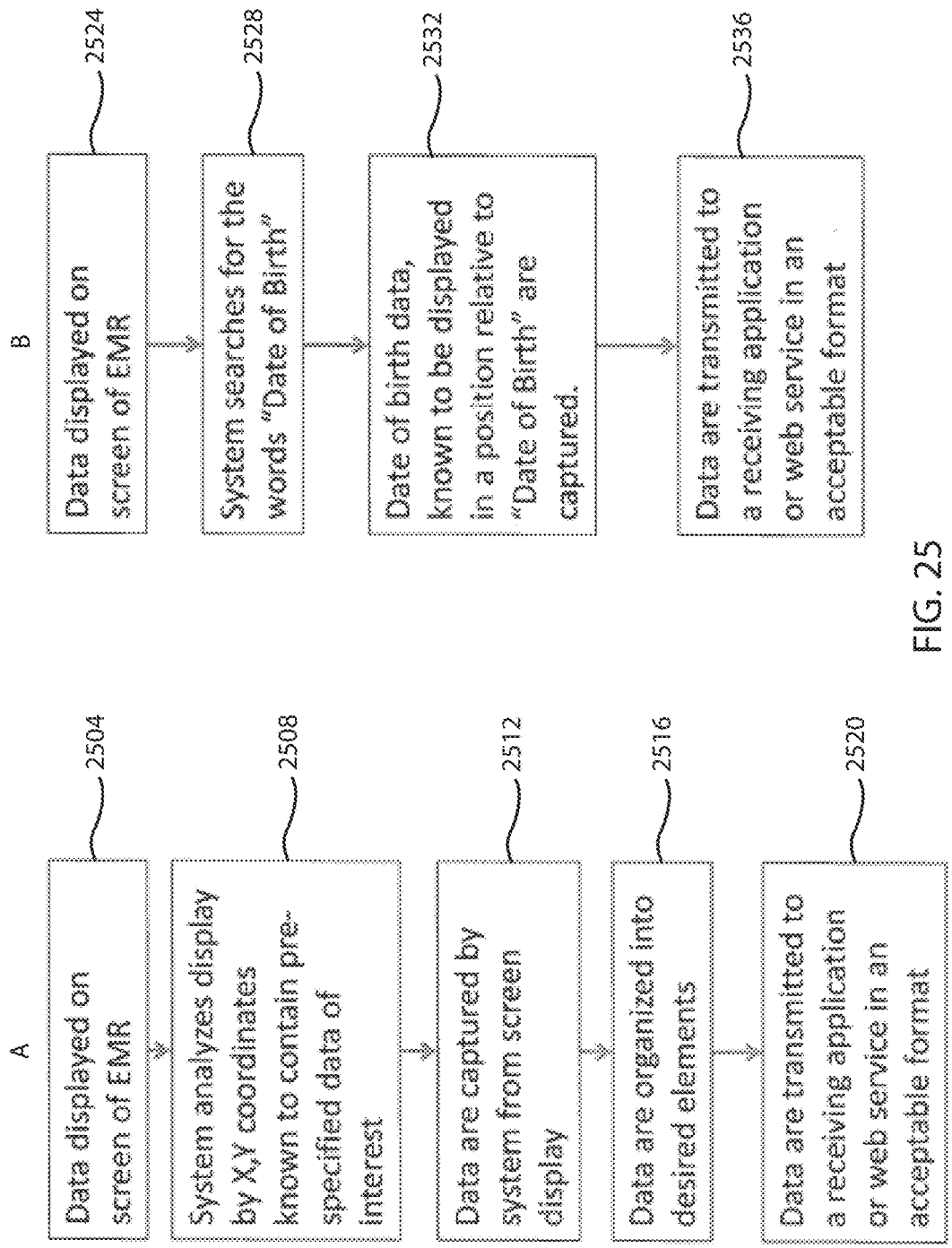
FIGS. 25A-B depict additional embodiments of an interfacing system, according to one embodiment.

FIG. 25A is a flow diagram describing a system to collect data from an electronic medical record (EMR). The system analyzes displayed content and collects data known to be at specific X,Y coordinates. The collected data can then be organized into a desired format and sent to a receiving application web page, web service, web server, registry, repository or database. Initially, in operation 2504, data is displayed on a screen. In operation 2508, the system analyzes the display by X,Y coordinates known to contain pre-specified data of interest. In operation 2512, the system captures data from the screen display. In operation 2516, the system organizes the data into desired elements. In operation 2520, the system transmits the data to a receiving application or web service in an acceptable format.

FIG. 25B is a flow diagram describing a system to collect data from an EMR. The system searches displayed content, in this instance the words "DATE OF BIRTH". The system then collects date of birth data, known to be in a position relative to "DATE OF BIRTH". The collected data are then transmitted to a receiving application, web page, web service, web server, registry, repository or database. Initially, in operation 2404, data is displayed on a screen. In operation 2408, the system searches for the words "Date of Birth." In operation 2412, the system captures a date of birth information that is known to be displayed in a position relative to a "Date of Birth" textual element. In operation 2416, the system transmits the data to a receiving application or web service in an acceptable format.

Figure 26:
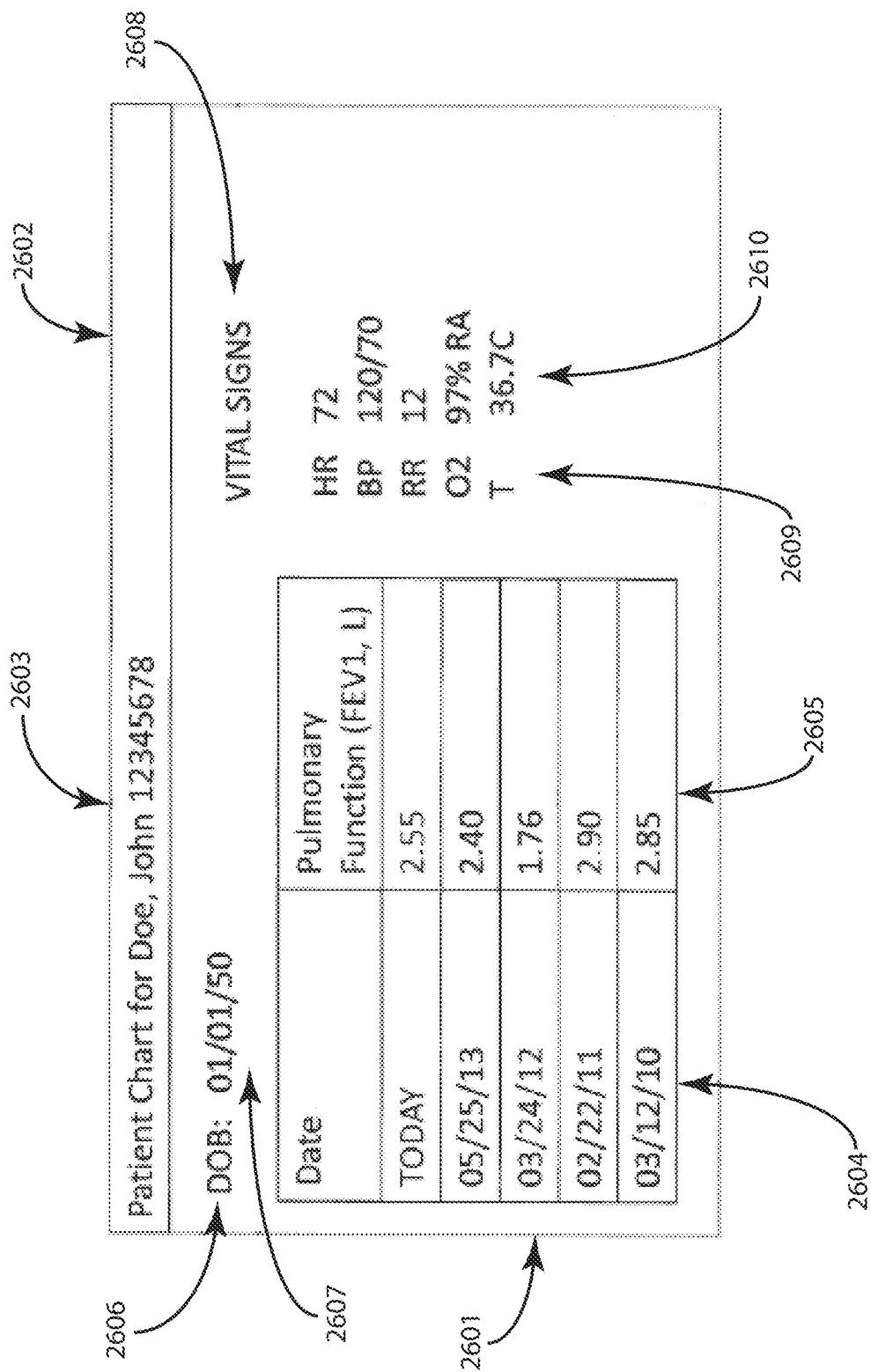
FIG. 26 depicts a screen image that may be part of a system and method, according to one embodiment.

FIG. 26 depicts an exemplary system capable of capturing data from an EMR screen 2601. The patient's name and medical record number 2603 are known to be displayed in the active window title bar 2602 and are collected. The system then searches for the term DOB 2606 within the window, and when located collects the patient's date of birth 2607 by virtue of its position relative to DOB 2606. Tabular data may similarly be located. In this instance, pulmonary function values 2605 and the corresponding dates 2604 are collected. Finally, the system may use multiple reference points to collect data of interest. In this instance, vital sign data 2610 are located beneath the words VITAL SIGNS 2608 and to the right of specific labels 2609. The system collects vital sign data 2610 using the known relative display location of the data 2610 relative to the reference points 2608, 2609.

Figure 27:
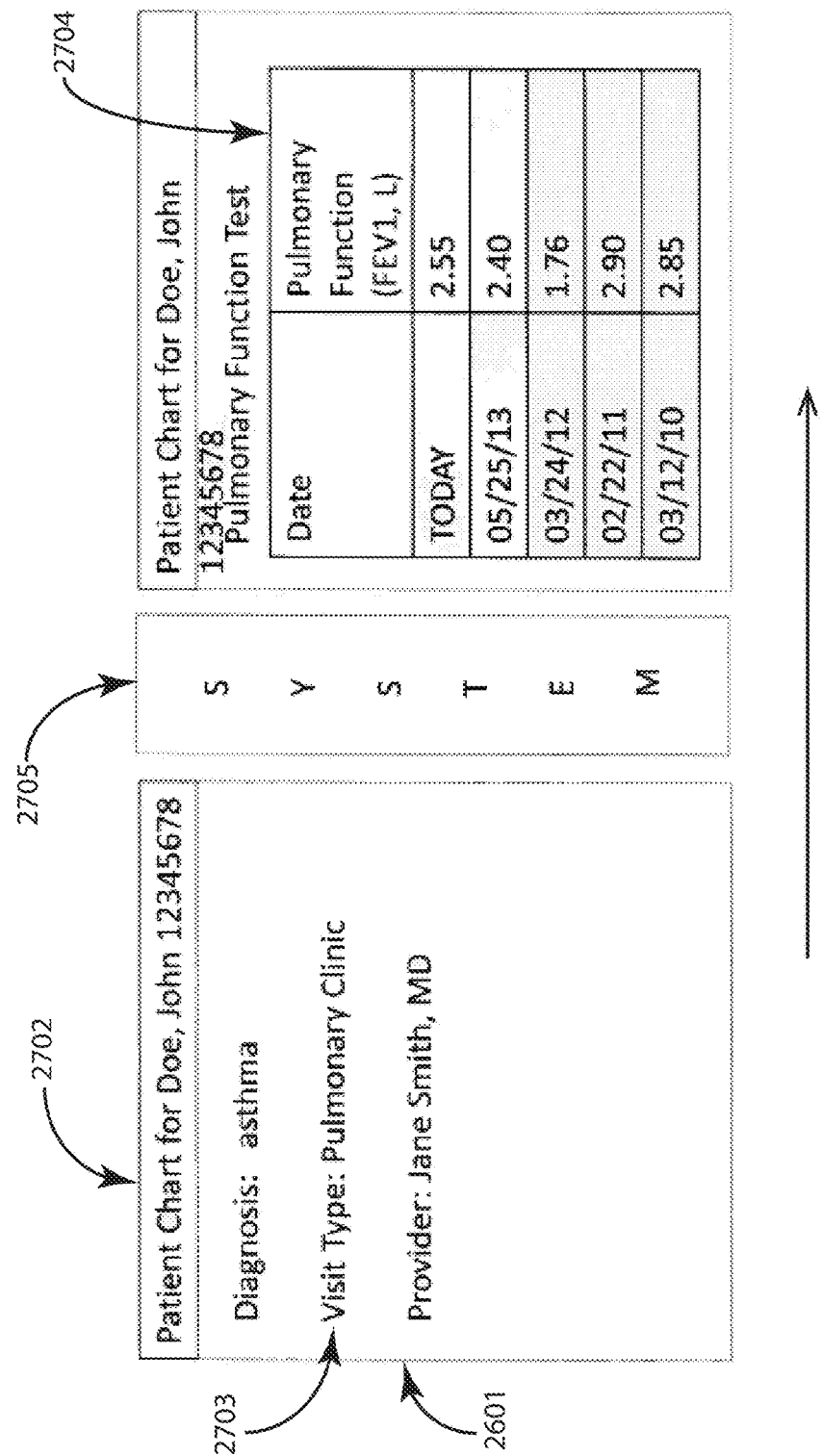
FIG. 27 depicts an exemplary diagram of a system's predictive ability, according to one embodiment.

FIG. 27 depicts an exemplary system 2705 capable of utilizing predictive tools, artificial intelligence including neural networks to improve the user experience. In an EMR, a patient's record is displayed on the screen 2701. The name of the patient is displayed in the title bar 2702 and patient diagnosis, visit type and healthcare provider displayed on screen 2703. The system analyzes the aforementioned screen content, and predicts that the provider will want to view pulmonary function data in the next screen. After a specific trigger, such as a certain period of time, mouse click, movement or screen touch, the system will automatically display pulmonary function data for the user 2704.

Figure 28:
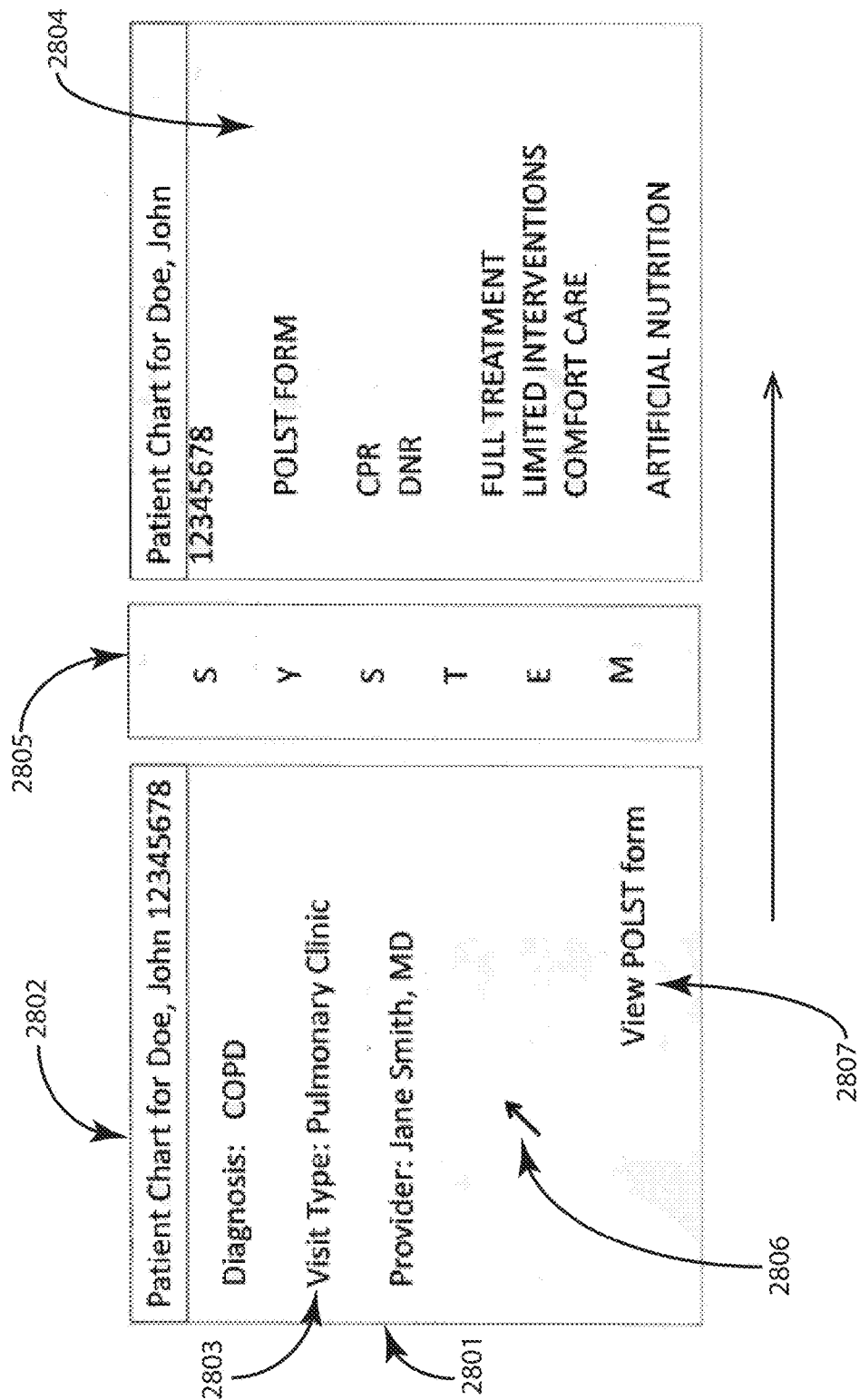
FIG. 28 depicts an exemplary diagram of a system's predictive ability, according to one embodiment.

FIG. 28 depicts an exemplary system 2805 capable of utilizing predictive tools, artificial intelligence including neural networks to improve the user experience through predictive features. In an EMR, a patients record 2801 is displayed, including a title bar with name and medical record number 2802, diagnosis, provider name and visit type 2803, and links to other screens, in this instance a link to "View POLST form" 2807. The system 2805 detects the mouse movement by the user 2806 toward the link 2807 and based on the diagnosis, visit type and provider name 2803, the system 2805 anticipates that the user will click on the link 2807 and automatically activates it, opening a new window 2804 with POLST information displayed 2804.

The invention claimed is:

1. A method, comprising:
    establishing a link between a mobile electronic device and a computing device across a network, the computing device being used to enter data, wherein establishing the link comprises:
        establishing a networking session between the computing device and a server;
        displaying a unique session identifier associated with the networking session at the computing device;
        receiving the unique session identifier as input from the user on the mobile electronic device;
        transmitting the unique session identifier from the mobile electronic device to the server;
        including the mobile electronic device in the network session between the computing device and the server in response to receiving the unique session identifier at the server;
        displaying a first portion of an electronic document within the networking session at the computing device in response to user input; and
        activating, through the link between the computing device and the mobile electronic device, a functionality at the mobile electronic device that corresponds to the first portion of the electronic document;
    collecting user input at the mobile electronic device, wherein collecting the user input comprises collecting user identifying information comprising biometric data identifying the user, the biometric data selected from the group consisting of a retina scan, an iris scan, an eye scan, a fingerprint, a facial profile, a picture and a voice of the user;
    transmitting the user input across the network from the mobile electronic device to the computing device for incorporation with the data entered at the computing device;
    displaying at least a first portion of the electronic document at the computing device in response to user input;
    commanding the mobile electronic device, through the link between the computing device and the mobile electronic device, to cause the mobile electronic device to display the first portion of the electronic document that is displayed at the computing device;
    displaying a second portion of the electronic document at the computing device in response to user input;
    deactivating, through the link between the computing device and the mobile electronic device, the functionality that corresponds to the first portion of the electronic document;
    activating, through the link between the computing device and the mobile electronic device, a functionality at the mobile electronic device that corresponds to the second portion of the electronic document;
    collecting second user input at the mobile device; and
    transmitting the second user input across the network from the mobile electronic device to the computing device for incorporation with data entered at the computing device.

2. The method of claim 1, wherein the computing device is used to enter data into the electronic document and the user input collected at the mobile electronic device is incorporated into the electronic document along with the data entered at the computing device.

3. The method of claim 2, wherein the user input collected at the mobile electronic device comprises an electronic signature.

4. The method of claim 2, wherein the electronic document is a webpage.

5. The method of claim 1, wherein establishing the networking session further includes authenticating the computing device to the server, and wherein the mobile electronic device is included in the networking session without separately authenticating the mobile electronic device to the server.

6. The method of claim 1, wherein the unique identifier comprises at least one of a quick response code, an alpha numeric code, a bar code or a website address.

7. The method of claim 1, wherein the unique identifier is only displayed at the computing device as long as a countdown is not expired.

8. The method of claim 1, further comprising displaying the user input at the computing device in response to the user input being collected at the mobile electronic device.

9. The method of claim 2, further comprising transmitting a signal from the computing device when the electronic document is active.

10. The method of claim 1, wherein the user input collected at the mobile electronic device is selected from the group consisting of a photograph taken with a camera incorporated in the mobile electronic device, a sound recording taken with a microphone incorporated into the mobile electronic device, and text entered into the mobile electronic device through a keyboard associated with the mobile electronic device.

11. The method of claim 1, further comprising prompting the user to accept the user input prior to transmitting the user input across the network.

12. The method of claim 1, wherein collecting user input includes scanning an object associated with the user that has identifying information.

13. The method of claim 12, wherein establishing the link between the mobile electronic device and the computing device establishes global position coordinates for the mobile electronic device, and wherein scanning the object associated with the user establishes global position coordinates for the collection of identifying information.

14. The method of claim 12, further comprising collecting additional identifying information at the mobile electronic device, wherein the additional identifying information includes at least one of a passcode or a personal identification number.

15. The method of claim 12, wherein the object associated with the user is expected to have a hologram, wherein scanning the object associated with the user includes taking sequential images of a location of the expected hologram, and wherein the method further comprises compiling the sequential images to determine if the object does in fact have a hologram.

16. The method of claim 1, wherein activating the functionality at the mobile electronic device includes activating at least one device selected from the group consisting of a camera, a fingerprint scanner, a microphone, a speaker, a flash, a GPS, an accelerometer, a touchscreen, a heartbeat scanner, an infra-red scanner, an LED, and a proximity sensor.

* * * * *